(12) United States Patent (10) Patent No.: US 9,077,710 B1
Levner (45) Date of Patent: Jul. 7, 2015

(54) DISTRIBUTED STORAGE OF PASSWORD DATA

(71) Applicant: Sabaki Corporation, New York, NY (US)

(72) Inventor: David Levner, New York, NY (US)

(73) Assignee: Sabaki Corporation, New York, NY (US)

( * ) Notice: Subject to any disclaimer, the term of this patent is extended or adjusted under 35 U.S.C. 154(b) by 23 days.

(21) Appl. No.: 14/132,948

(22) Filed: Dec. 18, 2013

(51) Int. Cl.
*G06F 21/00* (2013.01)
*H04L 29/06* (2006.01)
*H04L 9/08* (2006.01)

(52) U.S. Cl.
CPC ............ *H04L 63/083* (2013.01); *H04L 9/0863* (2013.01)

(58) Field of Classification Search
USPC ...................................... 726/5–10
See application file for complete search history.

(56) References Cited

U.S. PATENT DOCUMENTS

| 6,079,021 | A | 6/2000 | Abadi et al. |
| 7,073,068 | B2 | 7/2006 | Jakobsson et al. |
| 8,254,571 | B1 | 8/2012 | Boyen |
| 2003/0204724 | A1* | 10/2003 | Ayyagari et al. ............... 713/168 |
| 2011/0202773 | A1* | 8/2011 | Ghouti et al. .................. 713/183 |
| 2013/0125221 | A1* | 5/2013 | Agrawal ........................... 726/6 |

* cited by examiner

*Primary Examiner* — Ghazal Shehni
(74) *Attorney, Agent, or Firm* — Capitol City TechLaw; Richard C. Irving

(57) ABSTRACT

To better protect passwords used for authentication or for generating cryptographic keys, methods and apparatuses may store password data on multiple storage devices. For each password, each subset of multiple distinct subsets of a data set may be sufficient to authenticate a trial password or generate a cryptographic key. A first subset enables a quick method for authenticating the trial password or generating the cryptographic key. The first subset may be stored in a distributed manner to make it more difficult to steal. If the first subset is unavailable, then a second subset, which is stored centrally, may be used to authenticate the trial password or generate the cryptographic key, but with a method that is an order of magnitude slower than the quick method. Brute force and dictionary attacks based on the second subset may take much longer than such attacks based on the quick method.

19 Claims, 38 Drawing Sheets

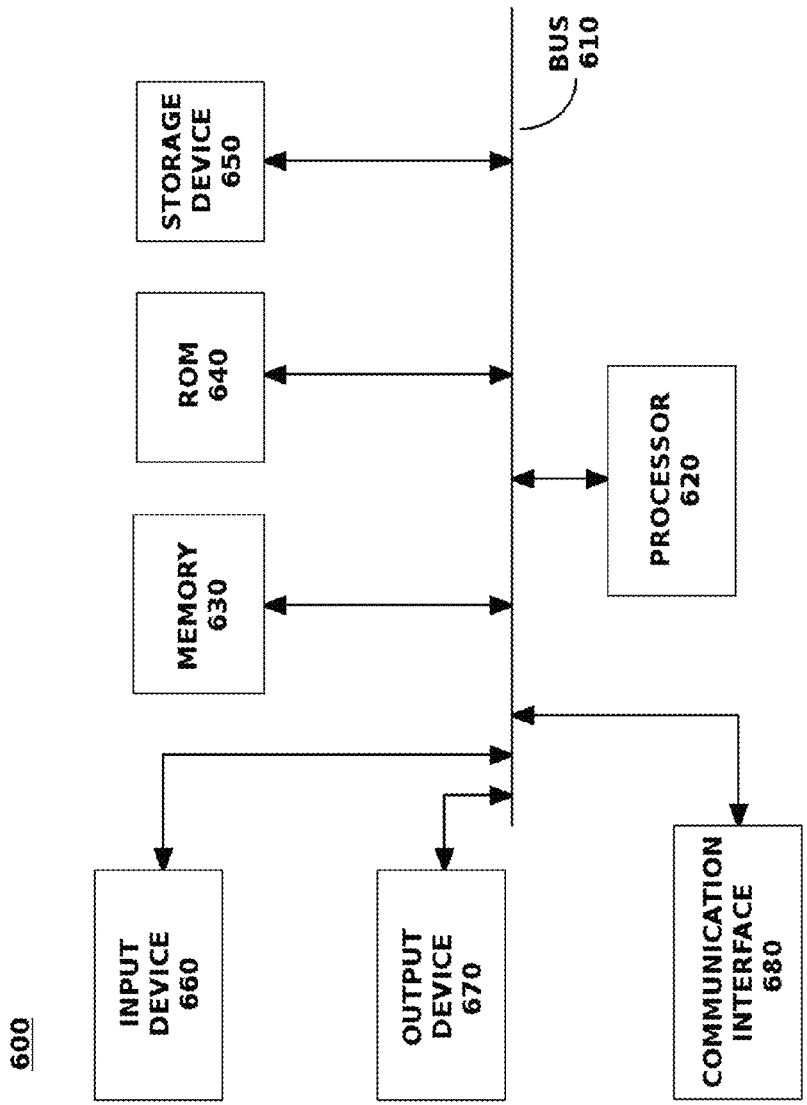

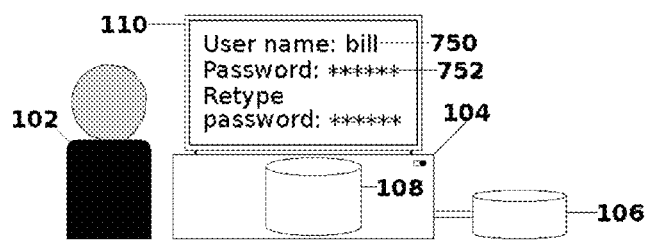
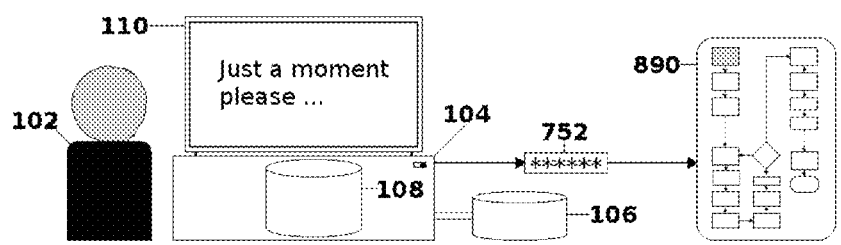
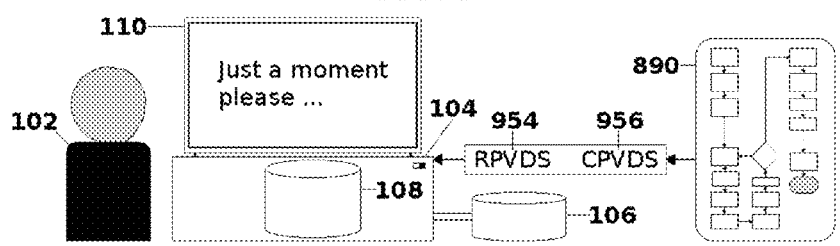
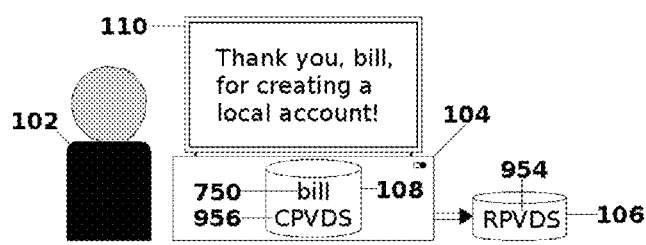

Password verification data set 3150 including two salts and two hashes

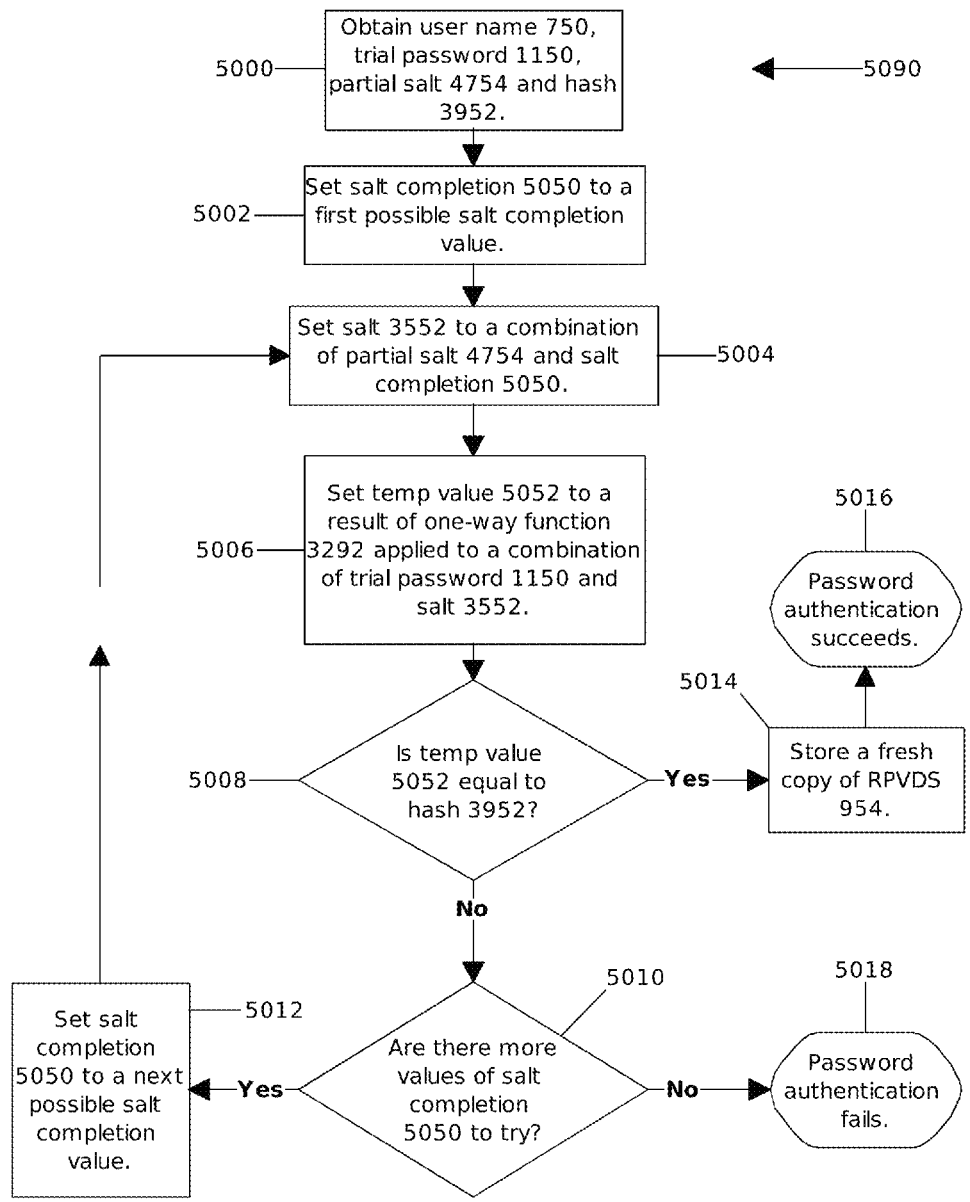

FIG. 51

Password verification data set 5150
which in this case is the same as
Quick password verification data subset (QPVDS) 1250

Remote password verification data subset (RPVDS) 954

| solution 5151 | 5697328 |
|---|---|

Central password verification data subset (CPVDS) 956
which in this case is the same as
Slow password verification data subset (SPVDS) 1650

| x^12 coefficient 5152 | 83 | x^18 coefficient 5158 | 155 |
|---|---|---|---|
| x^13 coefficient 5153 | 85 | x^19 coefficient 5159 | 215 |
| x^14 coefficient 5154 | 9 | x^20 coefficient 5160 | 194 |
| x^15 coefficient 5155 | 144 | x^21 coefficient 5161 | 71 |
| x^16 coefficient 5156 | 227 | x^22 coefficient 5162 | 214 |
| x^17 coefficient 5157 | 45 | x^23 coefficient 5163 | 139 |
| constant term 5164 | 3337744153087612374360770407796907519861176298636950360031677000393191563090385368815180624513159813319514779483891715806424702419800647988755924938576 9336753 | | |

Cryptographic key data set 5550 including two salts and one hash

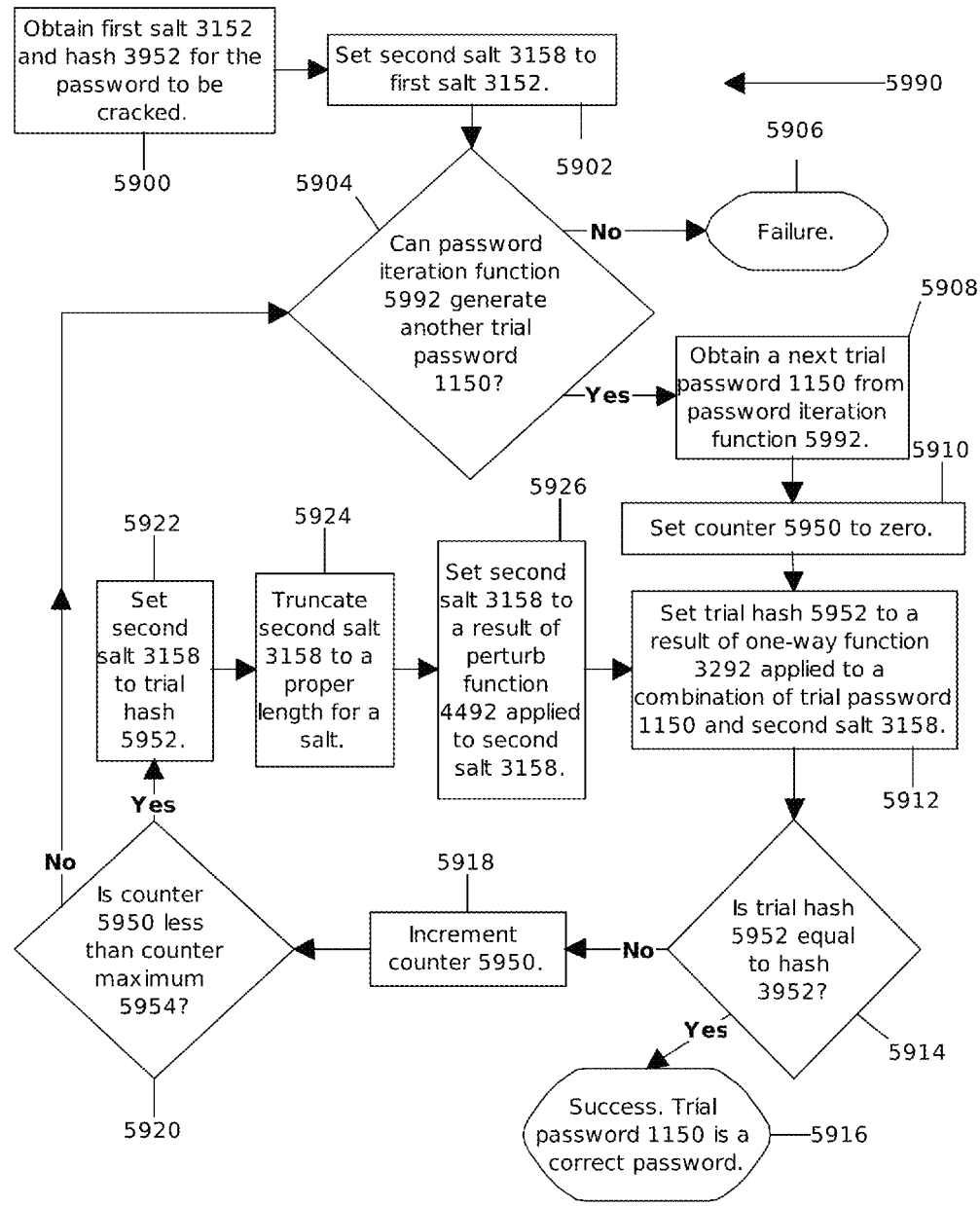

DISTRIBUTED STORAGE OF PASSWORD DATA

BACKGROUND

A host computer system used by multiple entities (people or other devices) usually maintains accounts for the entities. To access data owned by, and services provided to, an account, an entity must first prove his/her/its identity. The entity, also called the "user," may be a person, a physical device, or a collection of software. A process by which the user proves his/her/its identity is called "authentication."

One of the most common methods of authentication is password authentication: verifying that the user has provided a correct password. When the user sets up his/her/its account, he/she/it specifies a new password—usually a string of characters that may include letters, digits, symbols and control characters. The host computer system stores information about the password sufficient to verify whether or not a trial password, provided by the user at a later time, is correct (is identical to the password). The information stored about the password that is used to verify whether or not the trial password is correct is called a "password verification data set."

In the early days of computing, the password verification data set was the password itself. To authenticate the user, the computer system obtained the trial password from the user and compared it to the password stored in the password verification data set. This password authentication method is simple but has a major flaw: a person who can view the password stored in the password verification data set can use the password to impersonate the user.

An early improvement to the password verification data set was storing an encrypted version of the user's password instead of the password itself. When creating the user's account, the host computer system applied a "one-way function" to the new password, and an output of the one-way function was stored. The one-way function modifies its input in a way that is very difficult to reverse; from an output of the one-way function, it is hard to determine what its input was. The output of the one-way function is called a "hash." Looking at the hash derived from the user's password, it is not easy to determine what user's the password is.

As host computer systems were entrusted with more important data and services, the rewards for determining the password of another user grew. A method for determining another user's password from a password verification data set became known as "cracking" or an "attack." Today, a password attack generally starts when an attacker gains access to (steals) a password verification data set of a targeted user. The attacker then programs his/her own computers to perform a same password authentication method that the host computer system uses, and the attacker attempts to authenticate many trial passwords until the correct password is found. Three common password attacks are dictionary attacks, brute force attacks and rainbow table attacks. A dictionary attack tries to authenticate all passwords in a list of likely passwords. A brute force attack tries to authenticate all possible passwords less than a certain length (possibly with other restrictions). A rainbow table attack uses a large, pre-computed table of passwords and hashes to speed up the process of finding the correct password.

A cryptographic key can be used, in conjunction with an encryption method, to encrypt and decrypt a data set. If the cryptographic key is generated from a password, the cryptographic key may be vulnerable to some of the attacks described above.

To make password attacks more difficult, computer scientists invented the concept of "salt." A salt is a string of characters or bits that varies from user to user and is mixed with the user's new password and trial password before applying the one-way function. The password verification data set was expanded to include both the hash and the salt. The salt is usually randomly generated when the user's account is created or when the user changes his/her/its password.

Other techniques for resisting password attacks have been suggested but are not widely used. For example, "password strengthening" adds random bits to the user's password before applying the one-way function to create the hash that is stored in the password verification data set. The random bits are not stored in the password verification data set or in any data storage device. If 20 random bits are added, then an attacker has to perform one million (two raised to the power of 20) times as many computations, on average, to determine the correct password. A disadvantage of password strengthening is that authenticating a legitimate user's password also takes longer. Another technique, "password stretching," makes the one-way function more time-consuming to compute, for example by applying the one-way function repeatedly in a loop. Password stretching also slows down both password attacks and the authentication of a legitimate user's password.

An important weakness of most password authentication methods is that they store password verification data sets of many users in one place, typically in a single file or database. Numerous times, hackers have broken into host computer systems and stolen the data in these files or databases. The password verification data sets stored in a central location may be considered vulnerable.

Another proposed technique for resisting password attacks is distributing the password verification data set among a set of cooperating computers. To successfully attack a host computer system that uses this technique, the attacker must gain access to multiple cooperating computers, a more difficult task than gaining access to a single host computer. Implementation of the proposed technique is complex and may not protect the host computer system against an attacker who gains root access to one or more of the cooperating servers.

Other authentication methods may achieve greater security by obtaining other types of information from the user besides, or in addition to, the password. For example, bio-metric authentication verifies the user's identity from a unique attribute of the user such as a fingerprint. Authentication can also be based on verifying that the user has an object, such as a smart card or a security token. Multi-factor authentication obtains several types of information from the user, such as a password and data from a smart card, or a password and a fingerprint. Multi-factor authentication may offer greater security than password authentication but has several disadvantages: 1) the additional factor(s) usually require additional hardware, such as a fingerprint reader or a smart card, that has a cost, 2) presenting the additional information may inconvenience the user every time he/she/it logs in, and 3) if the user loses the smart card, or if the fingerprint reader breaks, then the user cannot log in at all.

The other techniques for resisting password attacks may be used in conjunction with password verification data sets and password authentication methods described in this disclosure. The password verification data sets and password authentication methods described herein may also be used with multi-factor authentication as long as one of the authentication factors is a password.

A different approach to authentication is to challenge the user with security questions in addition to the password. Before or after the user enters his/her/its password, the host computer system may ask the user one or more security questions that only the user (hopefully) can answer correctly. Incorrect answers to one or more security questions may cause authentication to fail. In some implementations, the security questions are asked only if the user does not have an expected data element, such as a cookie written on the user's hard drive during a previous session. Requesting answers to security questions may also be used as an alternative to password authentication if the user claims to have forgotten his/her/its password.

Multi-factor authentication and requesting answers to security questions may be used in addition to password authentication, but are not password authentication methods as defined herein.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In various embodiments, a method implemented by a processing device is provided for generating password verification data sets. Using the method, password verification data sets may be generated based, at least partly, on a password. In these embodiments, the password verification data set may contain two or more distinct subsets, each of which may be sufficient for performing password authentication. In some embodiments, when a first subset of the password verification data set is available, a first password authentication process may be performed with respect to a provided trial password. When the first subset of the password verification data set is not available, a second password authentication process may be performed based on a second subset of the password verification data set and the provided trial password. The first password authentication process using the first subset may be much faster than the second password authentication process using the second subset.

In other embodiments, a method is provided for authenticating a password. A trial password may be obtained from a user. Some elements of a password verification data set may be obtained from a first storage device. Other elements of the password verification data set, if available, may be obtained from a second storage device. When the other elements are available, a processing device performs a first calculation based on the trial password, the some elements and the other elements to authenticate the trial password. When the other elements are not available, a second calculation is performed based on the trial password and the some elements to authenticate the trial password. The first calculation may be different from the second calculation and the first calculation is performed in at most half an amount of time used to perform the second calculation.

In other embodiments, a method implemented by a processing device is provided for generating cryptographic keys. Using the method, cryptographic key data sets may be generated based, at least partly, on a password. In these embodiments, the cryptographic key data set may contain two or more distinct subsets, each of which may be sufficient to generate the cryptographic key based on a trial password that is identical to the password. In some embodiments, when a first subset of the cryptographic key data set is available, a first cryptographic key generation process may be performed with respect to a provided trial password. When the first subset of the cryptographic key data set is not available, a second cryptographic key generation process may be performed based on a second subset of the cryptographic key data set and the provided trial password. The first cryptographic key generation process using the first subset may be much faster than the second cryptographic key generation process using the second subset.

In other embodiments, a method is provided for generating a cryptographic key. A trial password may be obtained from a user. Some elements of a cryptographic key data set may be obtained from a first storage device. Other elements of the cryptographic key data set, if available, may be obtained from a second storage device. When the other elements are available, a processing device performs a first calculation based on the trial password, the some elements and the other elements to generate the cryptographic key. When the other elements are not available, a second calculation is performed based on the trial password and the some elements to generate the cryptographic key. The first calculation may be different from the second calculation and the first calculation is performed in at most half an amount of time used to perform the second calculation.

In additional embodiments, at least one processing device is provided. The at least one processing device may include one or more processors and one or more memories connected to the one or more processors. The one or more memories may have instructions stored therein for the one or more processors to perform a method. The method may include generating and storing a password verification data set, which may be used during a password authentication process based, at least partly, on a password. The password verification data set may include at least two distinct subsets, each of which may be sufficient to perform the password authentication process. In other embodiments, the method may include generating and storing a cryptographic key data set, which may be used during a cryptographic key generation process based, at least partly, on the password. The cryptographic key data set may include at least two distinct subsets, each of which may be sufficient to perform the cryptographic key generation process.

Various embodiments disclose numerous ways to generate and store password verification data sets and cryptographic key data sets that make cracking passwords more difficult but, in most cases, do not slow down the password authentication process and the cryptographic key generation process for legitimate users or make the processes inconvenient.

Unlike multi-factor authentication, the password authentication processes used in various embodiments do not require special hardware devices. For example, in one embodiment, a user who creates a web site account may have some data elements of his/her password verification data set stored as cookies on his/her own hard disk drive. (In this embodiment, the user's hard disk drive serves as the second storage device.) The user may not perform any additional steps besides providing a user name and trial password to log in; the cookies containing the password verification data set elements are transmitted to a processing device that hosts the web site in a manner that is transparent to the user. The user may not notice any difference between conventional password authentication methods and the password authentication methods of the various embodiments. Furthermore, if the user's cookies are not available, he/she can still log in. The only difference is that a password authentication process employed takes longer than if the cookies were available. In some embodiments, when the user logs in without the cookies, the cookies are reconstructed and stored anew on the user's hard disk drive so that, on subsequent login attempts, the cookies will again be available and an employed password authentication process will be quicker than the password authentication process employed when the cookies were not available. Depending on the embodiment, the reconstruction of the missing password verification data set elements (cookies) and their re-storage on the user's hard disk drive may occur without any effort by the user.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

FIGS. 1-5 illustrate five exemplary operating environments consistent with the subject matter of this disclosure.

FIG. 6 is a functional block diagram of an exemplary processing device that that may be used to implement a personal processing device 104 of FIG. 1, a host processing device 204 of FIG. 2, a client processing device 402 of FIG. 4, the processing devices comprising an attacker processing device array 502 of FIG. 5, or all of these processing devices.

FIGS. 7-10 constitute a storyboard illustrating an exemplary process for generating a password verification data set in a standalone operating environment 100 of FIG. 1.

FIGS. 11-14 constitute a storyboard illustrating an exemplary successful password authentication process in the standalone operating environment 100 of FIG. 1 when a remote password verification data subset 954 (RPVDS) depicted in FIGS. 9-10 is available.

FIGS. 15-18 constitute a storyboard illustrating an exemplary successful password authentication process in the standalone operating environment 100 of FIG. 1 when the remote password verification data subset 954 (RPVDS) depicted in FIGS. 9-10 is not available.

FIGS. 19-22 constitute a storyboard illustrating an exemplary process for generating a password verification data set in a network operating environment 200 of FIG. 2.

FIGS. 23-26 constitute a storyboard illustrating a successful password authentication process in the network operating environment 200 of FIG. 2 when the remote password verification data subset 954 (RPVDS) depicted in FIGS. 17-18 is available.

FIGS. 27-30 constitute a storyboard illustrating a successful password authentication process in the network operating environment 200 of FIG. 2 when the remote password verification data subset 954 (RPVDS) depicted in FIGS. 17-18 is not available.

FIG. 50 is a flowchart that illustrates an exemplary slow password authentication method 5090 using the password verification data set 4750 of FIG. 47.

FIG. 51 illustrates a sixth exemplary password verification data set 5150.

FIG. 59 is a flowchart that illustrates an exemplary dictionary/brute force attack method 5990 using the password verification data set 4350 of FIG. 43.

DETAILED DESCRIPTION

Figure 1:
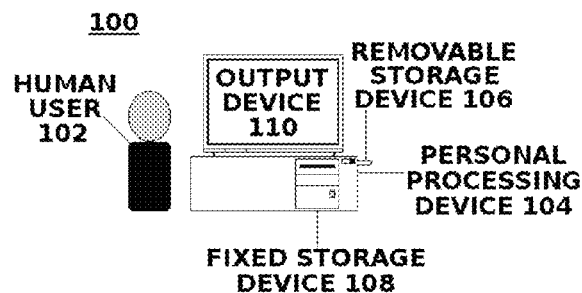

The following terms are used in the Detailed Description consistent with their usual meanings.
  user name: A name provided by a user to identify an account belonging to him/her/it.

new password: A password provided by a user when the user creates an account, when the user changes a password of his/her/its existing account, or when the user creates a cryptographic key.

trial password: A password provided by a user when the user attempts to log in to an account or when the user regenerates a cryptographic key.

correct password: A password identical to a most recent new password that a user provided when creating his/her/its account, when changing the password of his/her/its account, or when creating a cryptographic key.

host processing device: A processing device, or a collection of processing devices, that creates and provides access to accounts for one or more users, and/or encrypts and decrypts data sets.

password authentication data set: A set of data elements, including either a user name and a new password, or a user name and a trial password, provided by a user to establish or confirm his/her/its identity.

password authentication: A processing device implemented process performed by a host processing device that determines whether or not to grant a user access to an account based on the user name and the trial password provided by the user.

password verification data set: A set of data elements that enables a host processing device to determine whether or not a trial password provided by a user is identical to the user's correct password.

one-way function: A method that converts an input into an output in such a way that reversing the method's action (determining the input from the output) is very difficult.

hash: An output of a one-way function.

salt: A string of characters or bits, that may differ from user to user, and that may be combined with other data elements before applying a one-way function. (In some embodiments, the salt is combined with a new password or a trial password before applying the one-way function.)

temp value: A data element generated during a computation that is not stored permanently.

cryptographic key: A string of characters or bits that may be used, in conjunction with an encryption method, to encrypt or decrypt a data set.

The following terms, although not in common usage, make it easier to describe the invention:

password verification data set generation method: A processing device implemented method that generates a password verification data set from a password.

quick password authentication method: A processing device implemented method that accepts a trial password and a first subset of a password verification data set as inputs, and may return a success indicator if the trial password is identical to a correct password, and may return a failure indicator if the trial password is not identical to the correct password.

slow password authentication method: A processing device implemented method that accepts a trial password and a second subset of the password verification data set as inputs, may return a success indicator if the trial password is identical to a correct password, may return a failure indicator if the trial password is not identical to the correct password, and uses at least twice as much time to return the success indicator or the failure indicator as an amount of time that a quick password authentication method uses.

quick password verification data subset: A subset of a password verification data set that may be provided as an input to a quick password authentication method.

slow password verification data subset: A subset of a password verification data set that may be provided as an input to a slow password authentication method.

central storage device: A storage device that is permanently connected to a processing device is considered to be a central storage device from a perspective of the processing device.

central password verification data subset: A proper subset of a password verification data set that is stored in a central storage device.

remote storage device: A storage device that is not permanently connected to a processing device is considered to be a remote storage device from a perspective of the processing device.

remote password verification data subset: A proper subset of a password verification data set that is stored in a remote storage device.

perturb function: A method that is performed within a loop, that accepts a data element as an input, and produces an output that depends on the data element and on a number of iterations of a loop that have already been performed.

cryptographic key data set: A set of data elements that, together with a trial password, may enable a host processing device to generate a cryptographic key.

cryptographic key data set generation method: A processing device implemented method that may generate a cryptographic key data set and a cryptographic key from a password.

quick cryptographic key generation method: A processing device implemented method that accepts a trial password from a user and a subset of a cryptographic key data set, intended for use with the quick cryptographic key generation method, as inputs, determines whether the trial password is identical to a password that the user provided to a cryptographic key data set generation method when the cryptographic key data set was generated, and if the trial password is identical to the password, may generate a cryptographic key identical to a cryptographic key generated by the cryptographic key data set generation method.

slow cryptographic key generation method: A processing device implemented method that accepts a trial password from a user and a subset of a cryptographic key data set, intended for use with the slow cryptographic key generation method, as inputs, determines whether the trial password is identical to a password that the user provided to a cryptographic key data set generation method when the cryptographic key data set was generated, and, if the trial password is identical to the new password, may generate a cryptographic key identical to a cryptographic key generated by the cryptographic key data set generation method, and uses at least twice as much time to generate the identical cryptographic key as an amount of time a quick cryptographic key method uses.

quick cryptographic key data subset: A subset of a cryptographic key data set that may be provided as an input to a quick cryptographic key generation method.

slow cryptographic key data subset: A subset of a cryptographic key data set that may be provided as an input to a slow cryptographic key generation method.

central cryptographic key data subset: A proper subset of a cryptographic key data set that is stored in a central storage device.

remote cryptographic key data subset: A proper subset of a cryptographic key data set that is stored in a remote storage device.

The terms "set", "subset", "proper subset" and "function" have the usual meanings assigned to them by a branch of mathematics known as set theory.

Some of the above definitions use the phrase "permanently connected" in relation to processing devices and storage devices. For the purposes of this disclosure, a processing device is considered to be permanently connected to a storage device if the processing device is able to read data from the storage device under all normal circumstances. Unplugging a removable storage device from the processing device is considered to be a normal circumstance. A personal processing device failing to respond to a query for data stored on an attached storage device, the query originating from a host processing device, is considered to be another normal circumstance. An equipment malfunction is not considered to be a normal circumstance. Configuration changes, such as removing an internal storage device from a processing device, or disconnecting a file server from a processing device, are not considered to be normal circumstances.

Exemplary Operating Environments

FIGS. 1-5 illustrate five exemplary operating environments in which embodiments can be implemented. This is not an exhaustive list of operating environments; embodiments can be built using other configurations.

The operating environments share some common elements:

A personal processing device 104 may be a desktop computer, a laptop computer, a handheld computer such as a tablet or a smartphone, a wearable computer, or any other device that performs computations and interacts with human beings.

An output device 110 may be a computer monitor, a screen built into a desktop computer, a television, a projector, a screen of a laptop or smartphone, an eye-mounted display, a printer, or any other device that displays images generated by the personal processing device 104.

A fixed storage device 108 may be an internal hard drive, an external hard drive, or any other non-transitory, non-removable storage device.

A removable storage device 106 may be a flash drive, an external disk drive, a CD-ROM, a floppy disk, a smartphone or any other removable storage device having a non-transitory storage medium.

A network 202 may be a wired or wireless network, or a mixture of wired and wireless networks. The network 202 may be a local-area network that connects devices in a room, office, building or campus, it may be a wide-area network that spans a larger geographic area, or it may be a network of networks.

A host processing device 204 may be a single computer with an interface to the network 202, or a collection of cooperating computers at least one of which has the interface to the network 202.

A host storage device 206 may be an internal hard drive, an external hard drive, a drive consisting of memory chips, a file server, or any other non-transitory storage device that is always accessible to the host processing device 204.

A client processing device 402 may be a single computer, a collection of cooperating computers, or any device that may interact with the host processing device 204, which creates and maintains one or more user accounts at the request of the client processing device.

A client storage device 404 may be an internal hard drive, an external hard drive, a drive consisting of memory chips, a file server, or any other storage device having a non-transitory storage medium.

An attacker processing device array 502 may be a single computer or a collection of cooperating computers.

An attacker storage device array 504 may be an internal hard drive, an external hard drive, a file server, or any other non-transitory storage device, or a collection of such devices.

FIG. 1 illustrates an exemplary standalone operating environment 100 that may include the personal processing device 104, the output device 110, the fixed storage device 108, and the removable storage device 106. A human user 102 interacts with the personal processing device 104. The human user 102 may at times remove the removable storage device 106 from the personal processing device 104. The personal processing device 104 may not be connected to a network 202 and may not have a communication interface 680 as depicted in FIG. 6.

The personal processing device 104 plays a dual role in the standalone operating environment 100: it interacts with the human user 102, and it hosts the user's account. In operating environments 200, 300 and 400, the two roles are played by different processing devices.

The removable storage device 106 is not permanently connected to the personal processing device 104 because the human user 102 may unplug the removable storage device 106 from the personal processing device 104. In this disclosure, unplugging the removable storage device 106 is not considered to be a configuration change.

In contrast, the fixed storage device 108 is permanently connected to the personal processing device 104. The only circumstances in which the personal processing device 104 would not be able to read data from the fixed storage device 108 are if the personal processing device 104 and/or the fixed storage device 108 malfunction, or if the personal processing device 104 is opened up and the fixed storage device 108 is disconnected from it. In this disclosure, disconnecting the fixed storage device 108 is considered to be a configuration change.

Figure 2:
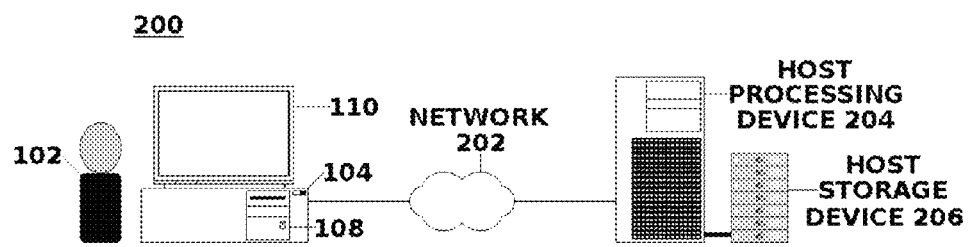

FIG. 2 illustrates an exemplary network operating environment 200 that may include the personal processing device 104, the output device 110, the fixed storage device 108, the network 202, the host processing device 204, and the host storage device 206. The human user 102 interacts with the personal processing device 104. The personal processing device 104 and the host processing device 204 are both connected to the network 202 and can exchange information with each other via the network 202.

The fixed storage device 108 is not permanently connected to the host processing device 204 because the fixed storage device 108 and the host processing device 204 communicate via the network 202 and the personal processing device 104. There are several normal circumstances in which the host processing device 204 may not be able to read data from the fixed storage device 108 including, but not limited to, the personal processing device 104 being off-line or the personal processing device 104 failing to respond to a query from the host processing device 204.

In contrast, the host storage device 206 is permanently connected to the host processing device 204. The only circumstances in which the host processing device 204 would not be able to read data from the host storage device 206 are if the host processing device 204 and/or the host storage device 206 either malfunction or are reconfigured. Even if the host storage device 206 is a file server, the host storage device 206 is considered to be permanently connected to the host processing device 204 for the purposes of this disclosure.

Disconnecting the host storage device 206 from the host processing device 204 is considered to be a configuration change.

Figure 3:
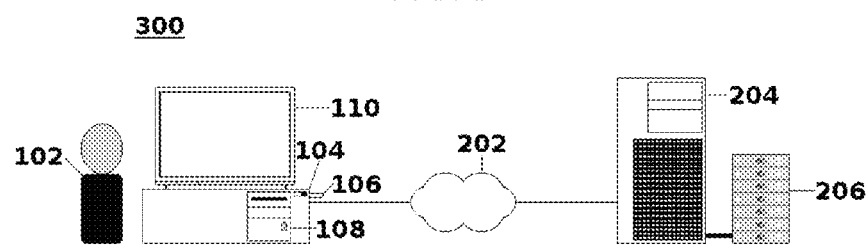

FIG. 3 illustrates an exemplary network plus removable storage device operating environment 300 that is very similar to the network operating environment 200 of FIG. 2 with one addition: the removable storage device 106 is attached to the personal processing device 104. As in the standalone operating environment 100 of FIG. 1, the human user 102 may at times remove the removable storage device 106 from the personal processing device 104.

The removable storage device 106 is not permanently connected to the host processing device 204 because the human user 102 may unplug the removable storage device 106 from the personal processing device 104.

Figure 4:
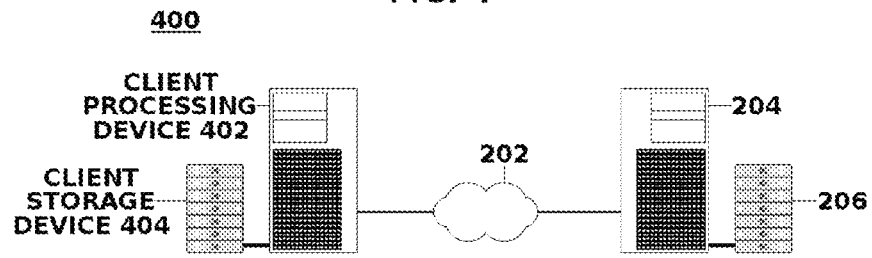

FIG. 4 illustrates an exemplary machine-to-machine operating environment 400 that may include the client processing device 402, the client storage device 404, the network 202, the host processing device 204, and the host storage device 206. The client processing device 402 and the host processing device 204 are both connected to the network 202 and can exchange information with each other via the network 202.

The client storage device 404 is not permanently connected to the host processing device 204 because the client storage device 404 and the host processing device 204 communicate via the network 202 and the client processing device 402. There are several normal circumstances in which the host processing device 204 may not be able to read data from the client storage device 404 including, but not limited to, the client processing device 402 being off-line or the client processing device 402 failing to respond to a query from the host processing device 204.

Figure 5:
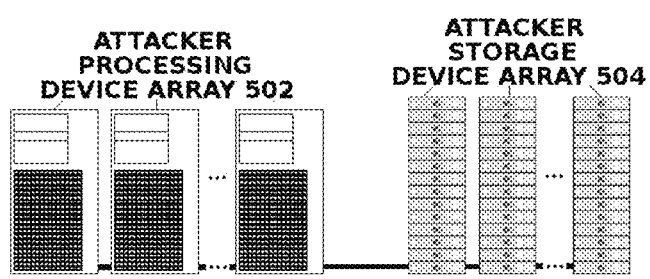

FIG. 5 illustrates an exemplary attack operating environment 500 that may include the attacker processing device array 502 and the attacker storage device array 504.

FIG. 6 is a functional block diagram that illustrates exemplary processing device 600, which may be used to implement the personal processing device 104, the host processing device 204, the client processing device 402, a processing device that is a component of the attacker processing device array 502, or any combination of these devices. The processing device 600 may include a bus 610, a processor 620, a memory 630, a read-only memory (ROM) 640, a storage device 650, an input device 660, an output device 670, and a communication interface 680. The bus 610 may permit communication among components of the processing device 600.

The processor 620 may include at least one conventional processor or microprocessor that interprets and executes instructions. The memory 630 may be a random access memory (RAM) or another type of dynamic storage device that stores information and instructions for execution by the processor 620. The memory 630 may also store temporary variables or other intermediate information used during execution of instructions by the processor 620. The ROM 640 may include a conventional ROM device or another type of static storage device that stores static information and instructions for the processor 620. The storage device 650 may include any type of non-transitory computer-readable medium for storing data and/or instructions.

The input device 660 may include one or more conventional mechanisms that permit a user to input information to the processing device 600, such as, for example, a keyboard, a mouse, a touch screen, an electronic pen, a microphone or other input device. The output device 670 may include one or more conventional mechanisms that output information to the user, including a display, a printer, or other output device. The communication interface 680 may include any transceiver-like mechanism that enable the processing device 600 to communicate with other devices or networks. The communication interface 680 may include an interface to the network 202.

The processing device 600 may perform such functions in response to the processor 620 executing sequences of instructions contained in a non-transitory computer-readable medium, such as, for example, memory 630, or other non-transitory computer-readable medium. Such instructions may be read into the memory 630 from another computer-readable non-transitory medium, such as the storage device 650, or from a separate device via the communication interface 680.

Overview

A host processing device, which may include, but not be limited to, a personal computer or a web server, may host accounts for one or more users. When a user attempts to log in to his/her/its account, he/she/it provides a user name and a trial password to the host processing device. The host processing device then obtains a password verification data set for the user and provides the password verification data set and the trial password to a password authentication method. If the password authentication method returns a success indicator, the user is granted access to his/her/its account. If the password authentication method returns a failure indicator, the user is not granted access to his/her/its account.

An attacker who breaks into the host processing device may steal the user's password verification data set (or password verification data sets for all users). The attacker may also learn methods by which the host processing device authenticates passwords. The attacker may then use the stolen password verification data sets and the learned methods on his/her own processing devices to try to crack the user's password.

To make the cracking of the user's password more difficult, embodiments of the invention divide the user's password verification data set into a central password verification data subset and a remote password verification data subset. The central password verification data subset is stored in a central storage device that is permanently connected to the host processing device, and the remote password verification data subset is stored in a remote storage device that is not permanently connected to the host processing device. For example, the remote password verification data subset may be stored in a user's storage device, such as a fixed or removable storage device, or on a remote file server that is not permanently connected to the host processing device. The host processing device may not be able to obtain the user's remote password verification data subset unless the remote password verification data subset is provided to the host processing device when the user attempts to log in to his/her/its account.

If the host processing device is able to obtain the user's remote password verification data subset, then the processing device may construct a first data set from the remote password verification data subset and the user's central password verification data subset. The first data set and the trial password may be provided to a first password authentication method that yields a result quickly, typically in less than a second. If the host processing device cannot obtain the user's remote password verification data subset, then the processing device may construct a second data set including only data elements from the user's central password verification data subset. The second data set and the trial password may be provided to a second password authentication method that takes longer to produce a result than the first password authentication method, typically seconds or tens of seconds.

Because the password verification data set is distributed on multiple storage devices, the attacker who breaks into the host processing device may only be able to obtain the user's central password verification data subset, but not the user's remote password verification data subset. Without the remote password verification data subset, the attacker uses the second password authentication method on a series of millions or billions of trial passwords. If authenticating each trial password in the series takes seconds rather than fractions of a second, then cracking the user's password may take months or years rather than minutes or hours.

The first password authentication method is referred to herein as a quick password authentication method, and the first data set is referred to herein as a quick password verification data subset. At least one data element of the quick password verification data subset may belong to the central password verification data subset, and at least one other data element may belong to the remote password verification data subset. The quick password verification data subset may be the same as, or may be a proper subset of, the password verification data set.

The second password authentication method is referred to herein as a slow password authentication method, and the second data set is referred to herein as a slow password verification data subset. The slow password verification data subset is a subset of the central password verification data subset. The slow password verification data subset may be the same as, or may be a proper subset of, the central password verification data subset.

The central password verification data subset may include at least one data element that may be used to verify the authenticity of the remote password verification data subset. The at least one data element may be a hash of a combination of data elements from the remote password verification data subset. If the central password verification data subset does not include the at least one data element, then the attacker may be able to provide a spoofed remote password verification data subset to the processing device that the processing device accepts as valid.

There are many ways to design the password verification data set that is divisible into the central password verification data subset and the remote password verification data subset, and that allow multiple password authentication methods to be used. The exemplary methods include examples of password verification data sets and password authentication methods meeting these criteria.

In some embodiments, a speed ratio of the quick password authentication method with respect to the slow password authentication method may be easy to adjust. An implementer may choose a value of the ratio depending on a speed of the host processing device and an anticipated speed of an attacker's processing device. If the host processing device is fast, then the ratio can be made larger than a ratio suitable for a slower processing device without inconveniencing the user, and thereby making the password verification data set more secure.

Some embodiments define a cryptographic key data set that is used, in conjunction with a password, to generate a cryptographic key. The cryptographic key data set may be based on, and may include same data elements as, the password verification data set. The cryptographic key data set may be divided into a central cryptographic key data subset and a remote cryptographic key data subset wherein the central cryptographic key data subset is stored on a central storage device and the remote cryptographic key data subset is stored on a remote storage device. Some embodiments define a quick cryptographic key data subset that includes data elements from both the central cryptographic key data subset and the remote cryptographic key data subset, a slow cryptographic key data subset that includes data elements from only the central cryptographic key data subset, a quick cryptographic key generation method that accepts a trial password and the quick cryptographic key data subset as inputs, and may generate the cryptographic key more quickly than a slow cryptographic key generation method, typically in less than a second, and the slow cryptographic key generation method that accepts the trial password and the slow cryptographic key data subset as inputs, and may generate the cryptographic key more slowly than the quick cryptographic key generation method, typically in seconds or tens of seconds. The cryptographic key data set may resist attacks that attempt to recover the cryptographic key.

Exemplary Methods

In some embodiments of this disclosure, processes that generate a password verification data set and store data elements of the password verification data set in various storage devices, and processes that use the password verification data set to authenticate a password, operate differently depending on an operating environment of the embodiment. FIGS. 7-30 illustrate how the password verification data set is generated and stored, and how password authentication is performed, in various operating environments.

FIGS. 7-30 refer to a generic method 890, a generic method 1290 and a generic method 1690.

The generic method 890 may generate the password verification data set. Detailed descriptions of exemplary implementations of the generic method 890 are presented in FIGS. 32, 36, 40, 44, 48 and 52.

The generic method 1290 is a generic quick password authentication method. Detailed descriptions of exemplary implementations of the generic method 1290 are presented in FIGS. 33, 37, 41, 45, 49 and 53.

The generic method 1690 is a generic slow password authentication method. Detailed descriptions of exemplary implementations of the generic method 1290 are presented in FIGS. 34, 38, 42, 46, 50 and 54.

FIGS. 7-10

FIGS. 7-10 constitute a storyboard illustrating an exemplary process for generating and storing the password verification data set in the standalone operating environment 100 of FIG. 1. The standalone operating environment 100 differs from the other exemplary operating environments in that the standalone operating environment 100 may include a single processing device, the personal processing device 104. The personal processing device 104 performs two roles in the standalone operating environment 100: the personal processing device 104 accepts some authentication data, that may include a user name 750, a new password 752, and a trial password 1150, from the human user 102, and the personal processing device 104 hosts an account for the human user 102.

In FIGS. 7-10, the human user 102 operates the personal processing device 104 which is connected to the output device 110, the fixed storage device 108, and the removable storage device 106.

FIG. 7 depicts a first panel of the storyboard showing that the human user 102 has entered the user name 750 and the new password 752 into a form displayed on the output device 110. In other embodiments, the user name 750 and the new password 752 may be entered via other input means including, but not limited to, a microphone, a touch screen, a keyboard, etc.

FIG. 8 depicts a second panel of the storyboard that shows the personal processing device 104 starting to perform the generic method 890 that may generate the password verification data set. The personal processing device 104 provides the new password 752 to the method 890 as input.

FIG. 9 depicts a third panel of the storyboard that shows the method 890 finishing and providing two output data sets to the personal processing device 104: a central password verification data subset 956 (CPVDS) and a remote password verification data subset 954 (RPVDS).

FIG. 10 depicts a fourth panel of the storyboard that shows the personal processing device 104 storing the central password verification data subset 956 (CPVDS) in the fixed storage device 108, and storing the remote password verification data subset 954 (RPVDS) in the removable storage device 106. The personal processing device 104 also stores the user name 750 in the fixed storage device 108, and may confirm that the user has successfully created the account by displaying a message on the output device 110.

The standalone operating environment 100 may use at least two storage devices such as the fixed storage device 108 and the removable storage device 106. Without the at least two storage devices, only one storage device, typically the fixed storage device 108, would be available to store both the central password verification data subset 956 (CPVDS) and the remote password verification data subset 954 (RPVDS). Storing both subsets in a same storage device may enable an attacker to steal the user's entire password verification data set. The attacker may then overcome the defenses provided by the various embodiments by using a quick password authentication method in an attack.

FIGS. 11-14

FIGS. 11-14 constitute a storyboard illustrating an exemplary process for using a quick password verification data subset 1250 (QPVDS) to authenticate a trial password 1150 of the human user 102 in the standalone operating environment 100 of FIG. 1. In FIGS. 11-14, the human user 102 operates the personal processing device 104, which is connected to the output device 110 and the fixed storage device 108. The fixed storage device 108 contains the central password verification data subset 956 (CPVDS) belonging to the human user 102, and the removable storage device 106 contains the remote password verification data subset 954 (RPVDS) belonging to the human user 102.

Figure 11:
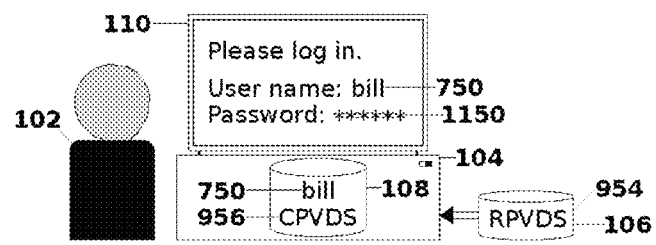

FIG. 11 depicts a first panel of the storyboard showing that the human user 102 has entered the user name 750 and the trial password 1150 (that is identical to the new password 752 that the human user 102 entered in FIG. 7) into a form displayed on the output device 110. In other embodiments, the user name 750 and the trial password 1150 may be entered via other input means including, but not limited to, a microphone, a touch screen, a keyboard, etc.

Figure 12:
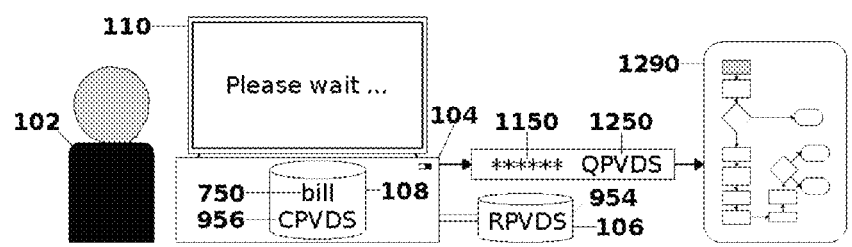

FIG. 12 depicts a second panel of the storyboard that shows the personal processing device 104 starting to perform the generic quick password authentication method 1290. The method 1290 is designed to authenticate a password based on the quick password verification data subset 1250 (QPVDS). The personal processing device 104 reads the remote password verification data subset 954 (RPVDS) from the removable storage device 106, the central password verification data subset 956 (CPVDS) from the fixed storage device 108. Then, the personal processing device 104 constructs the quick password verification data subset 1250 (QPVDS) that combines some data elements from the remote password verification data subset 954 (RPVDS) with some other data elements from the central password verification data subset 956 (CPVDS). Lastly, the personal processing device 104 provides the trial password 1150 and the quick password verification data subset 1250 (QPVDS) as inputs to the method 1290.

Figure 13:
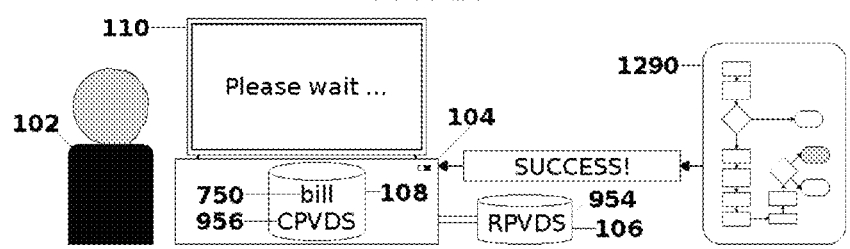

FIG. 13 depicts a third panel of the storyboard that shows the method 1290 finishing and providing a success indicator to the personal processing device 104. If, in FIG. 11, the human user 102 enters the trial password 1150 that is not identical to the new password 752, then the method 1290 may instead provide a failure indicator to the personal processing device 104.

Figure 14:
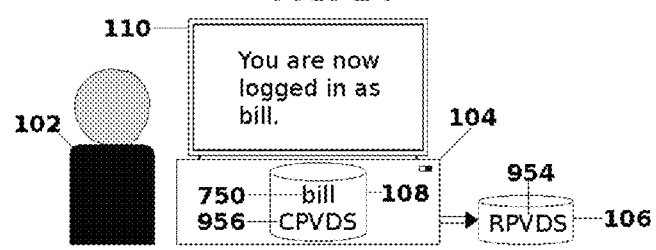

FIG. 14 depicts a fourth panel of the storyboard that shows the personal processing device 104 providing an indication of success to the human user 102. In this exemplary embodiment, the indication of success is provided by displaying a message on the output device 110 confirming that the human user 102 has logged in successfully. If the method 1290 provides the failure indicator to the personal processing device 104, then the personal processing device 104 may provide an indication of failure to the human user 102. In this exemplary embodiment, the indication of failure may be provided to the human user 102 by displaying a login failure message on the output device 110.

FIGS. 15-18

Figure 15:
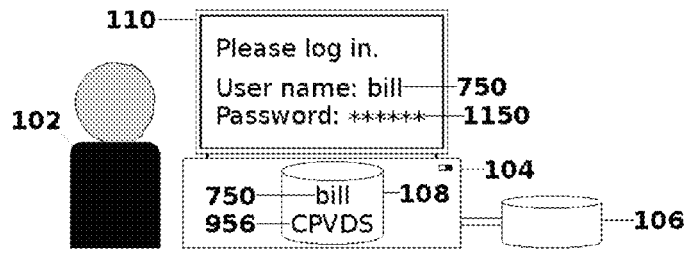
Figure 16:
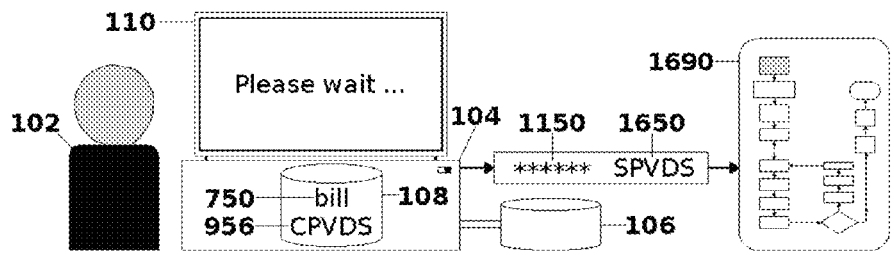
Figure 17:
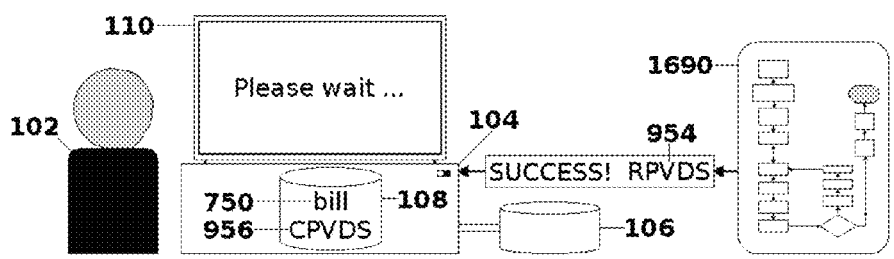

FIGS. 15-18 constitute a storyboard illustrating an exemplary process for using a slow password verification data subset 1650 (SPVDS) to authenticate the trial password 1150 of the human user 102 in the standalone operating environment 100 of FIG. 1. In FIGS. 15-18, the human user 102 operates the personal processing device 104 which is connected to the output device 110, and the fixed storage device 108. The fixed storage device 108 has stored therein the central password verification data subset 956 (CPVDS) belonging to the human user 102. In FIGS. 15-17, the removable storage device 106 does not contain the remote password verification data subset 954 (RPVDS) belonging to the human user 102.

FIG. 15 depicts a first panel of the storyboard showing that the human user 102 has entered the user name 750 and the trial password 1150 (that is identical to the new password 752 that the human user 102 entered in FIG. 7) into a form displayed on the output device 110. In other embodiments, the user name 750 and the trial password 1150 may be entered via other input means including, but not limited to, a microphone, a touch screen, a keyboard, etc.

FIG. 16 depicts a second panel of the storyboard that shows the personal processing device 104 starting to perform the generic slow password authentication method 1690. The method 1690 is designed to authenticate a password based on the slow password verification data subset 1650 (SPVDS). The personal processing device 104 reads the central password verification data subset 956 (CPVDS) from the fixed storage device 108, and constructs the slow password verification data subset 1650 (SPVDS) using some or all data elements from the central password verification data subset 956 (CPVDS). Lastly, the personal processing device 104 provides the trial password 1150 and the slow password verification data subset 1650 (SPVDS) as inputs to the method 1690.

FIG. 17 depicts the third panel of the storyboard that shows the method 1690 finishing and providing two outputs to the personal processing device 104: the success indicator, and a fresh copy of the remote password verification data subset 954 (RPVDS). If, in FIG. 15, the human user 102 provides the trial password 1150 that is not identical to the new password 752, then the method 1690 may instead provide the failure indicator to the personal processing device 104.

Figure 18:
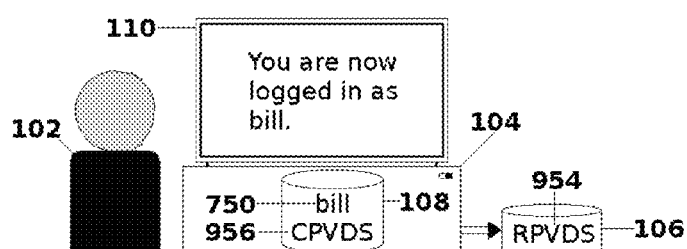

FIG. 18 depicts the fourth panel of the storyboard that shows the personal processing device 104 providing an indication of success to the human user 102. In this exemplary embodiment, the indication of success is provided by displaying a message on the output device 110 confirming that the human user 102 has logged in successfully. The personal processing device 104 also stores the fresh copy of the remote password verification data subset 954 (RPVDS) in the removable storage device 106. If the method 1690 provides the failure indicator to the personal processing device 104, then the personal processing device 104 may provide an indication of failure to the human user 102. In this exemplary embodiment, the indication of failure may be provided to the human user 102 by displaying a login failure message on the output device 110.

Although not shown in FIG. 18, in some embodiments, the personal processing device 104 may also update some data elements of the central password verification data subset 956 (CPVDS) on the fixed storage device 108.

If the human user 102 had removed the removable storage device 106 from the personal processing device 104, then the personal processing device 104 would not have been able to store the fresh copy of the remote password verification data subset 954 (RPVDS) in FIG. 18.

FIGS. 19-22

FIGS. 19-22 constitute a storyboard illustrating an exemplary process for generating and storing the password verification data set in the network operating environment 200 of FIG. 2.

The network operating environment 200 includes at least two processing devices: the personal processing device 104 with which the human user 102 interacts directly, and the host processing device 204 that hosts the human user's account.

In FIGS. 19-22, the human user 102 operates the personal processing device 104, which is connected to the output device 110, the fixed storage device 108, and the network 202. The host processing device 204 is connected to the network 202. The host storage device 206 is permanently connected to the host processing device 204. The personal processing device 104 and the host processing device 204 can exchange information via the network 202.

Figure 19:
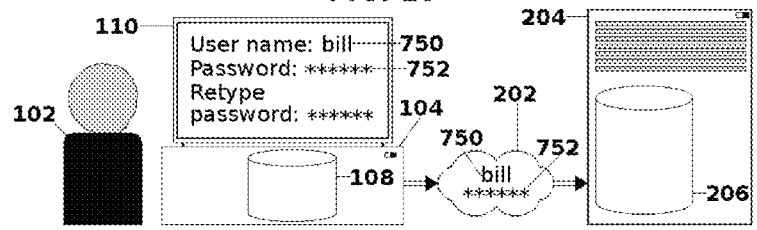

FIG. 19 depicts a first panel of the storyboard showing that the human user 102 has entered the user name 750 and the new password 752 into a form displayed on the output device 110. In other embodiments, the user name 750 and the new password 752 may be entered via other input means including, but not limited to, a microphone, a touch screen, a keyboard, etc. The personal processing device 104 transmits the user name 750 and the new password 752 via the network 202 to the host processing device 204.

Figure 20:
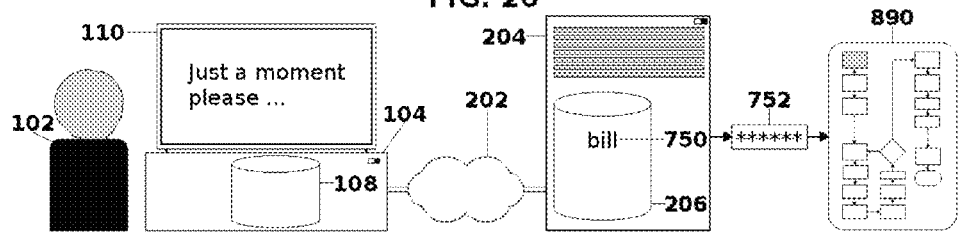

FIG. 20 depicts a second panel of the storyboard that shows the host processing device 204 starting to perform the generic method 890 that may generate the password verification data set. The host processing device 204 provides the new password 752 to the method 890 as input, and stores the user name 750 in the host storage device 206.

Figure 21:
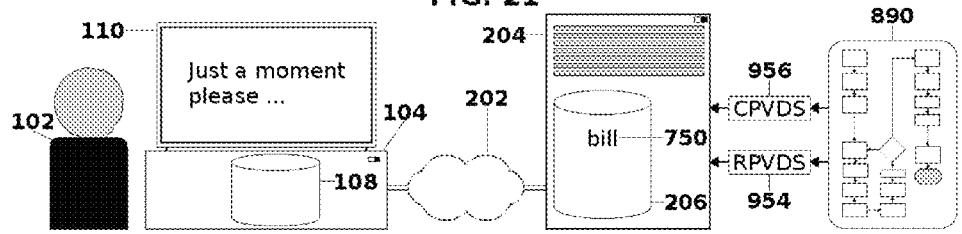

FIG. 21 depicts a third panel of the storyboard that shows the method 890 finishing and providing two data sets to the host processing device 204: the central password verification data subset 956 (CPVDS) and the remote password verification data subset 954 (RPVDS).

Figure 22:
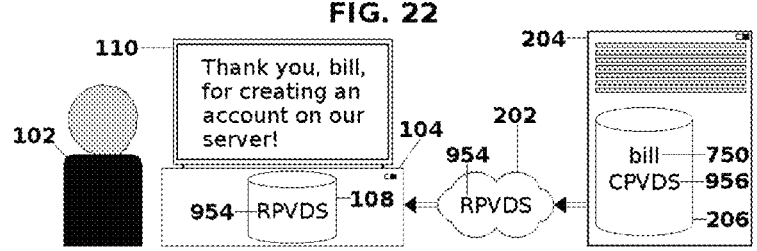

FIG. 22 depicts a fourth panel of the storyboard that shows the host processing device 204 storing the central password verification data subset 956 (CPVDS) in the host storage device 206, and transmitting the remote password verification data subset 954 (RPVDS) via the network 202 to the personal processing device 104. The personal processing device 104 stores the remote password verification data subset 954 (RPVDS) in the fixed storage device 108, and confirms that the human user 102 has successfully created the account by displaying a message on the output device 110.

In a first similar embodiment, an exemplary process for generating and storing the password verification data set in the network plus removable storage device operating environment 300 of FIG. 3 differs in only one respect from the process illustrated in FIGS. 19-22: the personal processing device 104 stores the remote password verification data subset 954 in the removable storage device 106 instead of in the fixed storage device 108.

In a second similar embodiment, an exemplary process for generating and storing a password verification data set in the machine-to-machine environment 400 of FIG. 4 differs from the process illustrated in FIGS. 19-22 in two respects:

the user name 750 and the new password 752 are sent from the client processing device 402 instead of from the personal processing device 104; and the client processing device 402 stores the remote password verification data subset 954 (RPVDS) in the client storage device 404 instead of the personal processing device 104 storing the remote password verification data subset 954 (RPVDS) in the fixed storage device 108.

FIGS. 23-26

FIGS. 23-26 constitute a storyboard illustrating an exemplary process for using the quick password verification data subset 1250 (QPVDS) to authenticate the trial password 1150 of the human user 102 in the network operating environment 200 of FIG. 2. In FIGS. 23-26, the human user 102 operates the personal processing device 104, which is connected to the output device 110, the fixed storage device 108, and the network 202. The host processing device 204 is connected to the network 202. The host storage device 206 is permanently connected to the host processing device 204. The personal processing device 104 and the host processing device 204 can exchange information via the network 202. The host storage device 206 has stored therein the central password verification data subset 956 (CPVDS) belonging to the human user 102, and the fixed storage device 108 has stored therein the remote password verification data subset 954 (RPVDS) belonging to the human user 102.

Figure 23:
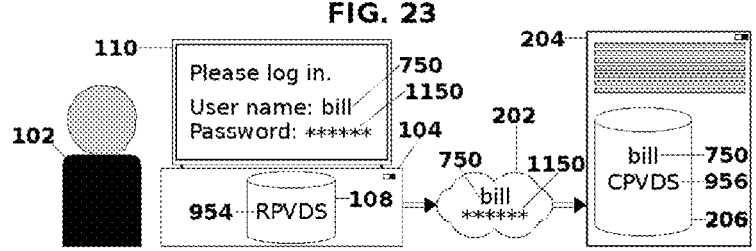

FIG. 23 depicts a first panel of the storyboard showing that the human user 102 has entered the user name 750 and the trial password 1150 (that is identical to the new password 752 that the human user 102 entered in FIG. 19) into a form displayed on the output device 110. In other embodiments, the user name 750 and the trial password 1150 may be entered via other input means including, but not limited to, a microphone, a touch screen, a keyboard, etc. The personal processing device 104 transmits the user name 750 and the trial password 1150 via the network 202 to the host processing device 204.

Figure 24:
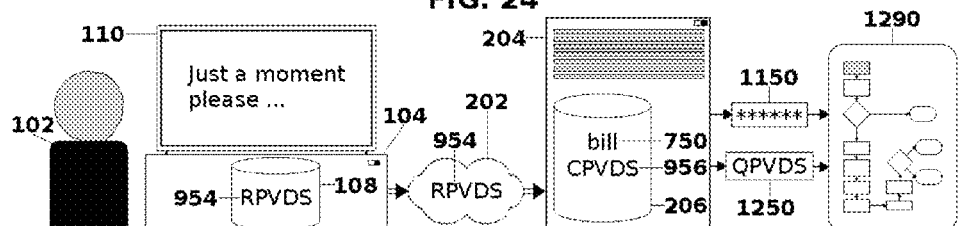

FIG. 24 depicts a second panel of the storyboard that shows the host processing device 204 starting to perform the generic quick password authentication method 1290. The personal processing device reads the remote password verification data subset 954 (RPVDS) from the fixed storage device 108, and transmits the remote password verification data subset 954 (RPVDS) via the network 202 to the host processing device 204. The host processing device 204 receives the remote password verification data subset 954 (RPVDS) sent by the personal processing device, reads the central password verification data subset 956 (CPVDS) from the host storage device 206, and constructs the quick password verification data subset 1250 (QPVDS) using some data elements from the remote password verification data subset 954 (RPVDS)

and some other data elements from the central password verification data subset 956 (CPVDS). Lastly, the host processing device 204 provides the trial password 1150 and the quick password verification data subset 1250 (QPVDS) as inputs to the method 1290.

Figure 25:
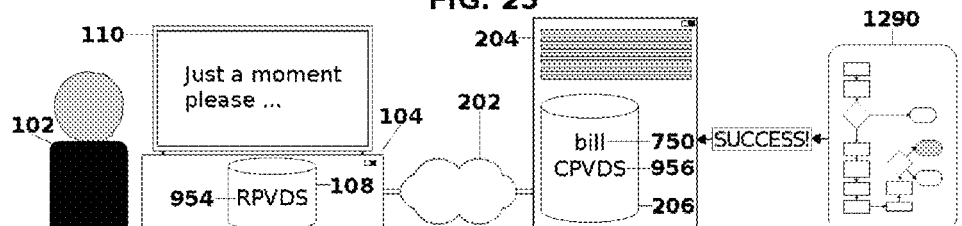

FIG. 25 depicts a third panel of the storyboard that shows the method 1290 finishing and providing the success indicator to the host processing device 204. If, in FIG. 23, the human user 102 provides the trial password 1150 that is not identical to the new password 752, then the method 1290 may instead provide the failure indicator to the host processing device 204.

Figure 26:
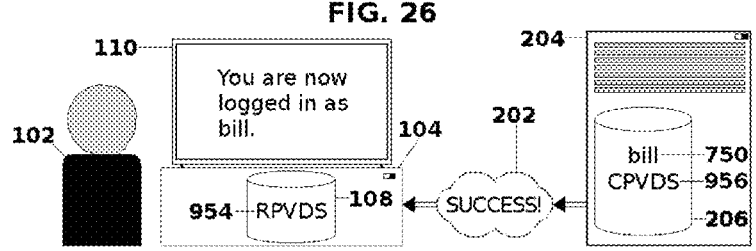

FIG. 26 depicts a fourth panel of the storyboard that shows the host processing device 204 transmitting the success indicator via the network 202 to the personal processing device 104. The personal processing device 104 may then provide an indication of success to the human user 102. In this exemplary embodiment, the indication of success is provided by displaying a message on the output device 110 confirming that the human user 102 has logged in successfully. If the host processing device 204 transmits the failure indicator via the network 202 to the personal processing device 104, then the personal processing device 104 may provide an indication of failure to the human user 102. In this embodiment, the indication of failure may be provided by displaying a login failure message on the output device 110.

In the first similar embodiment, an exemplary process for using the quick password verification data subset 1250 (QPVDS) to authenticate the trial password 1150 of the human user 102 in the network plus removable storage device operating environment 300 of FIG. 3 differs in only one respect from the process illustrated in FIGS. 23-26: the personal processing device 104 reads the remote password verification data subset 954 (RPVDS) from the removable storage device 106.

In the second similar embodiment, an exemplary process for using the quick password verification data subset 1250 (QPVDS) to authenticate the trial password 1150 of the client processing device 402 in the machine-to-machine environment 400 of FIG. 4 differs from the process illustrated in FIGS. 23-26 in two respects:

the user name 750 and the trial password 1150 are sent from the client processing device 402 instead of from the personal processing device 104; and the client processing device 402 obtains the remote password verification data subset 954 (RPVDS) from the client storage device 404 instead of the personal processing device 104 obtaining the remote password verification data subset 954 (RPVDS) from the fixed storage device 108.

FIGS. 27-30

FIGS. 27-30 constitute a storyboard illustrating an exemplary process for using the slow password verification data subset 1650 to authenticate the trial password 1150 of the human user 102 in the network operating environment 200 of FIG. 2. In FIGS. 27-30, the human user 102 operates the personal processing device 104, which is connected to the output device 110, the fixed storage device 108, and the network 202. The host processing device 204 is connected to the network 202. The host storage device 206 is permanently connected to the host processing device 204. The personal processing device 104 and the host processing device 204 can exchange information via the network 202. The host storage device 206 has stored therein the central password verification data subset 956 (CPVDS) belonging to the human user 102. The fixed storage device 108 does not contain the remote password verification data subset 954 (RPVDS) belonging to the human user 102 in FIGS. 27-29.

Figure 27:
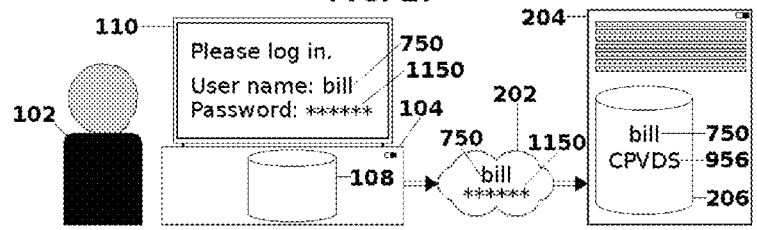

FIG. 27 depicts a first panel of the storyboard showing that the human user 102 has entered the user name 750 and the trial password 1150 (that is identical to the new password 752 that the human user 102 entered in FIG. 19) into a form displayed on the output device 110. In other embodiments, the user name 750 and the trial password 1150 may be entered via other input means including, but not limited to, a microphone, a touch screen, a keyboard, etc. The personal processing device 104 transmits the user name 750 and the trial password 1150 via the network 202 to the host processing device 204.

Figure 28:
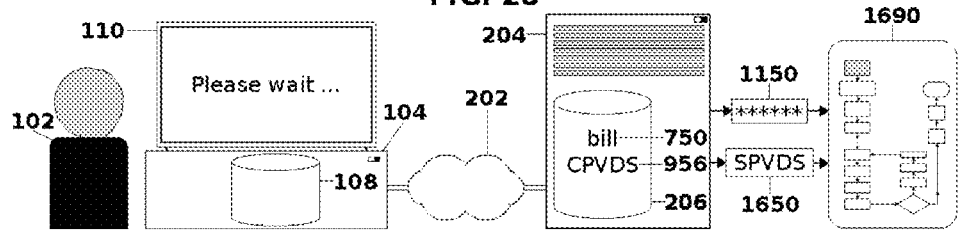

FIG. 28 depicts a second panel of the storyboard that shows the host processing device 204 starting to perform the generic slow password authentication method 1690. The host processing device 204 reads the central password verification data subset 956 (CPVDS) from the host storage device 206 and constructs the slow password verification data subset 1650 (SPVDS) using some (possibly all) of the data elements from the central password verification data subset 956 (CPVDS). Lastly, the host processing device 204 provides the trial password 1150 and the slow password verification data subset 1650 (SPVDS) as inputs to the method 1690.

Figure 29:
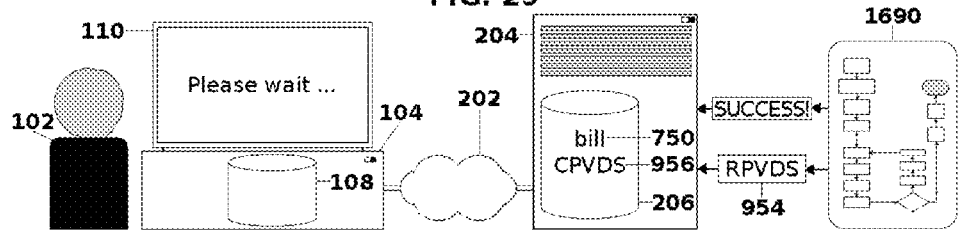

FIG. 29 depicts a third panel of the storyboard that shows the method 1690 finishing and providing the success indicator and a fresh copy of the remote password verification data subset 954 (RPVDS) to the host processing device 204. If, in FIG. 27, the human user 102 provides the trial password 1150 that is not identical to the new password 752, then the method 1690 may instead provide the failure indicator to the host processing device 204.

Figure 30:
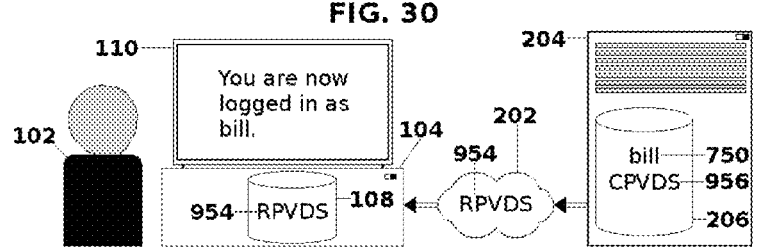

FIG. 30 depicts a fourth panel of the storyboard that shows the host processing device 204 transmitting the success indicator and the fresh copy of the remote password verification data subset 954 (RPVDS) via the network 202 to the personal processing device 104. The personal processing device 104 stores the fresh copy of the remote password verification data subset 954 (RPVDS) on the fixed storage device 108 and may then provide an indication of success to the human user 102. In this exemplary embodiment, the indication of success is provided by displaying a message on the output device 110 confirming that the human user 102 has logged in successfully. If the host processing device 204 transmits the failure indicator via the network 202 to the personal processing device 104, then the personal processing device 104 may provide an indication of failure to the human user 102. In this exemplary embodiment, the indication of failure may be provided to the human user 102 by displaying a login failure message on the output device 110.

Although not shown in FIG. 30, in some embodiments, the host processing device 204 may also update some data elements of the central password verification data subset 956 (CPVDS) that are stored on the central storage device 206.

In the first similar embodiment, an exemplary process for using the slow password verification data subset 1650 (SPVDS) to authenticate the trial password 1150 of the human user 102 in the network plus removable storage device operating environment 300 of FIG. 3 differs in only one respect from the process illustrated in FIGS. 27-30: the personal processing device 104 stores the fresh copy of the remote password verification data subset 954 (RPVDS) in the removable storage device 106, instead of storing the fresh copy of the remote password verification data subset 954 (RPVDS) in the fixed storage device 108.

In the second similar embodiment, an exemplary process for using the slow password verification data subset 1650 (SPVDS) to authenticate the trial password 1150 of the client processing device 402 in the machine-to-machine environment 400 of FIG. 4 differs from the process illustrated in FIGS. 27-30 in three respects:

- the user name 750 and the trial password 1150 are sent from the client processing device 402 instead of from the personal processing device 104;
- the client storage device 404 (instead of the fixed storage device 108) lacks the remote password verification data subset 954 (RPVDS); and
- the client processing device 402 stores the fresh copy of the remote password verification data subset 954 (RPVDS) in the client storage device 404 instead of the personal processing device 104 storing it in the fixed storage device 108.

The six storyboards of FIGS. 7-10, FIGS. 11-14, FIGS. 15-18, FIGS. 19-22, FIGS. 23-26, and FIGS. 27-30, refer to the password verification data set, the generic method 890 that may generate a password verification data set, the generic quick password authentication method 1290, and the generic slow password authentication method 1690. FIGS. 31-53 illustrate exemplary password verification data sets, exemplary methods that generate a password verification data set, exemplary quick password authentication methods, and exemplary slow password authentication methods. The FIGS. 31-53 are a series of four related figures: FIGS. 31-34, FIGS. 35-38, FIGS. 39-42, FIGS. 43-46, FIGS. 47-50, and FIGS. 51-54. In each set of four related figures, the first figure illustrates a specific password verification data set, the second figure illustrates a specific method that may generate the specific password verification data set, the third figure illustrates a specific quick password authentication method using the specific password verification data set, and the fourth figure illustrates a specific slow password authentication method using the specific password verification data set. The specific password verification data set, the specific method that may generate the specific password verification data set, the specific quick password authentication method, and the specific slow password authentication method from any one set of the sets of four related figures can be substituted for the password verification data set, the generic method 890, the generic method 1290, and the generic method 1690 in the six storyboards.

Common Features of FIGS. 31-59

Some of the exemplary data sets and methods illustrated in FIGS. 31-59 share common features described in the following paragraphs.

Various exemplary methods for generating password verification data sets and for authenticating passwords may be invoked through an interaction between a user, who/that is either creating an account or is seeking to access an existing account, and a processing device that hosts the user's account. In the standalone operating environment 100 of FIG. 1, the network operating environment 200 of FIG. 2, and the network plus removable storage device operating environment 300 of FIG. 3, the user may be the human user 102. In the machine-to-machine operating environment 400 of FIG. 4, the user may be the client processing device 402. In the standalone operating environment 100 of FIG. 1, the processing device that hosts the user's account may be the personal processing device 104. In the network operating environment 200 of FIG. 2, the network plus removable storage device operating environment 300 of FIG. 3, and the machine-to-machine operating environment 400 of FIG. 4, the processing device that hosts the user's account may be the host processing device 204.

Some exemplary password verification data sets include one or more salts. The one or more salts are strings of bits or characters. In some embodiments, the one or more salts may have a same length (number of characters or bits) for every user, and in other embodiments, the one or more salts may have a different length for some users. In some embodiments, a password verification data set may include two or more salts. The salts may each have a same length or different lengths. A longer one or more salts, as opposed to a shorter one or more salts, may make a password verification data set, to which the one or more salts belongs, more resistant to attacks. With modern processing devices available to an attacker, a salt having two 8-bit characters is too short to provide much protection from the attacker. An eight-character salt provides some protection from the attacker, and a 16- or more character salt provides adequate protection from the attacker. For a processing device that hosts the user's accounts, a longer one or more salts requires a small amount of additional storage space than a shorter one or more salts, and some methods that generate the longer one or more salts, and other methods that use the longer one or more salts to authenticate passwords, execute somewhat more slowly than some similar methods that generate the shorter one or more salts, and other similar methods that use the shorter one or more salts to authenticate passwords.

In some embodiments, the one or more salts may be generated by a random number generator in such a way that either no two users have a same salt value, or that a probability that two users have the same salt value is exceedingly low.

Some exemplary password verification data sets include one or more hashes. A hash of the one or more hashes may be generated by calculating a result of a one-way function, which may include, but not be limited to, a standard one-way function such as MD5, SHA-1, SHA-256 or SHA-512. In some embodiments, the one-way function is called repeatedly in a loop and the hash is generated from a final output of the one-way function during a last iteration of the loop. Generating a hash by calling the one-way function repeatedly makes a password verification data set to which the hash belongs more resistant to attacks by causing an attacker to perform more computations when attempting to crack a password.

In some figures, exemplary password verification data sets are depicted with exemplary values of salts and hashes. The exemplary values of salts and hashes in some of the figures are base64-encoded character strings. Although, in some embodiments, other encoding methods may be employed.

Some exemplary methods for generating password verification data sets and some exemplary methods for authenticating passwords may combine two or more data elements. For example, a salt and a trial password may be combined in the process of authenticating a trial password. There are many ways to combine two or more data elements, including, but not limited to, concatenating the two or more data elements, interleaving the characters of the two or more data elements, or performing an arithmetic operation such as multiplication or a logical operation such as exclusive or on the two or more data elements. If a method for combining two or more data elements is used to generate a password verification data set, then a same method is used when using the password verification data set to authenticate a trial password.

An exemplary password verification data set may include a RPVDS hash 3156. The RPVDS hash is based on one or more data elements from the remote password verification data subset 954. The one or more data elements are called herein RPVDS hash constituent data elements. When the password verification data set is generated, a value for the RPVDS hash 3156 may be obtained from a result of the one-way function applied to a combination of the RPVDS hash constituent data elements. The value of the RPVDS hash 3156 may be stored in the central password verification data subset 956. When a processing device performs the quick password verification method and obtains the RPVDS hash constituent data elements from the remote password verification data subset 954, the processing device may verify the authenticity of the obtained RPVDS hash constituent data elements by calculating a result of the one-way function applied to a combination of the obtained RPVDS hash constituent data elements and comparing the calculated result to the value of the RPVDS hash 3156 stored in the central password verification data subset 956. If the processing device determines that the calculated result is different than the stored value of the RPVDS hash 3156, then the quick password authentication process may return the failure indicator. If an attacker attempts to log in and makes up values for (spoofs) the remote password verification data subset 956, then a result of the one-way function applied to a combination of the attacker's spoofed RPVDS hash constituent data elements will almost certainly be different than the stored value of the RPVDS hash 3156 causing password authentication to fail.

Some exemplary methods for generating and storing the password verification data set and authenticating the trial password 1150 may transmit sensitive data via a network. The sensitive data may include the new password 752, the trial password 1150, and the remote password verification data subset 954. To prevent an attacker from intercepting the sensitive data, the sensitive data may be encrypted before being transmitted by using a well-known protocol such as secure-sockets layer (SSL). Other secure communications protocols may be used to encrypt the sensitive data in other embodiments.

When a processing device finishes executing an exemplary method for generating the password verification data set, the processing device may store the central password verification data subset 956 in the central storage device, and the processing device may store the remote password verification data subset 954 in the remote storage device. In the network operating environment 200 of FIG. 2, the network plus removable storage device operating environment 300 of FIG. 3, and the machine-to-machine operating environment 400 of FIG. 4, the processing device may transmit the remote password verification data subset 954 via the network 202 to the personal processing device 104 or the client processing device 402. The personal processing device 104 or the client processing device 402 may then store the remote password verification data subset 954 in an appropriate storage device.

An instance of the password verification data set, an instance of the central password verification data subset 956, and an instance of the remote password verification data subset 954, may each be associated with the user name 750. When the user attempts to log in, he/she/it provides the user name 750 and the trial password 1150. A processing device that performs the password authentication process may look up the central password verification data subset 956 and the remote password verification data subset 954 employing the user name 750 as a key during the two lookups. Depending on an operating environment in which the password authentication process takes place, the processing device may look up the remote password verification data subset 954 in a storage device, the processing device may receive the remote password verification data subset 954 via the network 202 together with the user name 750 and the trial password 1150, or the processing device may request the remote password verification data subset 954 via the network 202 and may receive the remote password verification data subset 954 separately from the user name 750 and the trial password 1150. The lookup of the remote password verification data subset 954 may succeed or fail.

The implementer of some exemplary methods for generating and storing password verification data sets and for authenticating passwords may determine values of some parameters and functions to be used within the methods. A choice of values for some of the parameters and functions may cause the methods to take longer to execute and may make the resulting password verification data sets more resistant to attack. The choice of values for some of the parameters and functions may depend on processing speed of a processing device that hosts the user's account, severity of a threat of attack, and computational resources that attackers are expected to possess.

The sets of figures FIGS. 31-34, FIGS. 35-38, FIGS. 39-42, FIGS. 43-46, FIGS. 47-50 and FIGS. 51-54 are all closely related. In each set, a first figure depicts a specific password verification data set and four of its subsets: the remote password verification data subset 954, the central password verification data subset 956, the quick password verification data subset 1250 and the slow password verification data subset 1650. A second figure depicts a method that may generate the password verification data set. A third figure depicts a method that may authenticate the trial password 1150 based on the quick password verification data subset 1250. A fourth figure depicts a method that may authenticate the trial password 1150 based on the slow password verification data subset 1650.

In the embodiments depicted in each set of four figures, a same processing device may perform the three methods depicted in the second, third and fourth figures. In other embodiments, different processing devices may perform the three methods.

FIG. 31

Figure 31:
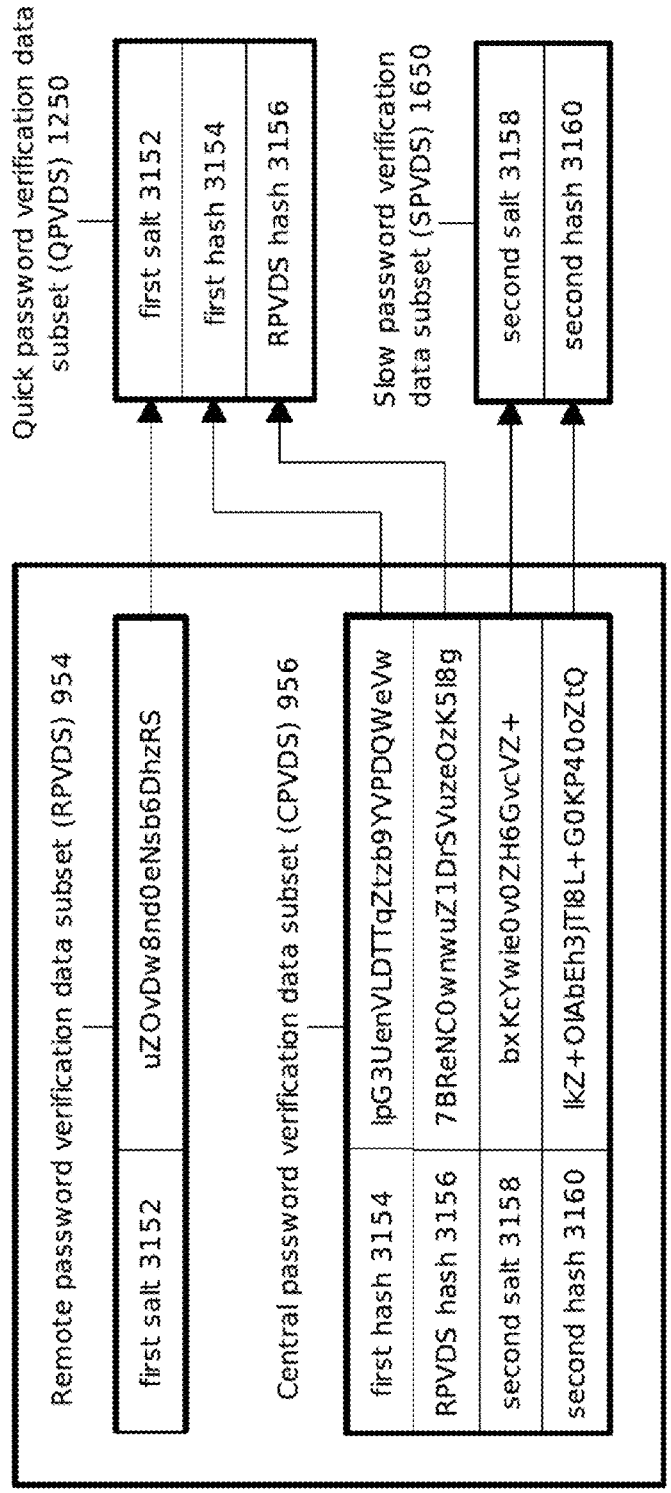
FIG. 31 illustrates a first exemplary password verification data set 3150.

FIG. 31 illustrates an exemplary password verification data set 3150 that may be used by a processing device when performing a password authentication method consistent with the subject matter of this disclosure. The password verification data set 3150 includes five elements: a first salt 3152, a first hash 3154, a second salt 3158, a second hash 3160 and a RPVDS hash 3156.

FIG. 31 shows an exemplary value for the first salt 3152, "uZOvDw8nd0eNsb6DhzRS", an exemplary value for the first hash 3154, "IpG3UenVLDTTqZtzb9YVPDQWeVw", an exemplary value for the second salt 3158, "bxKcYwie0v0ZH6GvcVZ+", an exemplary value for the second hash 3160, "lkZ+OIAbEh3jTI8L+G0KP40oZtQ", and an exemplary value for the RPVDS hash 3156, "7BReNC0wnwuZ1DrSVuzeOzK518g". The five exemplary values shown in FIG. 31 are all base64-encoded strings. Although, other encoding methods may be employed in other implementations.

The password verification data set 3150 may be divided into the central password verification data subset 956 and the remote password verification data subset 954. The central password verification data subset 956 may include the first hash 3154, the second salt 3158, the second hash 3160 and the RPVDS hash 3156. The remote password verification data subset 954 may include the first salt 3152. When a user attempts to log in and the remote password verification data subset 954 is available, the processing device may construct the quick password verification data subset 1250 including the first salt 3152, the first hash 3154 and the RPVDS hash 3156, and executes a quick password authentication method 3390 depicted in FIG. 33. When the user attempts to log in and the remote password verification data subset 954 is not available, the processing device may construct the slow password verification data subset 1650 including the second salt 3158 and the second hash 3160, and may execute a slow password authentication method 3490 depicted in FIG. 34.

FIG. 32

Figure 32:
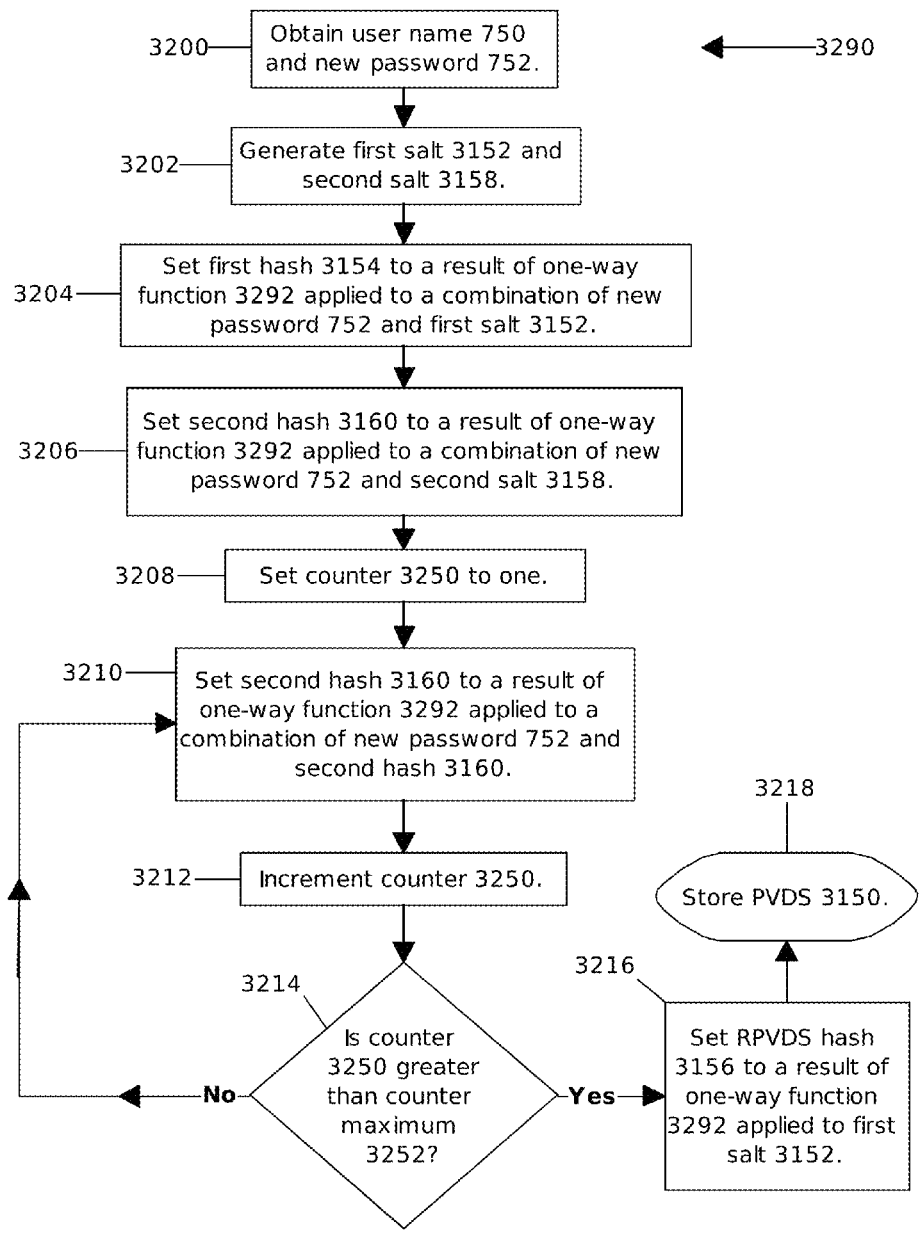
FIG. 32 is a flowchart that illustrates a method 3290 for generating the password verification data set 3150 of FIG. 31.

FIG. 32 illustrates an exemplary method 3290 that may be used by the processing device to generate the password verification data set 3150 for the user.

The processing device may start performing the method 3290 by obtaining the user name 750 and the new password 752 from the user (act 3200). Then, the processing device may generate the first salt 3152 and the second salt 3158 (act 3202). Then, the processing device may set the first hash 3154 to a result of a one-way function 3292 applied to a combination of the new password 752 and the first salt 3152 (act 3204). Then, the processing device may set the second hash 3160 to a result of the one-way function 3292 applied to a combination of the new password 752 and the second salt 3158 (act 3206). Then, the processing device may set a counter 3250 to one (act 3208). Then, the processing device may execute a loop. As its first action in the loop, the processing device may set the second hash 3160 to a result of the one-way function 3292 applied to the combination of the new password 752 and the second hash 3160 (act 3210). Then, the processing device may increment the counter 3250 (act 3212). Then, the processing device may determine whether the counter 3250 is greater than a counter maximum 3252 (act 3214). If the counter 3250 is not greater than the counter maximum 3252, then the processing device may remain in the loop and return to act 3210. If the counter 3250 is greater than the counter maximum 3252, then the processing device may leave the loop and proceed to act 3216. At act 3216, the processing device may set the RPVDS hash 3156 to a result of the one-way function 3292 applied to the first salt 3152. Then, the processing device may store the password verification data set 3150 (PVDS) as described in the section of this disclosure titled COMMON FEATURES OF FIGS. 31-59 (act 3218), and the method 3290 may terminate.

Before implementing the method 3290, an implementer may make some determinations:
  a one-way function to use for the one-way function 3292;
  a number of characters or bits that the first salt 3152 and the second salt 3158 include, and a method for generating the salts;
  a method for combining some data elements, including the new password 752 with the first salt 3152, the new password 752 with the second salt 3158, and the new password 752 with the second hash 3160; and
  a value for the counter maximum 3252.

Some factors influencing the determinations 1-3 were discussed in the section of this disclosure titled "COMMON FEATURES OF FIGS. 31-59."

Figure 34:
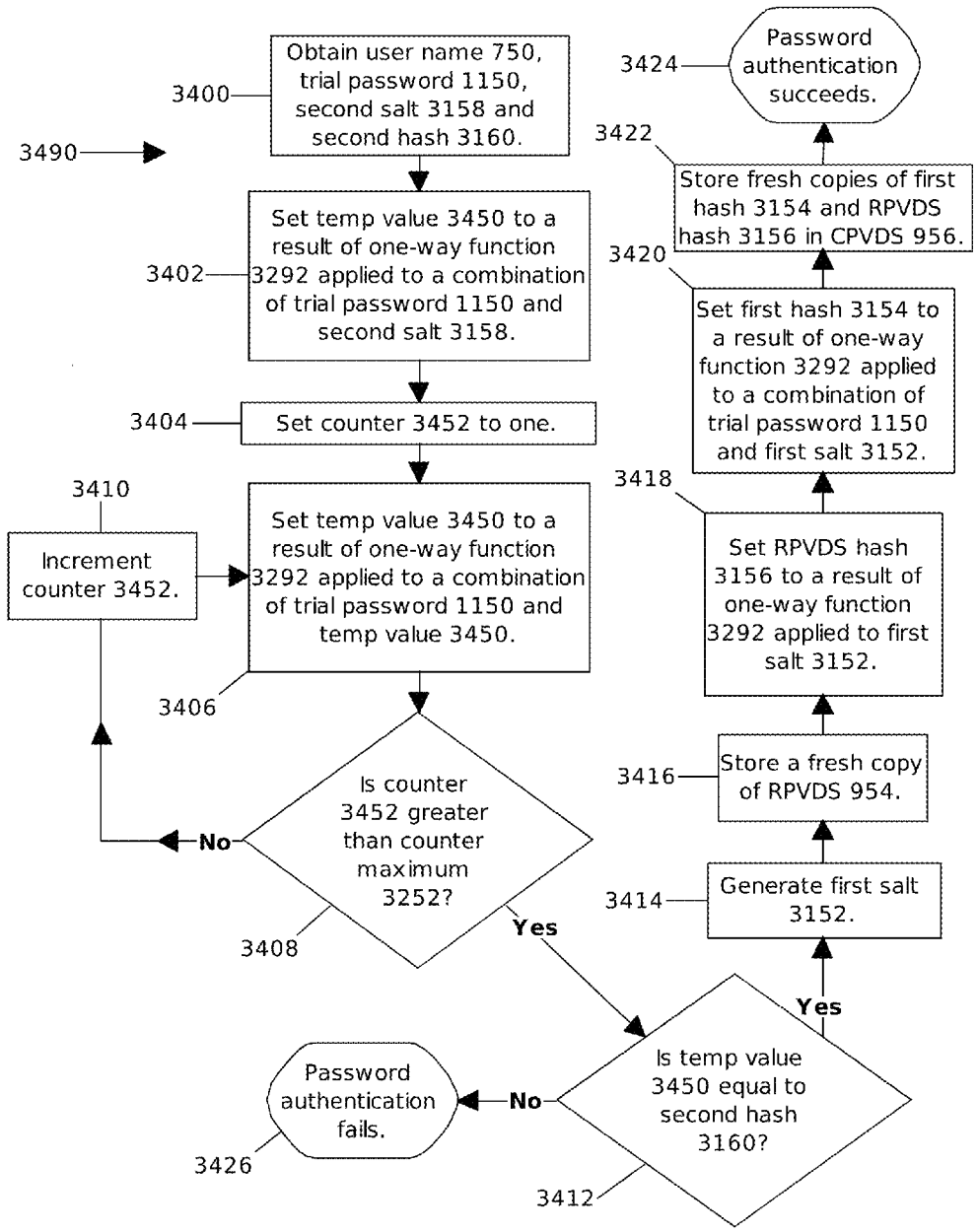
FIG. 34 is a flowchart that illustrates an exemplary slow password authentication method 3490 using the password verification data set 3150 of FIG. 31.

Regarding determination 4, choosing a larger value for the counter maximum 3252, as opposed to choosing a smaller value for the counter maximum 3252, may have the following effects:
  a) the method 3290 may take longer to execute;
  b) the password verification data set 3150 generated by the method 3290 may be more resistant to attacks; and
  c) the method 3490 depicted in FIG. 34, that authenticates the trial password 1150 when the remote password verification data subset 954 is not available, may take longer to execute.

With modern processing devices, some values for the counter maximum 3252 of one hundred thousand to one billion may be considered.

FIG. 33

Figure 33:
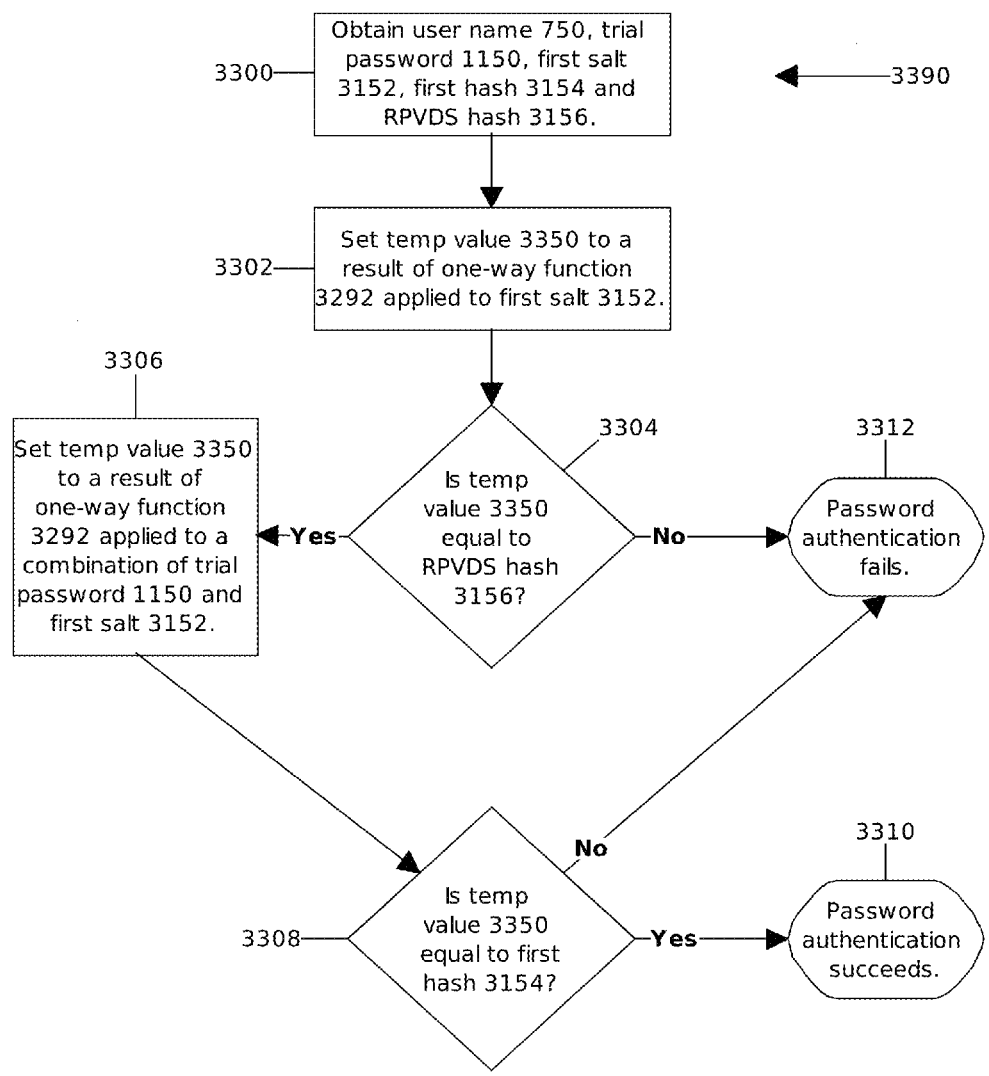
FIG. 33 is a flowchart that illustrates an exemplary quick password authentication method 3390 using the password verification data set 3150 of FIG. 31.

FIG. 33 illustrates the exemplary quick password authentication method 3390 that may be used by the processing device to authenticate the trial password 1150 of the user. The method 3390 may be used if the remote password verification data subset 954, depicted in FIG. 31, is available. If the remote password verification data subset 954 is not available, then the processing device may use the method 3490, depicted in FIG. 34, instead.

The method 3390 may use the quick password verification data subset 1250 of the password verification data set 3150, depicted in FIG. 31.

The processing device may start performing the method 3390 by obtaining the user name 750 and the trial password 1150 from the user, and the quick password verification data subset 1250, including the first salt 3152, the first hash 3154 and the RPVDS hash 3156 (act 3300). The first salt 3152 may be obtained from the remote password verification data subset 954, and the first hash 3154 and the RPVDS hash 3156 may be obtained from the central password verification data subset 956. Then, the processing device may set a temp value 3350 to a result of the one-way function 3292 applied to the first salt 3152 (act 3302). Then, the processing device may determine whether the temp value 3350 is equal to the RPVDS hash 3156 (act 3304). If the temp value 3350 does not equal the RPVDS hash 3156, then the method 3390 may terminate and password authentication fails (act 3312). If the temp value 3350 equals the RPVDS hash 3156, then the processing device may proceed to act 3306. At act 3306, the processing device sets the temp value 3350 to a result of the one-way function 3292 applied to a combination of the trial password 1150 and the first salt 3152. Then, the processing device may determine whether the temp value 3350 is equal to the first hash 3154 (act 3308). If the temp value 3350 equals the first hash 3154, then the method 3390 may terminate and password authentication succeeds (act 3310). If the temp value 3350 does not equal the first hash 3154, then the method 3390 may terminate and password authentication fails (act 3312).

An implementer of the method 3390 uses a same one-way function 3292 as he/she determined to use for the method 3290. In addition, the implementer uses a same method to combine the trial password 1150 with the first salt 3152 as the method he/she determined to use to combine some data elements within the method 3290. The method 3290 is depicted in FIG. 32.

FIG. 34

FIG. 34 illustrates the exemplary slow password authentication method 3490 that may be used by the processing device to authenticate the trial password 1150. The method 3490 may use the slow password verification data subset 1650 of the password verification data set 3150, depicted in FIG. 31.

The processing device may start performing the method 3490 by obtaining the user name 750 and the trial password 1150 from the user, and the slow password verification data subset 1650, including the second salt 3158 and the second hash 3160 (act 3400). The second salt 3158 and the second hash 3160 may be obtained from the central password verification data subset 956. Then, the processing device may set a temp value 3450 to a result of the one-way function 3292 applied to a combination of the trial password 1150 and the second salt 3158 (act 3402). Then, the processing device may set a counter 3452 to one (act 3404). At this point, the processing device may execute a loop. As its first action in the loop, the processing device may set the temp value 3450 to a result of the one-way function 3292 applied to a combination of the trial password 1150 and the temp value 3450 (act 3406). Next, the processing device may determine whether the counter 3452 is greater than the counter maximum 3252 (act 3408). If the counter 3452 is less than or equal to the counter maximum 3252, then the processing device may continue executing the loop and may increment the counter 3452 (act 3410). Next, the processing device may return to the first action of the loop, act 3406. If, at act 3408, the counter 3452 is greater than the counter maximum 3252, then the loop may terminate and the processing device may determine whether the temp value 3450 is equal to the second hash 3160 (act 3412). If the temp value 3450 does not equal the second hash 3160, then the method 3490 may terminate and password authentication fails (act 3426). If the temp value 3450 equals the second hash 3160, then the processing device may proceed to act 3414. At act 3414, the processing device may generate a new value for the first salt 3152. Next, at act 3416, the processing device may attempt to store a fresh copy of the remote password verification data subset 954 (RPVDS). (How the storage operation is performed depends on an operating environment in which the method 3490 is executing.) Then, the processing device may set RPVDS hash 3156 to a result of the one-way function 3292 applied to the fresh value of the first salt 3152 (act 3418). Then, the processing device may set the first hash 3154 to a result of the one-way function 3292 applied to a combination of the trial password 1150 and the new value of the first salt 3152 (act 3420). Then, the processing device may store the new values of the first hash 3154 and the RPVDS hash 3156 in the central password verification data subset 956 (act 3422) Then, the method 3490 may terminate and password authentication succeeds (act 3424).

An implementer of the method 3490 uses the same one-way function 3292 as he/she determined to use for the method 3290. The implementer uses the same method to combine some data elements, including the trial password 1150 with the second salt 3158 and the trial password 1150 with the temp value 3450, as the method he/she determined to use to combine some data elements within the method 3290. In addition, the implementer uses a same value of the counter maximum 3252 as the value that he/she determined to use for the method 3290. The method 3290 is depicted in FIG. 32.

FIG. 35

Figure 35:
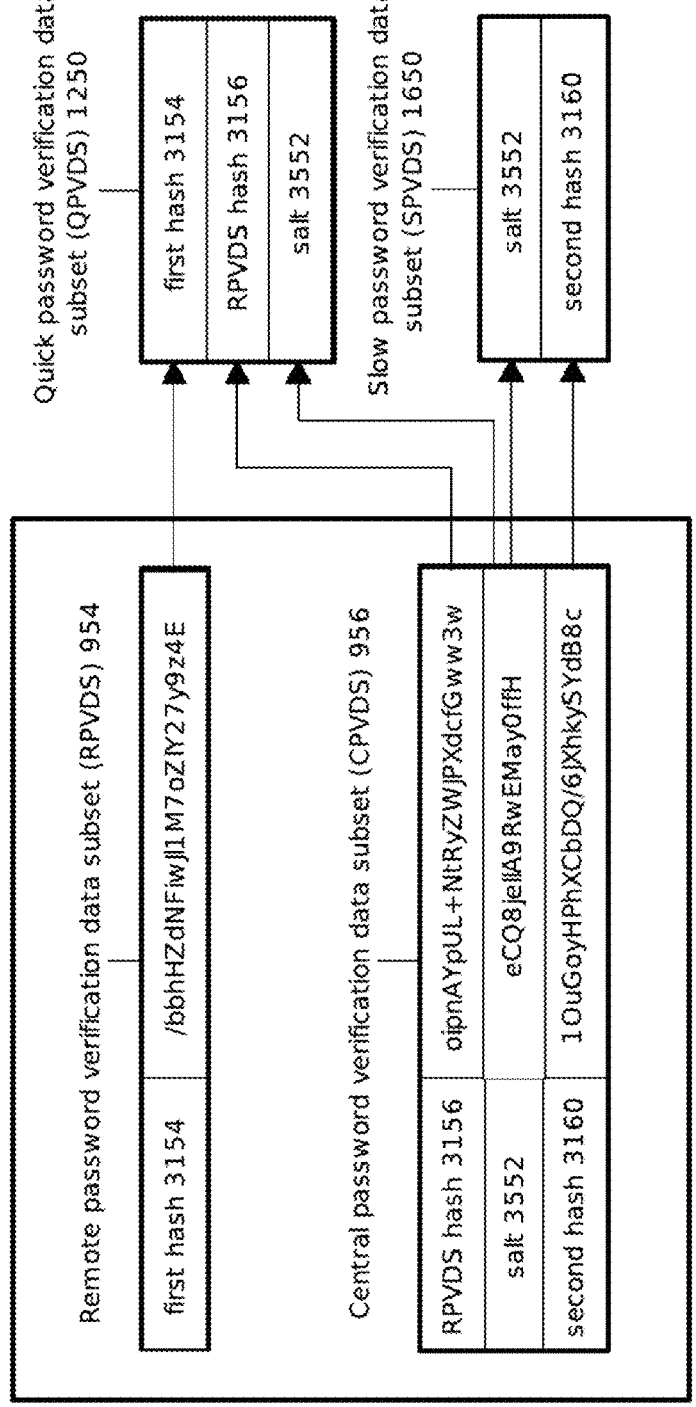
FIG. 35 illustrates a second exemplary password verification data set 3550.

FIG. 35 illustrates an exemplary password verification data set 3550 that may be used by a processing device when performing a password authentication method consistent with the subject matter of this disclosure. The password verification data set 3550 may include four elements: a salt 3552, the first hash 3154, the second hash 3160 and the RPVDS hash 3156.

FIG. 35 shows an exemplary value for the salt 3552, "eCQ8jeIIA9RwEMay0ffH", an exemplary value for the first hash 3154, "/bbhHZdNFiwJl1M7oZlY27y9z4E", an exemplary value for the second hash 3160, "1OuGoyHPhXCbDQ/6JXhkySYdB8c", and an exemplary value for the RPVDS hash 3156, "oipnAYpUL+NtRyZWJPXdcfGww3w". The four exemplary values are all base64-encoded strings. Although, in other embodiments other encoding methods may be employed.

The password verification data set 3550 may be divided into the central password verification data subset 956 and the remote password verification data subset 954. The central password verification data subset 956 includes the salt 3552, the second hash 3160 and the RPVDS hash 3156. The remote password verification data subset 954 includes the first hash 3154. When a user attempts to log in and the remote password verification data subset 954 is available, the processing device may construct the quick password verification data subset 1250 including the salt 3552, the first hash 3154 and the RPVDS hash 3156, and may execute a quick password authentication method 3790 depicted in FIG. 37. When the user attempts to log in and the remote password verification data subset 954 is not available, the processing device may construct the slow password verification data subset 1650 including the salt 3552 and the second hash 3160, and may execute a slow password authentication method 3890 depicted in FIG. 38.

FIG. 36

Figure 36:
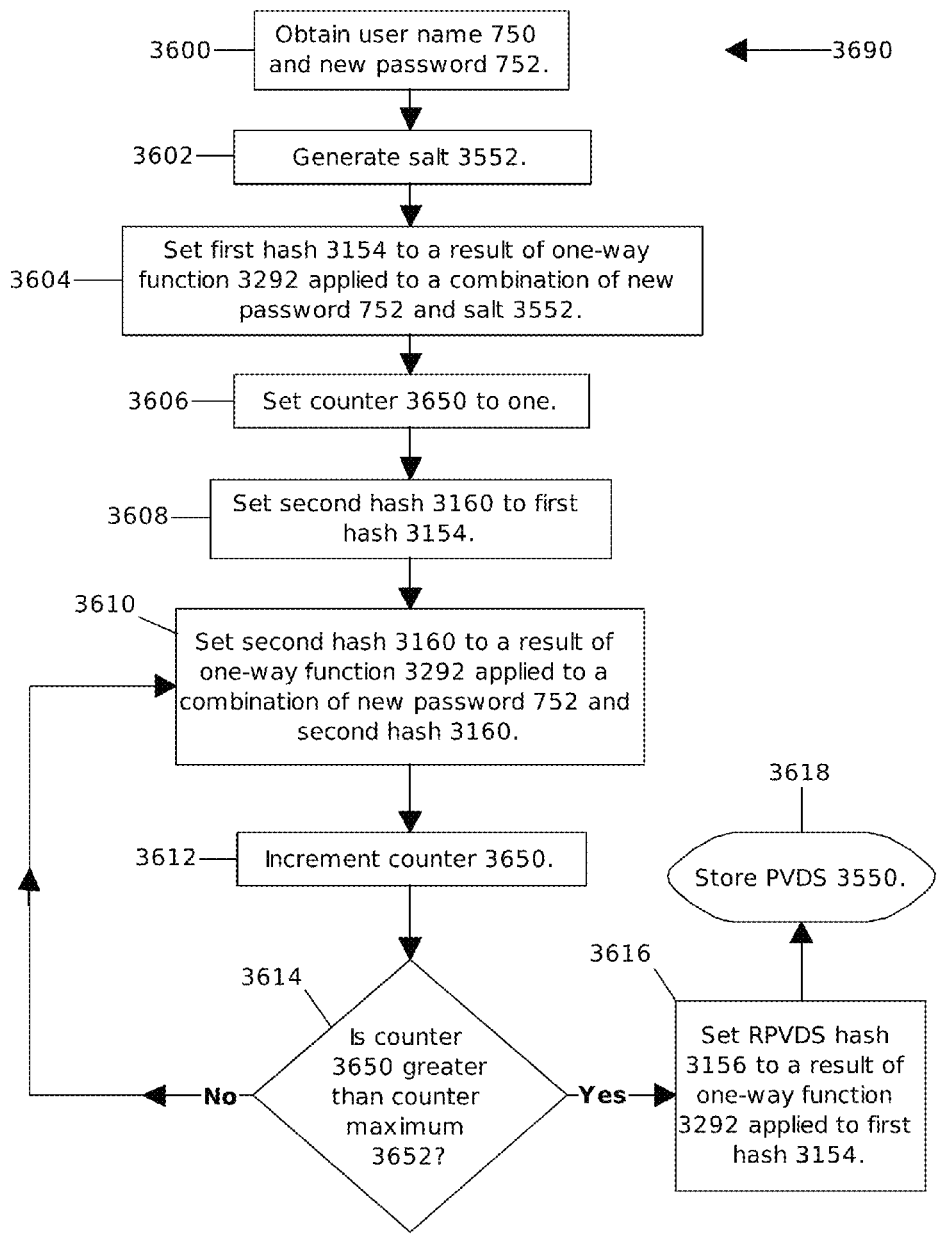
FIG. 36 is a flowchart that illustrates a method 3690 for generating the password verification data set 3550 of FIG. 35.

FIG. 36 illustrates an exemplary method 3690 that may be used by the processing device to generate the password verification data set 3550 for the user.

The processing device may start performing the method 3690 by obtaining the user name 750 and the new password 752 from the user (act 3600). Then, the processing device may generate the salt 3552 (act 3602). Then, the processing device may set the first hash 3154 to a result of the one-way function 3292 applied to a combination of the new password 752 and the salt 3552 (act 3604). Then, the processing device may set a counter 3650 to one (act 3606). Then, the processing device may set the second hash 3160 equal to the first hash 3154 (act 3608). Then, the processing device may execute a loop. As its first action in the loop, the processing device may set the second hash 3160 to a result of the one-way function 3292 applied to a combination of the new password 752 and the second hash 3160 (act 3610). Then, the processing device may increment the counter 3650 (act 3612). Then, the processing device may determine whether the counter 3650 is greater than a counter maximum 3652 (act 3614). If the counter 3650 is not greater than the counter maximum 3652, then the processing device may continue to execute the loop and may return to act 3610. If the counter 3650 is greater than the counter maximum 3652, then the processing device may stop executing the loop and may proceed to act 3616. At act 3616, the processing device sets the RPVDS hash 3156 to a result of the one-way function 3292 applied to the first hash 3154. Then, the processing device may store the password verification data set 3550 as described in the section of this disclosure titled COMMON FEATURES OF FIGS. 31-59 (act 3618), and the method 3690 may terminate.

Before implementing the method 3690, an implementer may make some determinations:

a one-way function to use for the one-way function 3292;
a number of characters or bits that the salt 3552 includes, and a method for generating the salt 3552;
a method for combining some data elements, including the new password 752 with the salt 3552, and the new password 752 with the second hash 3160; and
a value of the counter maximum 3652.

Some factors influencing the determinations 1-3 were discussed in the section of this disclosure titled "COMMON FEATURES OF FIGS. 31-59." Some factors influencing the determination 4 are identical to the factors influencing the determination 4 of the method 3290 depicted in FIG. 32.

FIG. 37

Figure 37:
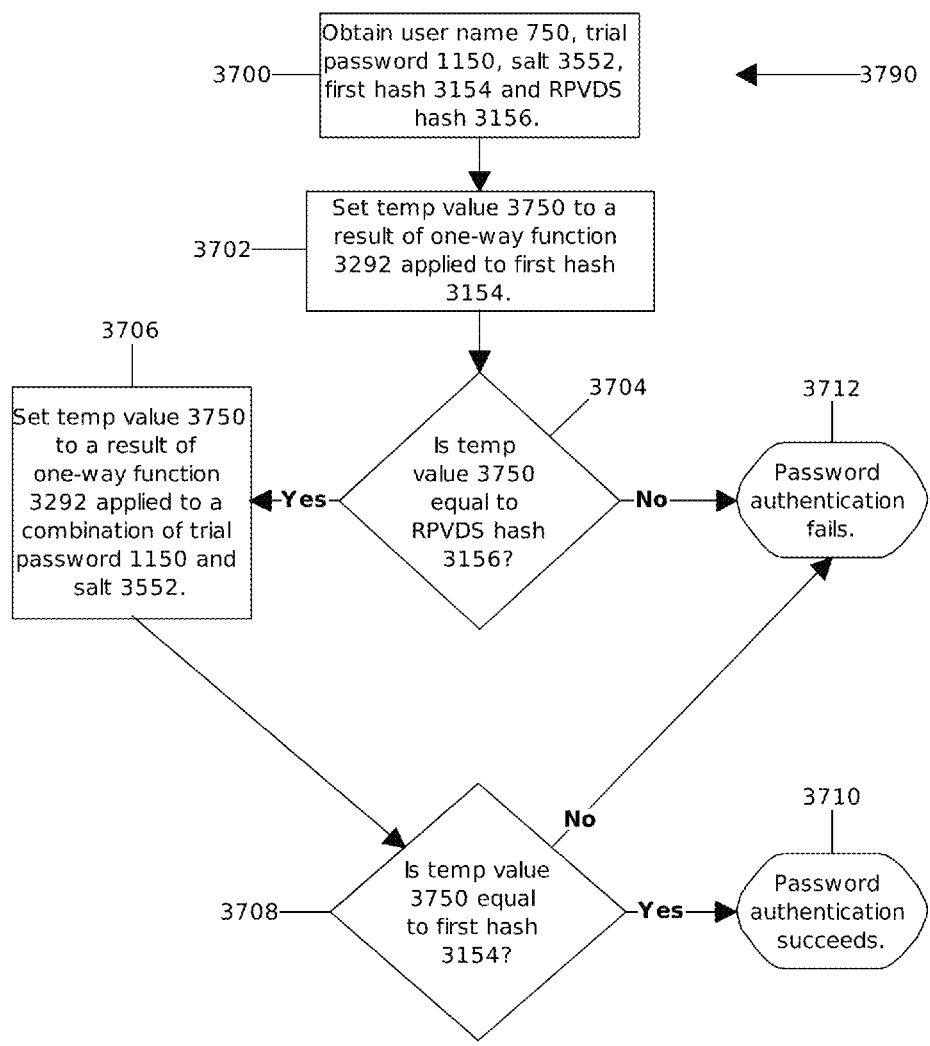
FIG. 37 is a flowchart that illustrates an exemplary quick password authentication method 3790 using the password verification data set 3550 of FIG. 35.

FIG. 37 illustrates the exemplary quick password authentication method 3790 that may be used by the processing device to authenticate the trial password 1150. The method 3790 may be used if the remote password verification data subset 954, depicted in FIG. 35, is available. If the remote password verification data subset 954 is not available, then the processing device may use the method 3890, depicted in FIG. 38, instead.

The method 3790 may use the quick password verification data subset 1250 of the password verification data set 3550, depicted in FIG. 35.

The processing device may start performing the method 3790 by obtaining the user name 750 and the trial password 1150 from the user, and the quick password verification data subset 1250, including the salt 3552, the first hash 3154 and the RPVDS hash 3156 (act 3700). The first hash 3154 may be obtained from the remote password verification data subset 954, and the salt 3552 and the RPVDS hash 3156 may be obtained from the central password verification data subset 956. Then, the processing device may set a temp value 3750 equal to a result of the one-way function 3292 applied to the first hash 3154 (act 3702). Then, the processing device may determine whether the temp value 3750 is equal to the RPVDS hash 3156 (act 3704). If the temp value 3750 does not equal the RPVDS hash 3156, then the method 3790 may terminate and password authentication fails (act 3712). If the temp value 3750 equals the RPVDS hash 3156, then the processing device may proceed to act 3706. At act 3706, the processing device may set the temp value 3750 to a result of the one-way function 3292 applied to a combination of the trial password 1150 and the salt 3552. Then, the processing device may determine whether the temp value 3750 is equal to the first hash 3154 (act 3708). If the temp value 3750 equals the first hash 3154, then the method 3790 may terminate and password authentication succeeds (act 3710). If the temp value 3750 does not equal the first hash 3154, then the method 3790 may terminate and password authentication fails (act 3712).

An implementer of the method 3790 uses a same one-way function 3292 as he/she determined to use for the method 3690. In addition, the implementer uses a same method to combine the trial password 1150 with the salt 3552 as the method he/she determined to use to combine some data elements within the method 3690. The method 3690 is depicted in FIG. 36.

FIG. 38

Figure 38:
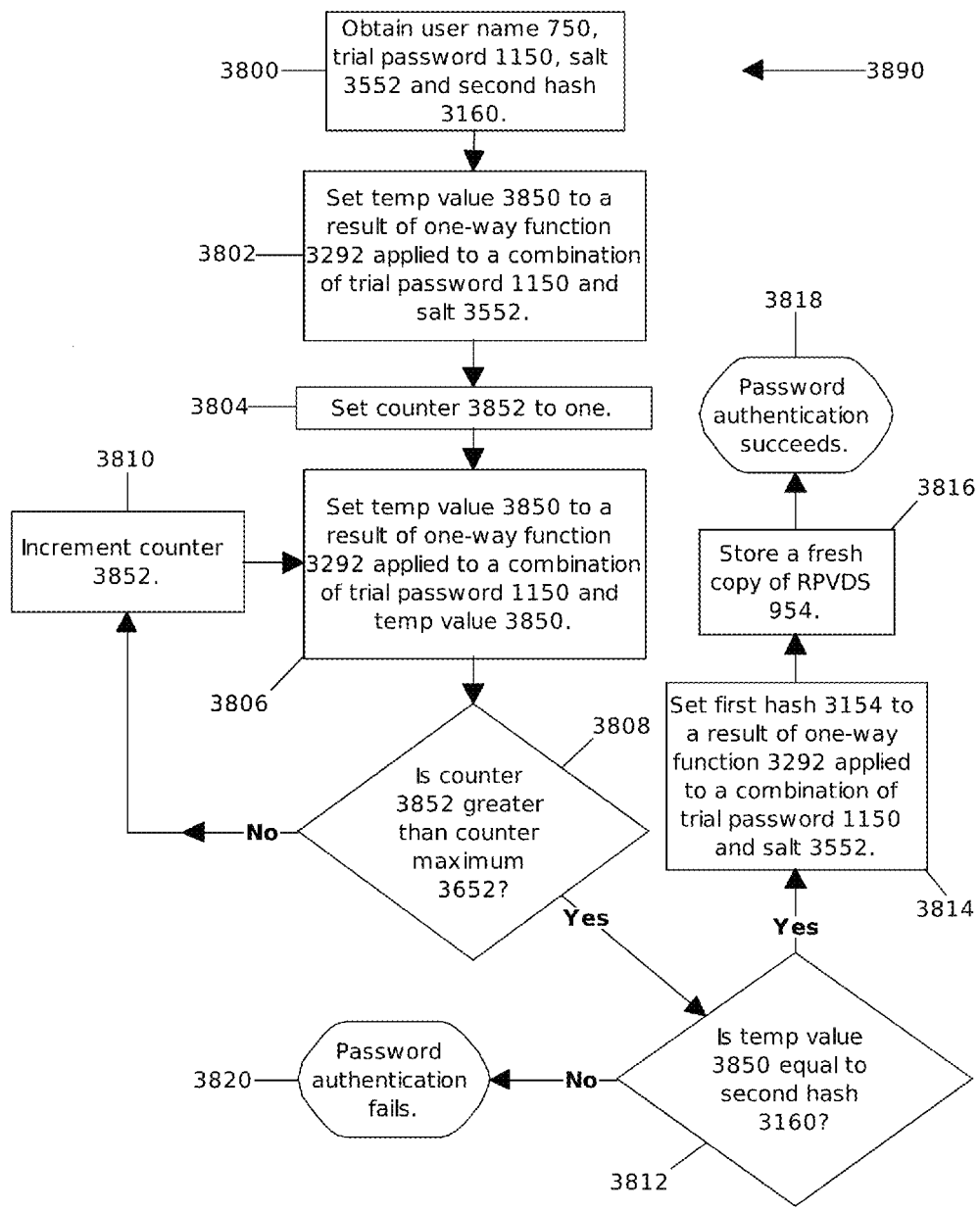
FIG. 38 is a flowchart that illustrates an exemplary slow password authentication method 3890 using the password verification data set 3550 of FIG. 35.

FIG. 38 illustrates the exemplary slow password authentication method 3890 that may be used by the processing device to authenticate the trial password 1150.

The method 3890 may use the slow password verification data subset 1650 of the password verification data set 3550, depicted in FIG. 35.

The processing device may start performing the method 3890 by obtaining the user name 750 and the trial password 1150 from the user, and the slow password verification data subset 1650, including the salt 3552 and the second hash 3160 (act 3800). The salt 3552 and the second hash 3160 may be obtained from the central password verification data subset 956. Then, the processing device may set a temp value 3850 to a result of the one-way function 3292 applied to a combination of the trial password 1150 and the salt 3552 (act 3802). Then, the processing device may set a counter 3852 to one (act 3804). At this point, the processing device may execute a loop. As its first action in the loop, the processing device may set the temp value 3850 to a result of the one-way function 3292 applied to a combination of the trial password 1150 and the temp value 3850 (act 3806). Next, the processing device may determine whether the counter 3852 is greater than a counter maximum 3652 (act 3808). If the counter 3852 is less than or equal to the counter maximum 3652, then the processing device may continue executing the loop and may increment the counter 3852 (act 3810). Next, the processing device may return to the first action of the loop, act 3806. If, at act 3808, the counter 3852 is greater than the counter maximum 3652, then the loop may terminate and the processing device may determine whether the temp value 3850 is equal to the second hash 3160 (act 3812). If the temp value 3850 does not equal the second hash 3160, then the method 3890 may terminate and password authentication fails (act 3820). If the temp value 3850 equals the second hash 3160, then the processing device may proceed to act 3814. At act 3814, set the first hash 3154 to a result of the one-way function 3292 applied to a combination of the trial password 1150 and the salt 3552. Then, the processing device may attempt to store a fresh copy of the remote password verification data subset 954 (act 3816). (How the storage operation is performed depends on an operating environment in which the method 3890 is executing.) Then, the method 3890 may terminate and password authentication succeeds (act 3818).

An implementer of the method 3890 may use the same one-way function 3292 as he/she determined to use for the method 3690. The implementer uses the same method to combine some data elements, including the trial password 1150 with the salt 3552 and the trial password 1150 with the temp value 3850, as the method he/she determined to use to combine some data elements within the method 3690. In addition, the implementer uses a same value of the counter maximum 3652 as the value that he/she determined to use for the method 3690. The method 3690 is depicted in FIG. 36.

FIG. 39

Figure 39:
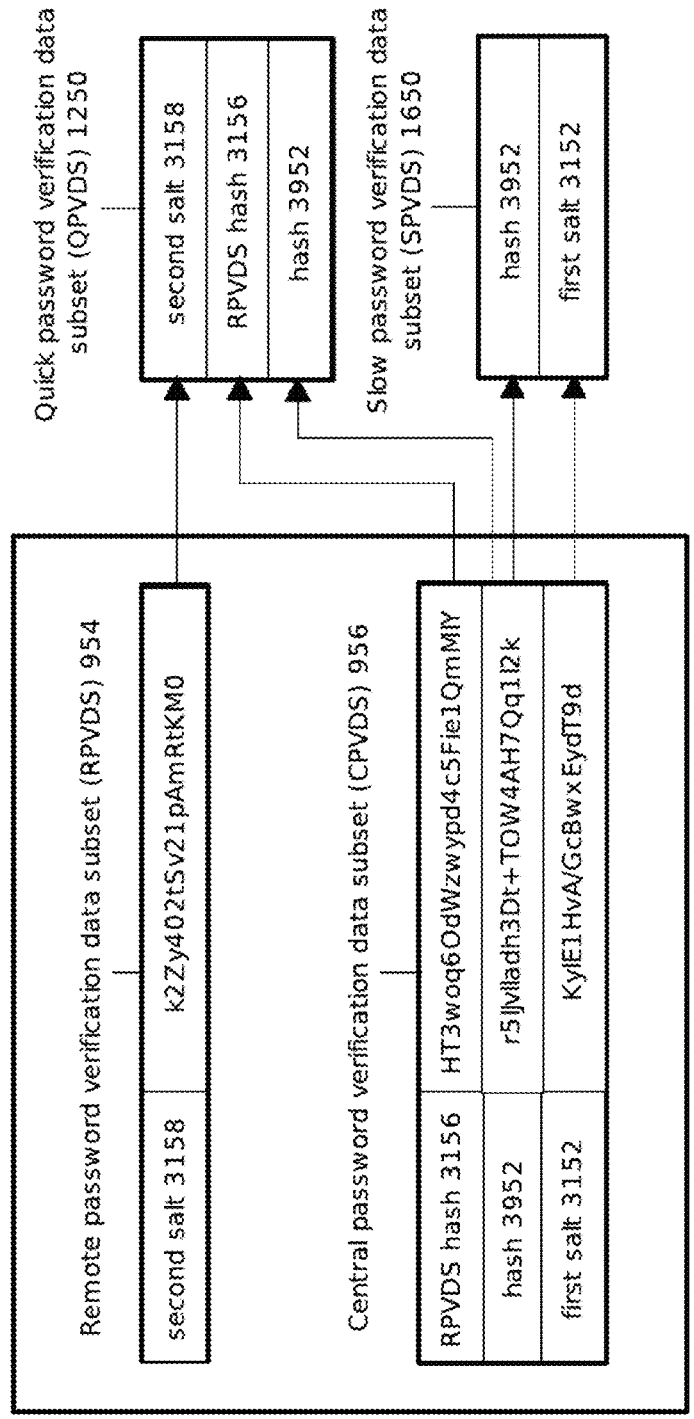
FIG. 39 illustrates a third exemplary password verification data set 3950.

FIG. 39 illustrates an exemplary password verification data set 3950 that may be used by a processing device when performing a password authentication method consistent with the subject matter of this disclosure. The password verification data set 3950 may include four elements: the first salt 3152, the second salt 3158, a hash 3952, and the RPVDS hash 3156.

FIG. 39 shows an exemplary value for the first salt 3152, "KyIE1HvA/GcBwxEydT9d", an exemplary value for the second salt 3158, "k2Zy402tSv21pAmRtKM0", an exemplary value for the hash 3952, "r5lJvIladh3Dt+TOW4AH7Qql12k", and an exemplary value for the RPVDS hash 3156, "HT3woq6OdWzwypd4c5Fie1QmMlY". The four exemplary values are all base64-encoded strings. Although, in other embodiments, other encoding methods may be employed.

The password verification data set 3950 may be divided into the central password verification data subset 956 and the remote password verification data subset 954. The central password verification data subset 956 includes the first salt 3152, the hash 3952 and the RPVDS hash 3156. The remote password verification data subset 954 includes the second salt 3158. When a user attempts to log in and the remote password verification data subset 954 is available, the processing device may construct the quick password verification data subset 1250 including the second salt 3158, the hash 3952 and the RPVDS hash 3156, and may execute a quick password authentication method 4190 depicted in FIG. 41. When the user attempts to log in and the remote password verification data subset 954 is not available, the processing device may construct the slow password verification data subset 1650 including the first salt 3152 and the hash 3952, and may execute a slow password authentication method 4290 depicted in FIG. 42.

FIG. 40

Figure 40:
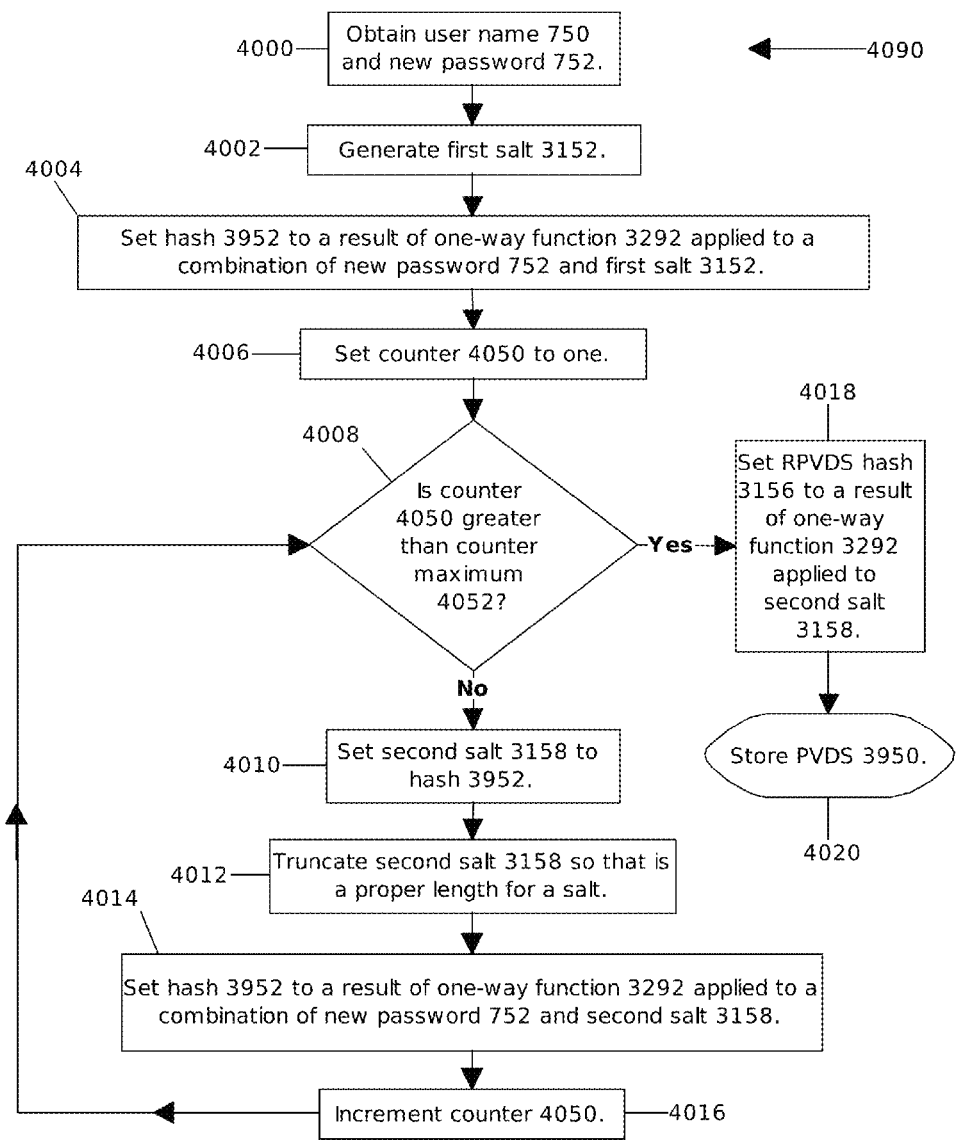
FIG. 40 is a flowchart that illustrates a method 4090 for generating the password verification data set 3950 of FIG. 39.

FIG. 40 illustrates an exemplary method 4090 that may be used by the processing device to generate the password verification data set 3950 for the user.

The processing device may start performing the method 4090 by obtaining the user name 750 and the new password 752 from the user (act 4000). Then, the processing device may generate the first salt 3152 (act 4002). Then, the processing device may set the hash 3952 to a result of the one-way function 3292 applied to a combination of the new password 752 and the first salt 3152 (act 4004). Then, the processing device may set a counter 4050 to one (act 4006). Then, the processing device may execute a loop. As its first action in the loop, the processing device may determine whether the counter 4050 is greater than a counter maximum 4052 (act 4008). If the counter 4050 is not greater than the counter maximum 4052, then the processing device may continue to execute the loop and may proceed to act 4010. At act 4010, the processing device may set the second salt 3158 equal to the hash 3952. Then, the processing device may truncate the second salt 3158 so that it is a proper length for a salt (act 4012). Then, the processing device may set the hash 3952 to a result of the one-way function 3292 applied to a combination of the new password 752 and the second salt 3158 (act 4014). Then, the processing device may increment the counter 4050 (act 4016). Then, the processing device may return to act 4008. If, at act 4008, the processing device determines that the counter 4050 is greater than the counter maximum 4052, then the processing device may stop executing the loop and may proceed to act 4018. At act 4018, the processing device may set the RPVDS hash 3156 to a result of the one-way function 3292 applied to the second salt 3158. Then, the processing device may store the password verification data set 3950 as described in the section of this disclosure titled COMMON FEATURES OF FIGS. 31-59 (act 4020), and the method 4090 may terminate.

Before implementing the method 4090, an implementer may make some determinations:
a one-way function to use for the one-way function 3292;
a number of characters or bits that the first salt 3152 and the second salt 3158 include, and a method for generating the salts;
a method for combining some data elements, including the new password 752 with the first salt 3152, and the new password 752 with the second salt 3158; and
a value for the counter maximum 4052.

Some factors influencing the determinations 1-3 were discussed in the section of this disclosure titled "COMMON FEATURES OF FIGS. 31-59." Some factors influencing the determination 4 are identical to the factors influencing the determination 4 of the method 3290 depicted in FIG. 32.

FIG. 41

Figure 41:
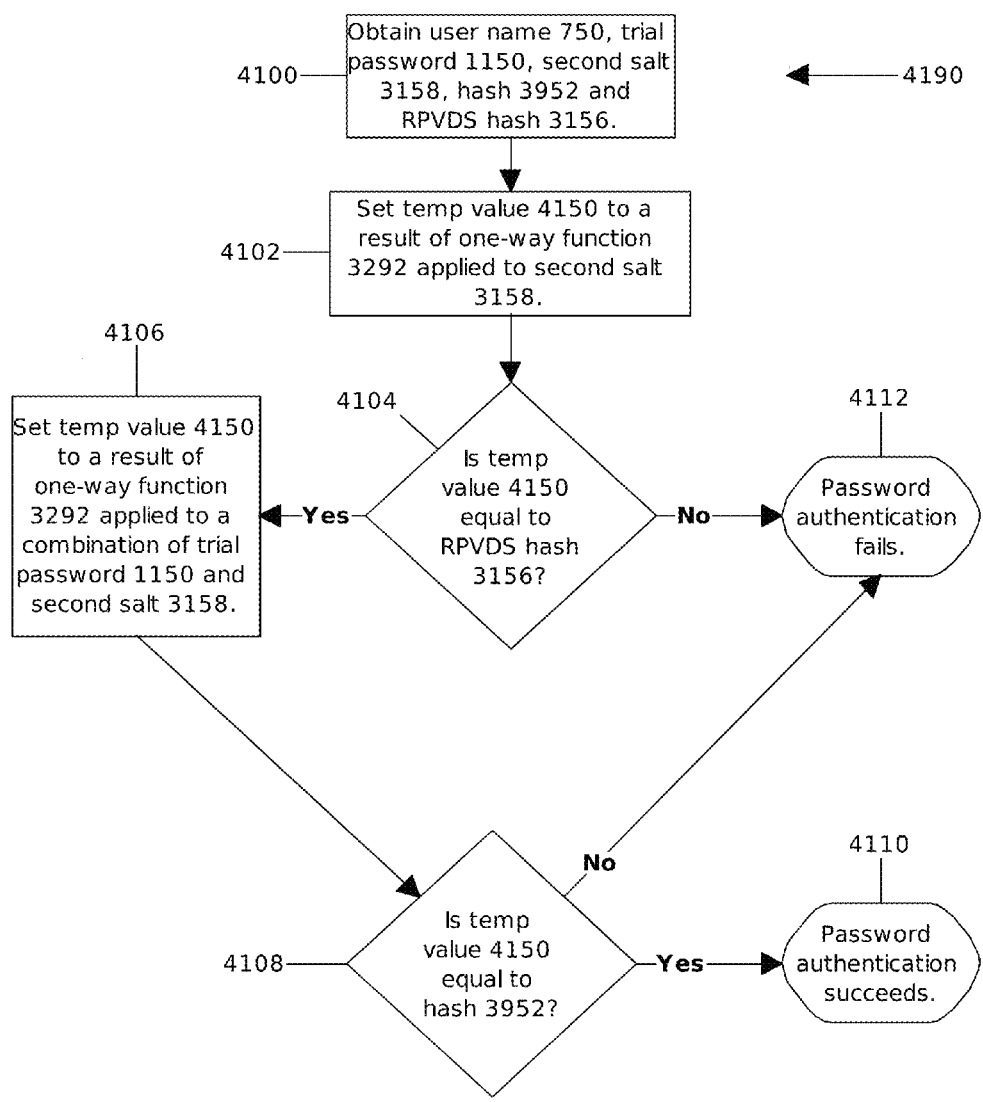
FIG. 41 is a flowchart that illustrates an exemplary quick password authentication method 4190 using the password verification data set 3950 of FIG. 39.

FIG. 41 illustrates the exemplary quick password authentication method 4190 that may be used by the processing device to authenticate the trial password 1150. The method 4190 may be used if the remote password verification data subset 954, depicted in FIG. 39, is available. If the remote password verification data subset 954 is not available, then the processing device may use the method 4290, depicted in FIG. 42, instead.

The method 4190 may use the quick password verification data subset 1250 of the password verification data set 3950, depicted in FIG. 39.

The processing device may start performing the method 4190 by obtaining the user name 750 and the trial password 1150 from the user, and the quick password verification data subset 1250, including the second salt 3158, the hash 3952 and the RPVDS hash 3156 (act 4100). The second salt 3158 may be obtained from the remote password verification data subset 954, and the hash 3952 and the RPVDS hash 3156 may be obtained from the central password verification data subset 956. Then, the processing device may set a temp value 4150 to a result of the one-way function 3292 applied to the second salt 3158 (act 4102). Then, the processing device may determine whether the temp value 4150 is equal to the RPVDS hash 3156 (act 4104). If the temp value 4150 does not equal the RPVDS hash 3156, then the method 4190 may terminate and password authentication fails (act 4112). If the temp value 4150 equals the RPVDS hash 3156, then the processing device may proceed to act 4106. At act 4106, the processing device may set the temp value 4150 to a result of the one-way function 3292 applied to a combination of the trial password 1150 and the second salt 3158. Then, the processing device may determine whether the temp value 4150 is equal to the hash 3952 (act 4108). If the temp value 4150 equals the hash 3952, then the method 4190 may terminate and password authentication succeeds (act 4110). If the temp value 4150 does not equal the hash 3952, then the method 4190 may terminate and password authentication fails (act 4112).

An implementer of the method 4190 uses a same one-way function 3292 as he/she determined to use for the method 4090. In addition, the implementer uses a same method to combine the trial password 1150 and the second salt 3158 as the method he/she determined to use to combine some data elements within the method 4090. The method 4090 is depicted in FIG. 40.

FIG. 42

Figure 42:
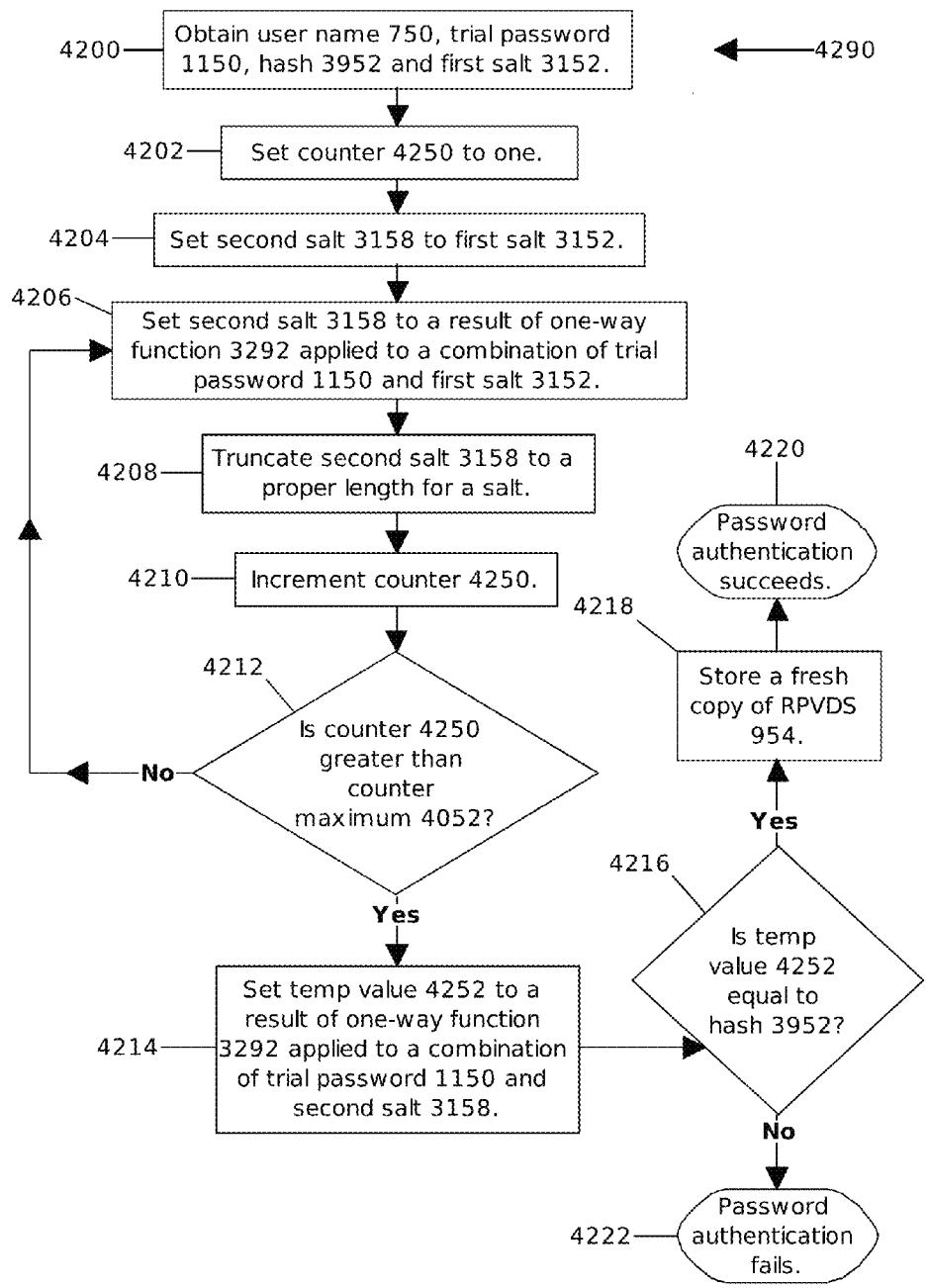
FIG. 42 is a flowchart that illustrates an exemplary slow password authentication method 4290 using the password verification data set 3950 of FIG. 39.

FIG. 42 illustrates the exemplary slow password authentication method 4290 that may be used by the processing device to authenticate the trial password 1150. The method 4290 uses the slow password verification data subset 1650 of the password verification data set 3950, depicted in FIG. 39.

The processing device may start performing the method 4290 by obtaining the user name 750 and the trial password 1150 from the user, and the first salt 3152 and the hash 3952 from the central password verification data subset 956 (act 4200). Then, the processing device may set a counter 4250 to one (act 4202). Then, the processing device may set the second salt 3158 equal to the first salt 3152 (act 4204). Then, the processing device may execute a loop. As its first action in the loop, the processing device may set the second salt 3158 to a result of the one-way function 3292 applied to a combination of the trial password 1150 and the second salt 3158 (act 4206). Next, the processing device may truncate the second salt 3158 to a proper length for a salt (act 4208). Next, the processing device may increment the counter 4250 (act 4210). Next, the processing device may determine whether the counter 4250 is greater than a counter maximum 4052 (act 4212). If the counter 4250 is less than or equal to the counter maximum 4052, then the execution of the loop may continue and the processing device may return to the top of the loop, act 4206. If the counter 4250 is greater than the counter maximum 4052, then the the loop may terminate and the processing device may proceed to act 4214. At act 4214, the processing device may set a temp value 4252 to a result of the one-way function 3292 applied to a combination of the trial password 1150 and the second salt 3158. Then, the processing device may determine whether the temp value 4252 is equal to the hash 3952 (act 4216). If the temp value 4252 does not equal the hash 3952, then the method 4290 may terminate and password authentication fails (act 4222). If the temp value 4252 equals the hash 3952, then the processing device may proceed to act 4218. At act 4218, the processing device may attempt to store a fresh copy of the remote password verification data subset 954. (How the storage operation is performed depends on an operating environment in which the method 4290 is executing.) Then, the method 4290 may terminate and password authentication succeeds (act 4220).

An implementer of the method 4290 uses the same one-way function 3292 as he/she determined to use for the method 4090. The implementer uses the same method to combine the trial password 1150 with the first salt 3152 as the method he/she determined to use to combine some data elements within the method 4090. In addition, the implementer uses a same value of the counter maximum 4052 as the value that he/she determined to use for the method 4090. The method 4090 is depicted in FIG. 40.

FIG. 43

Figure 43:
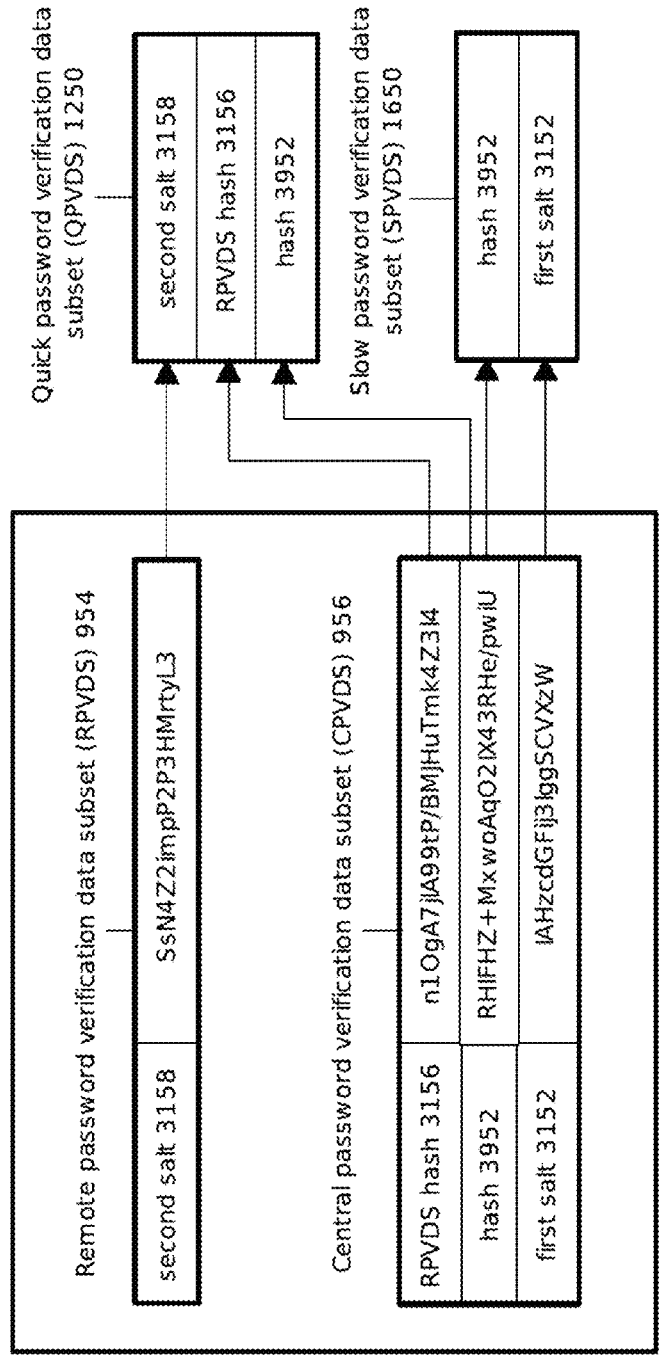
FIG. 43 illustrates a fourth exemplary password verification data set 4350.

FIG. 43 illustrates an exemplary password verification data set 4350 that may be used by a processing device when performing a password authentication method consistent with the subject matter of this disclosure. The password verification data set 4350 may include four elements: the first salt 3152, the second salt 3158, the hash 3952 and the RPVDS hash 3156.

The password verification data set 4350 includes a same set of data elements as the password verification data set 3950 of FIG. 39, but a method used to calculate the second salt 3158 of the password verification data set 4350 is different than the method used to calculate the second salt 3158 of the password verification data set 3950 within the method 4090 of FIG. 40.

FIG. 43 shows an exemplary value for the first salt 3152, "IAHzcdGFij3lggSCVXzW", an exemplary value for the second salt 3158, "SsN4Z2impP2P3HMrtyL3", an exemplary value for the hash 3952, "RHIFHZ+MxwoAqO2IX43RHe/pwiU", and an exemplary value for the RPVDS hash 3156, "n1OgA7jIA99tP/BMJHuTmk4Z314". The four exemplary values are all base64-encoded strings. Although, in other embodiments other encoding methods may be employed.

The password verification data set 4350 may be divided into the central password verification data subset 956 and the remote password verification data subset 954. The central password verification data subset 956 may include the first salt 3152, the hash 3952 and the RPVDS hash 3156. The remote password verification data subset 954 may include the second salt 3158. When a user attempts to log in and the remote password verification data subset 954 is available, the processing device may construct the quick password verification data subset 1250 including the second salt 3158, the hash 3952, and the RPVDS hash 3156, and may execute a quick password authentication method 4590 depicted in FIG. 45. When the user attempts to log in and the remote password verification data subset 954 is not available, the processing device may construct the slow password verification data subset 1650 including the first salt 3152 and the hash 3952, and may execute a slow password authentication method 4690 depicted in FIG. 46.

FIG. 44

Figure 44:
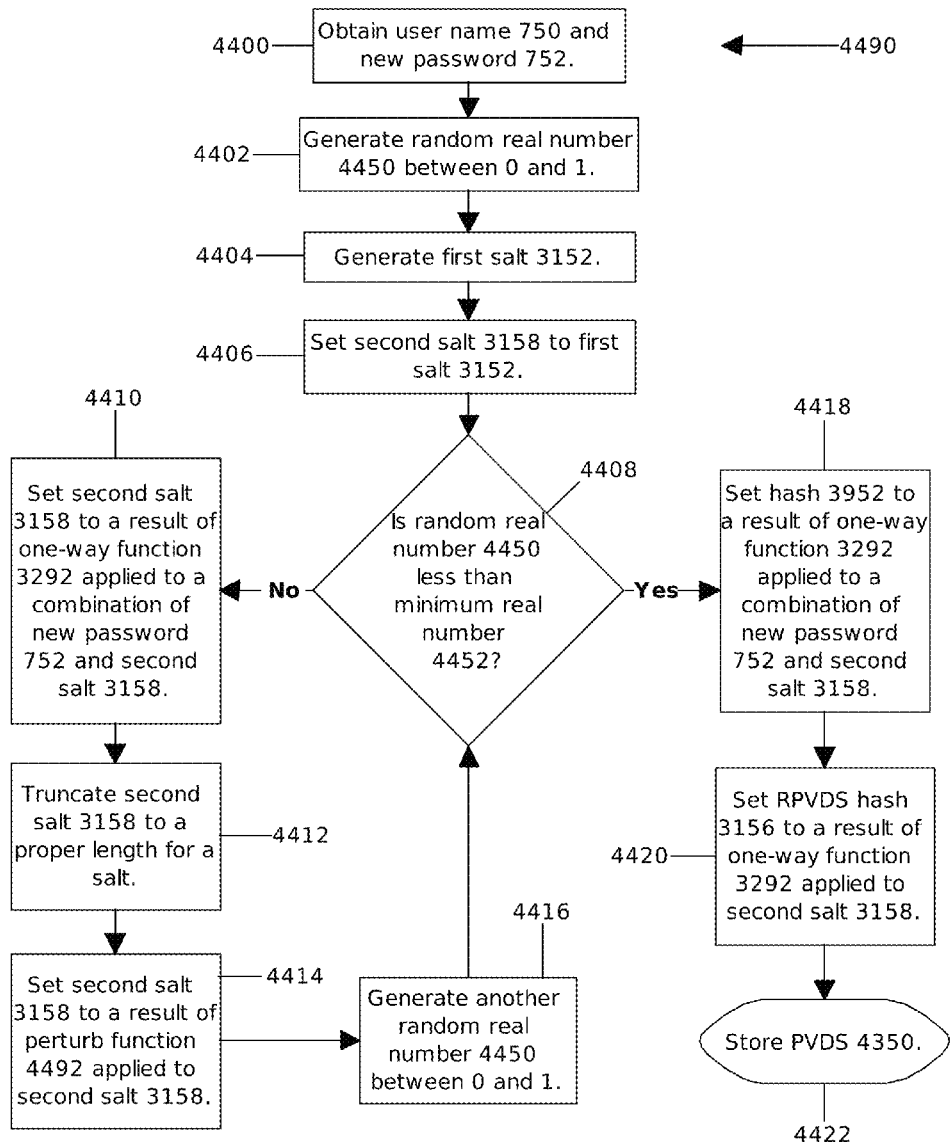
FIG. 44 is a flowchart that illustrates a method 4490 for generating the password verification data set 4350 of FIG. 43.

FIG. 44 illustrates an exemplary method 4490 that may be used by the processing device to generate a password verification data set 4350 for the user.

The processing device may start performing the method 4490 by obtaining the user name 750 and the new password 752 from the user (act 4400). Then, the processing device may generate a random real number 4450 between 0 and 1 (act 4402). Then, the processing device may generate the first salt 3152 (act 4404). Then, the processing device may set the second salt 3158 equal to the first salt 3152 (act 4406). Then, the processing device may determine whether the random real number 4450 is less than a minimum real number 4452 (act 4408). If the random real number 4450 is not less than the minimum real number 4452, then the processing device may execute a loop. If the random real number 4450 is less than the minimum real number 4452, then the processing device may stop executing the loop. (It is highly likely that the processing device will enter the loop if the minimum real number 4452 is close to zero.) At the beginning of the loop (act 4410), the processing device may set the second salt 3158 to a result of the one-way function 3292 applied to a combination of the new password 752 and the second salt 3158. Then, the processing device may truncate the second salt 3158 so that it is a proper length for a salt (act 4412). Then, the processing device may set the second salt 3158 to a result of a perturb function 4492 applied to the second salt 3158 (act 4414). Then, the processing device may generate another random real number 4450 between 0 and 1 (act 4416). Then, the processing device may return to act 4408 where it again may determine whether the random real number 4450 is less than the minimum real number 4452. If the random real number 4450 is not less than the minimum real number 4452, then the processing device may continue executing the loop. If the random real number 4450 is less than the minimum real number 4452, then the processing device may stop executing the loop and may proceed to act 4418. At act 4418, the processing device may set the hash 3952 to a result of the one-way function 3292 applied to a combination of the new password 752 and the second salt 3158. Then, the processing device may set the RPVDS hash 3156 to a result of the one-way function 3292 applied to the second salt 3158 (act 4420). Then, the processing device may store the password verification data set 4350 as described in the section of this disclosure titled COMMON FEATURES OF FIGS. 31-59 (act 4422), and the method 4490 may terminate.

Before implementing the method 4490, an implementer may make some determinations:
- a one-way function to use for the one-way function 3292;
- a number of characters or bits that the first salt 3152 and the second salt 3158 include, and a method for generating the salts;
- a method for combining the new password 752 with the second salt 3158;
- a value of the minimum real number 4452; and
- a perturb function to use for the perturb function 4492 within the loop of the method 4490.

Some factors influencing the determinations 1-3 were discussed in the section of this disclosure titled "COMMON FEATURES OF FIGS. 31-59."

Regarding the determination 4, the implementer may choose the value of the minimum real number 4452 to be a positive real number close to zero. Choosing a smaller value of the minimum real number 4452, as opposed to choosing a larger value of the minimum real number 4452, may have the following effects:
- the method 4490 may cycle through the loop more times (on average);
- the method 4490 may take more time to execute;
- a slow password authentication method 4690, depicted in FIG. 46, may take more time to execute; and
- the password verification data set 4350 generated by the method 4490 may be more resistant to attacks.

Regarding the determination 5, the implementer may choose the perturb function 4492 so that it modifies its input in a way that depends on a number of iterations of the loop that have already been performed. The perturb function 4492 may also be chosen so that its output has at least as much entropy as its input. Many perturb functions meet the two criteria, including, but not limited to, adding the number of iterations that have already been performed to the input and bitwise exclusive or-ing the number of iterations that have already been performed to the input. A purpose of the perturb function 4492 is to make it more difficult for an attacker to build a rainbow table.

The implementer may make some modifications to the method 4490:
- add an action that causes the loop of the method 4490 to execute a minimum number of times before exiting the loop;

add an action that causes the loop of the method 4490 to execute no more than a maximum number of times; and omit the act 4414, thereby not using the perturb function 4492.

FIG. 45

Figure 45:
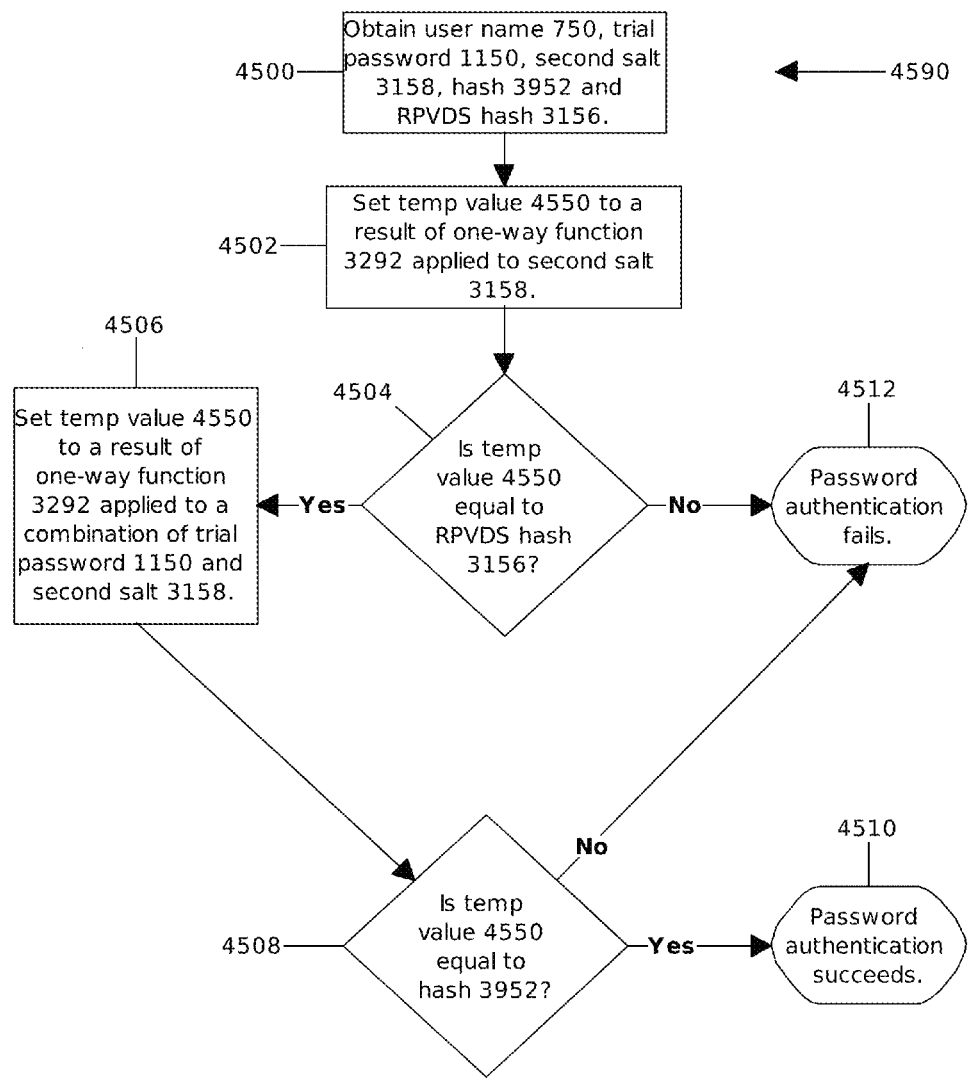
FIG. 45 is a flowchart that illustrates an exemplary quick password authentication method 4590 using the password verification data set 4350 of FIG. 43.

FIG. 45 illustrates the exemplary quick password authentication method 4590 that may be used by the processing device to authenticate the trial password 1150. The method 4590 may be used if the remote password verification data subset 954, depicted in FIG. 43, is available. If the remote password verification data subset 954 is not available, then the processing device may use the method 4690, depicted in FIG. 46, instead.

The method 4590 uses the quick password verification data subset 1250 of the password verification data set 4350, depicted in FIG. 43.

The processing device may start performing the method 4590 by obtaining the user name 750 and the trial password 1150 from the user, and the quick password verification data subset 1250, including the second salt 3158, the hash 3952 and the RPVDS hash 3156 (act 4500). The second salt 3158 may be obtained from the remote password verification data subset 954, and the hash 3952 and the RPVDS hash 3156 may be obtained from the central password verification data subset 956. Then, the processing device may set a temp value 4550 to a result of the one-way function 3292 applied to the second salt 3158 (act 4502). Then, the processing device may determine whether the temp value 4550 is equal to the RPVDS hash 3156 (act 4504). If the temp value 4550 does not equal the RPVDS hash 3156, then the method 4590 may terminate and password authentication fails (act 4512). If the temp value 4550 equals the RPVDS hash 3156, then the processing device may proceed to act 4506. At act 4506, the processing device may set the temp value 4550 to a result of the one-way function 3292 applied to a combination of the trial password 1150 and the second salt 3158. Then, the processing device may determine whether the temp value 4550 is equal to the hash 3952 (act 4508). If the temp value 4550 equals the hash 3952, then the method 4590 may terminate and password authentication succeeds (act 4510). If the temp value 4550 does not equal the hash 3952, then the method 4590 may terminate and password authentication fails (act 4512).

An implementer of the method 4590 uses a same one-way function 3292 as he/she determined to use for the method 4490. In addition, the implementer uses a same method to combine the trial password 1150 and the second salt 3158 as the method he/she determined to use to combine some data elements within the method 4490. The method 4490 is depicted in FIG. 44.

FIG. 46

Figure 46:
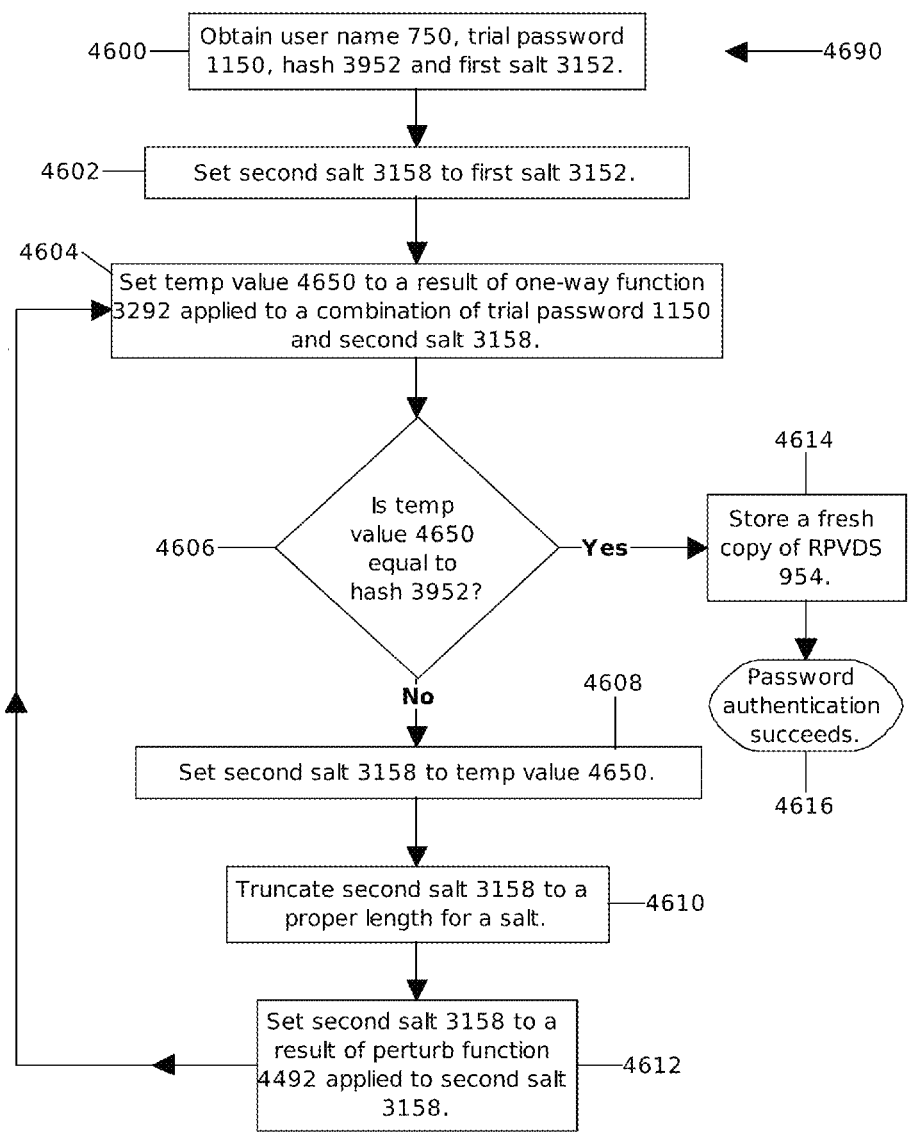
FIG. 46 is a flowchart that illustrates an exemplary slow password authentication method 4690 using the password verification data set 4350 of FIG. 43.

FIG. 46 illustrates the exemplary slow password authentication method 4690 that may be used by the processing device to authenticate the trial password 1150. The method 4690 uses the slow password verification data subset 1650 of the password verification data set 4350, depicted in FIG. 43.

The processing device may start performing the method 4690 by obtaining the user name 750 and the trial password 1150 from the user, and the first salt 3152 and the hash 3952 from the central password verification data subset 956 (act 4600). Then, the processing device may set the second salt 3158 equal to the first salt 3152 (act 4602). Then, the processing device may execute a loop. As its first action in the loop, the processing device may set a temp value 4650 to a result of the one-way function 3292 applied to a combination of the trial password 1150 and the second salt 3158 (act 4604). Then, the processing device may determine whether the temp value 4650 equals the hash 3952 (act 4606). If the temp value 4650 equals the hash 3952, then the processing device may stop executing the loop and may proceed to act 4614. At act 4614, the processing device may attempt to store a fresh copy of the remote password verification data subset 954 (RPVDS). (How the storage operation is performed depends on an operating environment in which the method 4690 is executing.) Then, the method 4690 may terminate and password authentication succeeds (act 4616). If, at act 4606, the temp value 4650 does not equal the hash 3952, then the processing device may continue executing the loop and may proceed to act 4608. At act 4608, the processing device may set the second salt 3158 equal to the temp value 4650. Then, the processing device may truncate the second salt 3158 to a proper length for a salt (act 4610). Then, the processing device may set the second salt 3158 to a result of the perturb function 4492 applied to the second salt 3158 (act 4612). Then, the processing device may return to the top of the loop (act 4604).

An implementer of the method 4690 uses the same one-way function 3292 as he/she determined to use for the method 4490. The implementer uses a same perturb function 4492 as he/she determined to use for the method 4490. In addition, the implementer uses the same method to combine the trial password 1150 and the second salt 3158 as the method he/she determined to use to combine some data elements within the method 4490. The method 4490 is depicted in FIG. 44.

The method 4690 lacks an action in which the method terminates with a password authentication failure. If the trial password 1150 is not a correct password, then the loop of the method 4690 may continue indefinitely. The lack of a password authentication failure action makes the password verification data set 4350 more resistant to attacks. An attacker's processing device may attempt to authenticate many trial passwords using the method 4690, but the attacker will probably modify the method 4690 to exit the loop based on some criteria. A difficulty confronting the attacker is that, depending on the loop exit criteria that the attacker chooses, the attacker's processing device may spend a very long time trying to authenticate each trial password 1150, or the attacker's processing device may fail to authenticate a correct trial password 1150, or both. To better understand the difficulty confronting the attacker, see FIG. 59 that illustrates an exemplary method 5990 that may be used to perform a dictionary attack or a brute force attack on the password verification data set 4350.

FIG. 47

Figure 47:
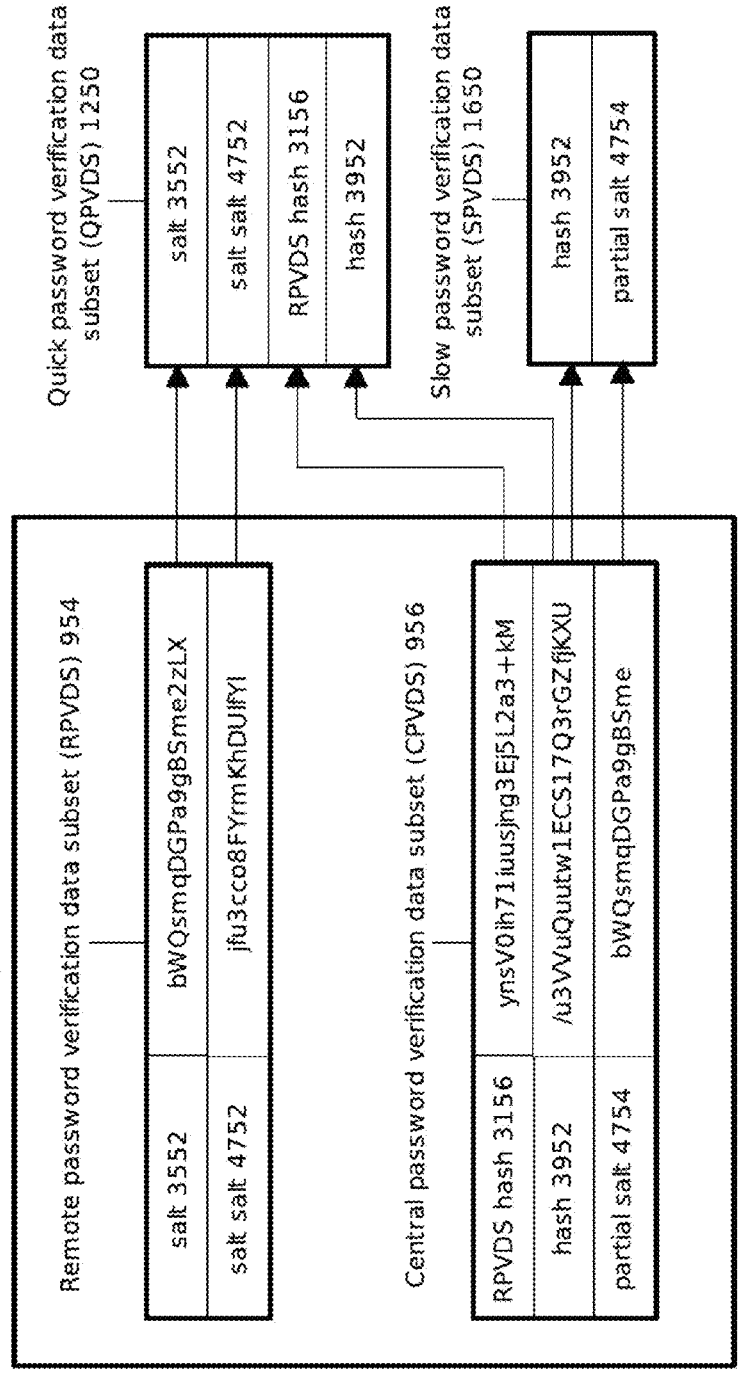
FIG. 47 illustrates a fifth exemplary password verification data set 4750.

FIG. 47 illustrates an exemplary password verification data set 4750 that may be used by a processing device when performing a password authentication method consistent with the subject matter of this disclosure. The password verification data set 4750 includes five elements: the salt 3552, a partial salt 4754, the hash 3952, a salt salt 4752 and the RPVDS hash 3156.

The partial salt 4754 is a truncated copy of the salt 3552. The salt salt 4752 is a salt that is combined with the salt 3552 before an application of the one-way function 3292 to create the RPVDS hash 3156. The salt salt 4752 is combined with the salt 3552 to give the RPVDS hash 3156 more entropy.

FIG. 47 shows an exemplary value for the salt 3552, "bWQsmqDGPa9gBSme2zLX", an exemplary value for the partial salt 4754, "bWQsmqDGPa9gBSme", an exemplary value for the hash 3952, "/u3VVuQuutw1ECS17Q3rGZfjKXU", an exemplary value for the salt salt 4752, "jfu3cco8FYrmKhDUlfYl", and an exemplary value for the RPVDS hash 3156, "ynsV0ih7liuusjng3Ej5L2a3+kM". The five exemplary values are all base64-encoded strings. Although, in other embodiments other encoding methods may be employed.

The password verification data set 4750 may be divided into the central password verification data subset 956 and the remote password verification data subset 954. The central password verification data subset 956 includes the partial salt 4754, the hash 3952, and the RPVDS hash 3156. The remote password verification data subset 954 includes the salt 3552 and the salt salt 4752. When a user attempts to log in and the remote password verification data subset 954 is available, the processing device may construct the quick password verification data subset 1250 including the salt 3552, the salt salt 4752, the hash 3952, and the RPVDS hash 3156, and may execute a quick password authentication method 4990 depicted in FIG. 49. When the user attempts to log in and the remote password verification data subset 954 is not available, the processing device may construct the slow password verification data subset 1650 including the partial salt 4754 and the hash 3952, and may execute a slow password authentication method 5090 depicted in FIG. 50.

FIG. 48

Figure 48:
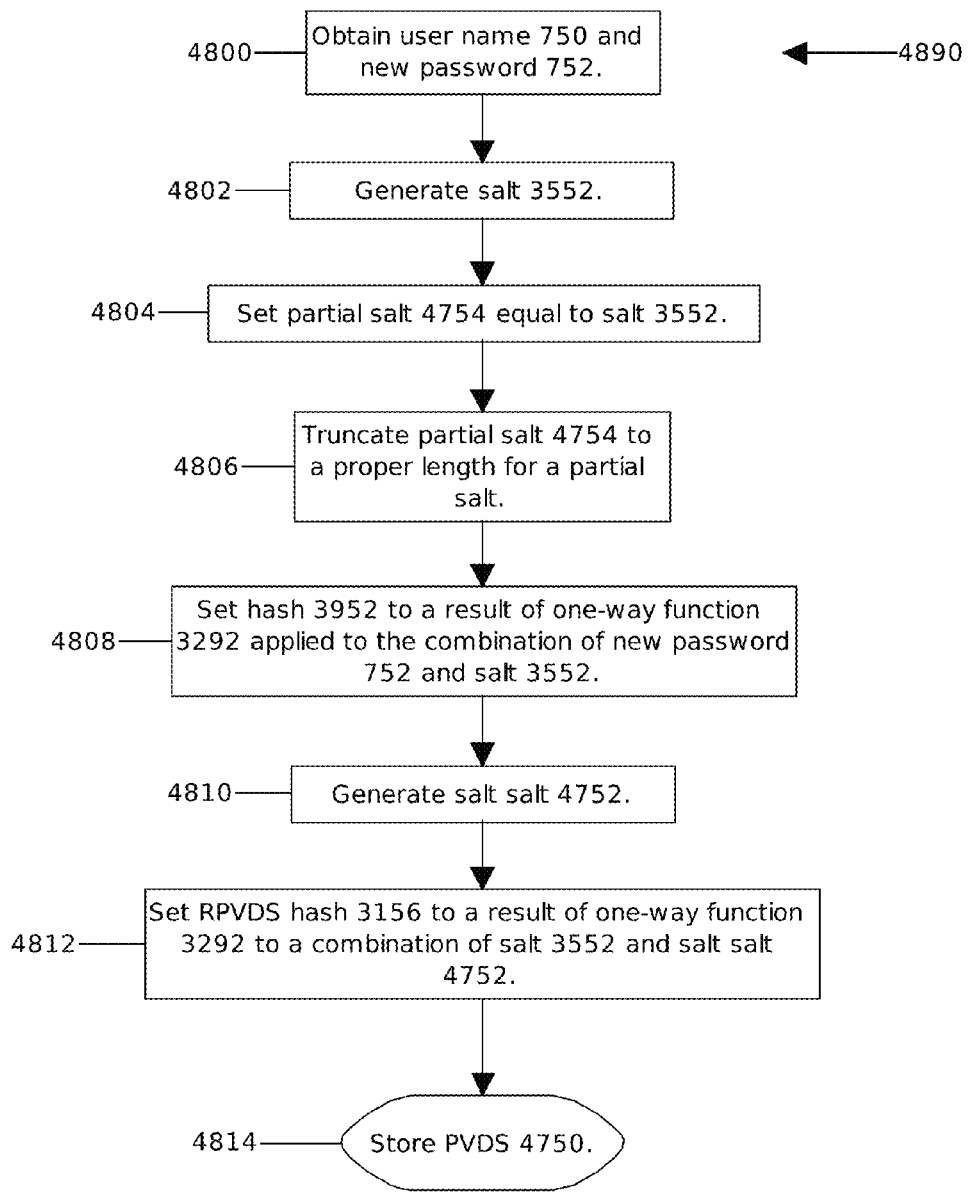
FIG. 48 is a flowchart that illustrates a method 4890 for generating the password verification data set 4750 of FIG. 47.

FIG. 48 illustrates an exemplary method 4890 that may be used by the processing device to generate the password verification data set 4750 for a user.

The processing device may start performing the method 4890 by obtaining the user name 750 and the new password 752 from the user (act 4800). Then, the processing device may generate the salt 3552 (act 4802). Then, the processing device may set the partial salt 4754 equal to the salt 3552 (act 4804). Then, the processing device may truncate the partial salt 4754 to a proper length for the partial salt (act 4806). Then, the processing device may set the hash 3952 to a result of the one-way function 3292 applied to a combination of the new password 752 and the salt 3552 (act 4808). Then, the processing device may generate the salt salt 4752 (act 4810). Then, the processing device may set the RPVDS hash 3156 to a result of the one-way function 3292 applied to a combination of the salt 3552 and the salt salt 4752 (act 4812). Then, the processing device may store the password verification data set 4750 (PVDS) as described in the section of this disclosure titled COMMON FEATURES OF FIGS. 31-59 (act 4814), and the method 4890 may terminate.

Before implementing the method 4890, an implementer may make some determinations:
 a one-way function to use for the one-way function 3292;
 a number of characters or bits that the salt 3552 and the salt salt 4752 include, and a method for generating the salts;
 a method for combining some data elements, such as the new password 752 with the salt 3552, and the salt 3552 with the salt salt 4752; and
 a number of bits to remove from the salt 3552 when generating the partial salt 4754.

Some factors influencing the determinations 1-3 were discussed in the section of this disclosure titled "COMMON FEATURES OF FIGS. 31-59."

Regarding the determination 4, removing a larger number characters or bits from the salt 3552 when generating the partial salt 4754, as opposed to removing a smaller number of characters or bits from the salt 3552 when generating the partial salt 4754, may have the following effects:
 the slow password authentication method 5090, depicted in FIG. 50, may take more time to execute; and
 the password verification data set 4750 generated by the method 4890 may be more resistant to attacks.

With modern processing devices, some reasonable values to consider for the number of bits to remove from the salt 3552 when generating the partial salt 4754 may be in a range from 20 to 36. In the exemplary data depicted in FIG. 47, 24 bits (four 6-bit base64 characters) have been removed from the salt 3552 to generate the partial salt 4754.

FIG. 49

Figure 49:
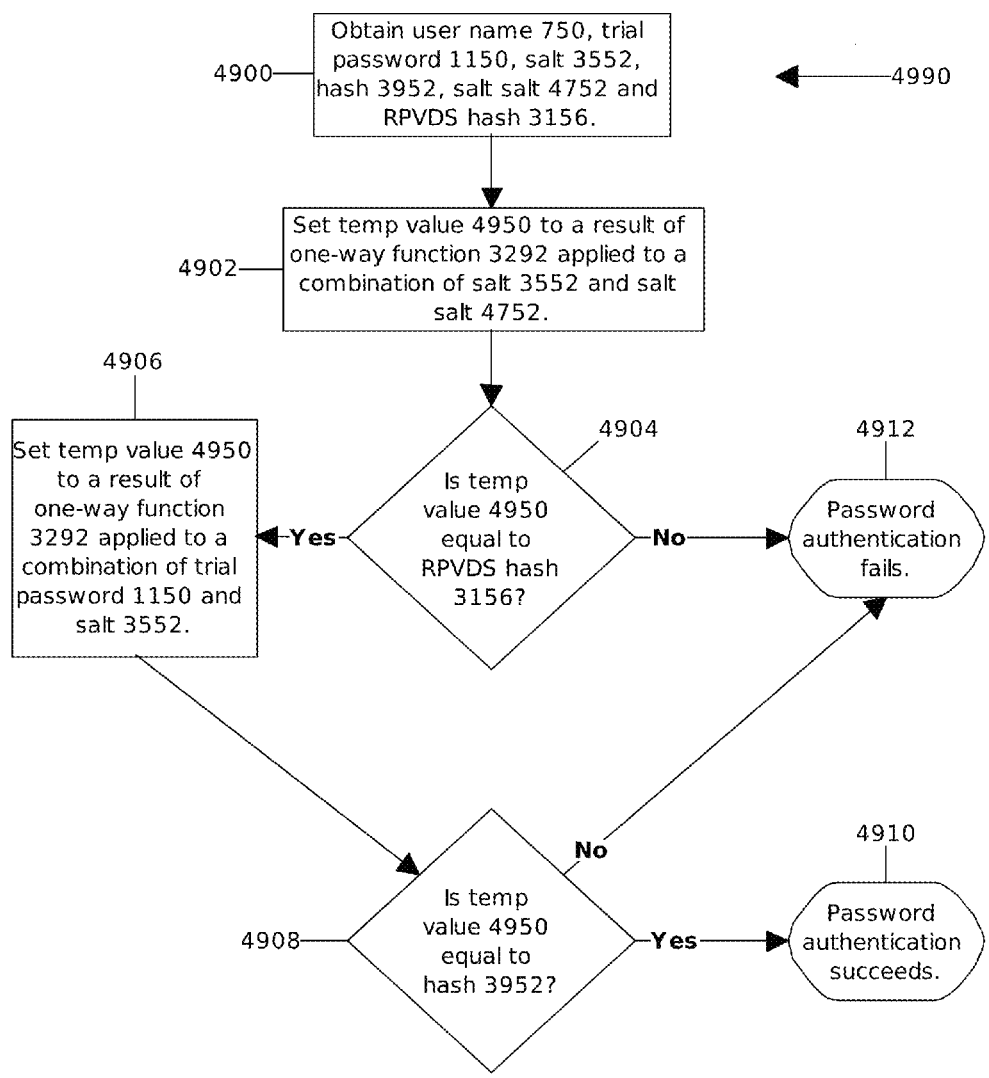
FIG. 49 is a flowchart that illustrates an exemplary quick password authentication method 4990 using the password verification data set 4750 of FIG. 47.

FIG. 49 illustrates the exemplary quick password authentication method 4990 that may be used by the processing device to authenticate the trial password 1150. The method 4990 may be used if the remote password verification data subset 954, depicted in FIG. 47, is available. If the remote password verification data subset 954 is not available, then the processing device may use the method 5090, illustrated in FIG. 50, instead.

The method 4990 uses the quick password verification data subset 1250 of the password verification data set 4750, depicted in FIG. 47.

The processing device may start performing the method 4990 by obtaining the user name 750 and the trial password 1150 from the user, and the quick password verification data subset 1250, including the salt 3552, the salt salt 4752, the hash 3952, and the RPVDS hash 3156 (act 4900). The salt 3552 and the salt salt 4752 may be obtained from the remote password verification data subset 954, and the hash 3952 and the RPVDS hash 3156 may be obtained from the central password verification data subset 956. Then, the processing device may set a temp value 4950 to a result of the one-way function 3292 applied to a combination of the salt 3552 and the salt salt 4752 (act 4902). Then, the processing device may determine whether the temp value 4950 is equal to the RPVDS hash 3156 (act 4904). If the temp value 4950 does not equal the RPVDS hash 3156, then the method 4990 may terminate and password authentication fails (act 4912). If the temp value 4950 equals the RPVDS hash 3156, then the processing device may proceed to act 4906. At act 4906, the processing device may set the temp value 4950 to a result of the one-way function 3292 applied to a combination of the trial password 1150 and the salt 3552. Then, the processing device may determine whether the temp value 4950 is equal to the hash 3952 (act 4908). If the temp value 4950 equals the hash 3952, then the method 4990 may terminate and password authentication succeeds (act 4910). If the temp value 4950 does not equal the hash 3952, then the method 4990 may terminate and password authentication fails (act 4912).

An implementer of the method 4990 uses a same one-way function 3292 as he/she determined to use for the method 4890. In addition, the implementer uses a same method to combine some data elements, such as the salt 3552 with the salt salt 4752 and the trial password 1150 with the salt 3552, as the method he/she determined to use to combine some data elements within the method 4890. The method 4890 is depicted in FIG. 48.

FIG. 50

FIG. 50 illustrates the exemplary slow password authentication method 5090 that may be used by the processing device to authenticate the trial password 1150. The method 5090 uses the slow password verification data subset 1650 of the password verification data set 4750, depicted in FIG. 47.

To authenticate the trial password 1150, the method 5090 appends all possible values to the partial salt 4754 that extend the partial salt 4754 to a proper length for the salt 3552. A data element that extends the partial salt 4754 to the proper length for the salt 3552 is referred to herein as a salt completion 5050.

The processing device may start performing the method 5090 by obtaining the user name 750 and the trial password 1150 from the user, and the partial salt 4754 and the hash 3952 from the central password verification data subset 956 (act 5000). Then, the processing device may set the salt completion 5050 equal to a first possible salt completion value (act 5002). Then, the processing device may execute a loop. As its first action in the loop, the processing device may set the salt 3552 to a combination of the partial salt 4754 and the salt completion 5050 (act 5004). Then, the processing device may set a temp value 5052 to a result of the one-way function 3292 applied to a combination of the trial password 1150 and the salt 3552 (act 5006). Then, the processing device may determine whether the temp value 5052 equals the hash 3952 (act 5008). If the temp value 5052 equals the hash 3952, then the processing device may stop executing the loop and may proceed to act 5014. At act 5014, the processing device may attempt to store a fresh copy of the remote password verification data subset 954 (RPVDS). (How the storage operation is performed depends on an operating environment in which the method 5090 is executing.) Then, the method 5090 may terminate and password authentication succeeds (act 5016). If, at act 5008, the temp value 5052 does not equal the hash 3952, then the processing device may continue executing the loop and may proceed to act 5010. At act 5010, the processing device may determine whether there are more values of the salt completion 5050 left to try. If there are no more values of the salt completion 5050 left to try, then the method 5090 may terminate and password authentication fails (act 5018). If there are more values of the salt completion 5050 left to try, then the processing device may continue executing the loop and may proceed to act 5012. At act 5012, the processing device may set the salt completion 5050 equal to a next possible salt completion value that has not yet been tried. Then, the processing device may return to the top of the loop at act 5004.

An implementer of the method 5090 uses the same one-way function 3292 as he/she determined to use for the method 4890. In addition, the implementer uses the same method to combine some data elements, such as the partial salt 4754 with the salt completion 5050 and the trial password 1150 with the salt 3552, as the method he/she determined to use to combine some data elements within the method 4890. The method 4890 is depicted in FIG. 48.

FIG. 51

FIG. 51 illustrates an exemplary password verification data set 5150 that may be used by a processing device when performing a password authentication method consistent with the subject matter of this disclosure. All the previously described exemplary password verification data sets included salts and hashes. However, some embodiments of password verification data sets, such as the password verification data set 5150, include neither salts nor hashes.

The password verification data set 5150 represents a part of a polynomial equation of one variable. Another part of the polynomial equation may be derived from the trial password 1150. A process of authenticating the trial password 1150 includes finding a numerical solution to the polynomial equation.

The password verification data set 5150 includes the following data elements: a solution 5151 that is a solution to the polynomial equation of one variable; a coefficient 5152 (C12), a coefficient 5153 (C13), a coefficient 5154 (C14), . . . , a coefficient 5163 (C23) of the polynomial equation, where the coefficient 5152 (C12) is a coefficient of the x^12 term, where the coefficient 5153 (C13) is a coefficient of the x^13 term, etc.; and a constant term 5164 that is a constant term of the polynomial equation.

Coefficient 5260 (C0) through coefficient 5261 (C11) are derived from the trial password 1150 and are not part of the password verification data set 5150.

The polynomial equation may be expressed as a mathematical formula as follows:

$$C0 + C1 \times x + C2 \times x^2 + C3 \times x^3 + \ldots + C23 \times x^{23} = CT$$

In the formula, C0 to C23 are the coefficients, x is the variable, and CT is the constant term. The left side of the equation, to the left of the equals sign (=), is referred to herein as a polynomial expression.

To create exemplary data for FIG. 51, the coefficient 5152 (C12) through the coefficient 5163 (C23) were generated randomly. If a different number of randomly generated coefficients are included in the password verification data set 5150, then a number of terms of the polynomial equation may be more than, or less than, 24.

FIG. 51 depicts exemplary values for the data elements of the password verification data set 5150.
the solution 5151: 5697328
the coefficient 5152 (C12): 83
the coefficient 5153 (C13): 85
the coefficient 5154 (C14): 9
the coefficient 5155 (C15): 144
the coefficient 5156 (C16): 227
the coefficient 5157 (C17): 45
the coefficient 5158 (C18): 155
the coefficient 5159 (C19): 215
the coefficient 5160 (C20): 194
the coefficient 5161 (C21): 71
the coefficient 5162 (C22): 214
the coefficient 5163 (C23): 139
the constant term 5164: 33377441530876123743607704077969075198611762986369503600316770003931915630903853688151806245131598133195147794838917024198006479887559249385769336753

The exemplary values are all decimal numbers. Although, in other embodiments other encoding methods may be employed. All the numbers are less than ten million except for the constant term 5164, a decimal representation of which includes 158 digits.

The password verification data set 5150 may be divided into the central password verification data subset 956 and the remote password verification data subset 954. The central password verification data subset 956 includes the coefficient 5152 (C12), the coefficient 5153 (C13), . . . , the coefficient 5163 (C23), and the constant term 5164. The remote password verification data subset 954 includes the solution 5151. When a user attempts to log in and the remote password verification data subset 954 is available, the processing device may construct the quick password verification data subset 1250 that includes a same set of data elements as belong to the password verification data set 5150, and may execute a quick password authentication method 5390 depicted in FIG. 53. When the user attempts to log in and the remote password verification data subset 954 is not available, the processing device may construct the slow password verification data subset 1650 that includes a same set of data elements as belong to the central password verification data subset 956, and may execute a slow password authentication method 5490 depicted in FIG. 54.

FIG. 52

Figure 52:
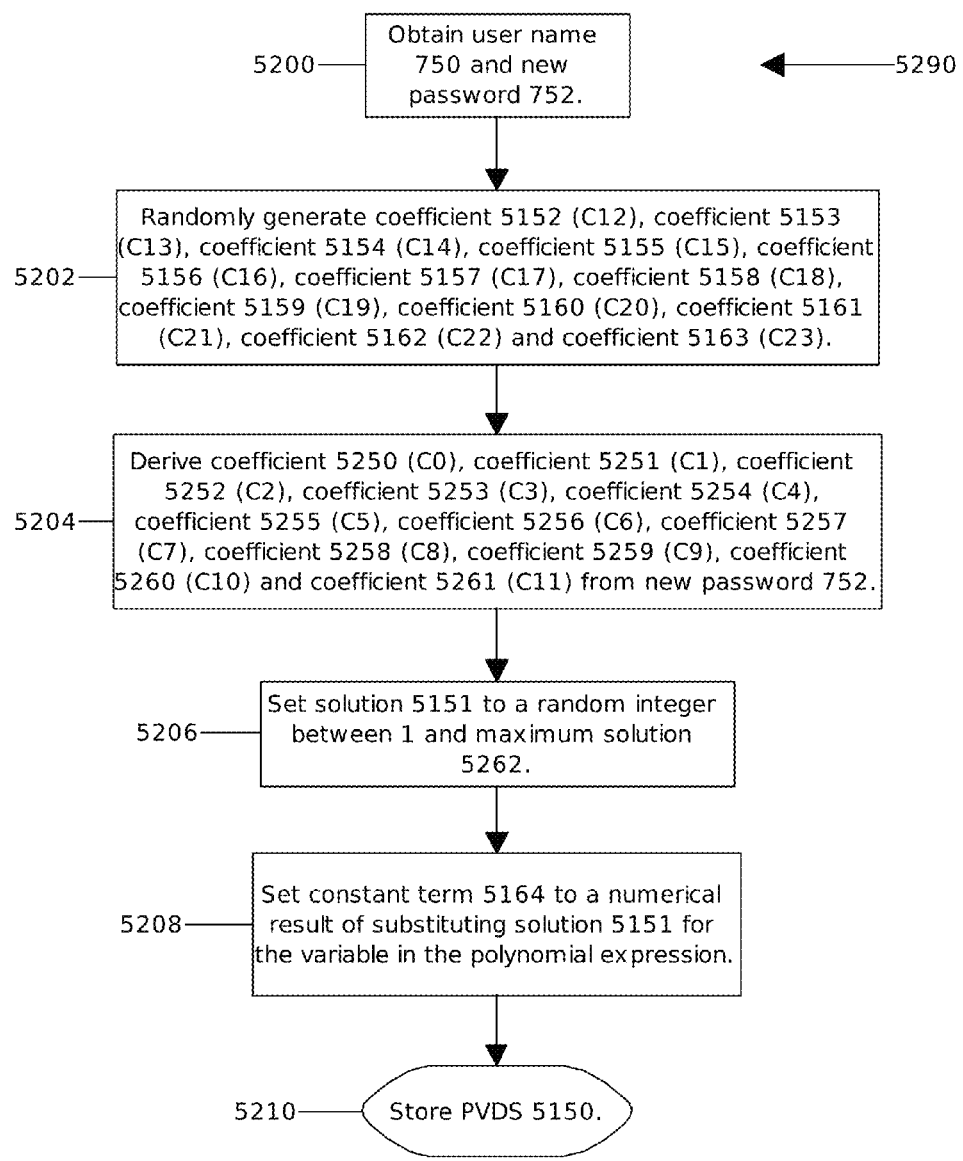
FIG. 52 is a flowchart that illustrates a method 5290 for generating the password verification data set 5150 of FIG. 51.

FIG. 52 illustrates an exemplary method 5290 that may be used by the processing device to generate the password verification data set 5150 for the user.

The processing device may start performing the method 5290 by obtaining the user name 750 and the new password 752 from the user (act 5200). Then, the processing device may randomly generate the coefficient 5152 (C12), the coefficient 5153 (C13), the coefficient 5154 (C14), the coefficient 5155 (C15), the coefficient 5156 (C16), the coefficient 5157 (C17), the coefficient 5158 (C18), the coefficient 5159 (C19), the coefficient 5160 (C20), the coefficient 5161 (C21), the coefficient 5162 (C22), and the coefficient 5163 (C23) (act 5202). Then, the processing device may derive the coefficient 5250 (C0), the coefficient 5251 (C1), the coefficient 5252 (C2), the coefficient 5253 (C3), the coefficient 5254 (C4), the coefficient 5255 (C5), the coefficient 5256 (C6), the coefficient 5257 (C7), the coefficient 5258 (C8), the coefficient 5259 (C9), the coefficient 5260 (C10), and the coefficient 5261 (C11) from the new password 752 (act 5204). (The coefficient 5250 (C0) through the coefficient 5261 (C11) are lower-order coefficients of a polynomial expression of one variable and the coefficient 5152 (C12) through the coefficient 5163 (C23) are higher-order coefficients of the polynomial expression.) Then, the processing device may set the solution 5151 equal to a randomly generated integer that is greater than zero and less than or equal to a maximum solution 5262 (act 5206). Then, the processing device may set the constant term 5164 equal to a numerical result of substituting the solution 5151 for the one variable of the polynomial expression (act 5208). Then, the processing device may store the password verification data set 5150 as described in the section of this disclosure titled COMMON FEATURES OF FIGS. 31-59 (act 5210), and the method 5290 may terminate.

Before implementing the method 5290, an implementer may make some determinations:
- a number of coefficients of the polynomial expression to generate randomly. If the number of randomly generated coefficients is eight or more, then the polynomial equation will be difficult for an attacker to solve. In the exemplary data of FIG. 51, the number of randomly generated coefficients is 12;
- a range of numbers from which each randomly generated coefficient is selected. The range of numbers for the exemplary data of FIG. 51 is 0 through 255;
- a method for deriving the lower-order coefficients of the polynomial expression from the new password 752. To generate the exemplary data of FIG. 51, numerical ASCII values of each character of the new password 752 were obtained; and
- a value of the maximum solution 5262 that is a largest number that the randomly generated solution 5151 can attain. To generate the exemplary data of FIG. 51, the maximum solution 5262 was set equal to 16777216 (two raised to a power of 24).

Increasing the number of coefficients of the polynomial expression that are generated randomly, as opposed to decreasing the number of coefficients of the polynomial expression that are generated randomly, widening the range of numbers from which each randomly generated coefficient is selected, as opposed to narrowing the range of numbers from which each randomly generated coefficient is selected, and increasing the value of the maximum solution 5262, as opposed to decreasing the value of the maximum solution 5262, may have the following effects:
- solving the polynomial equation may become more time-consuming, making attacks more difficult; and
- the method 5290 that generates the password verification data set 5150, and the method 5390 and the method 5490 that use the password verification data set 5150 to authenticate the trial password 1150, may take more time to execute.

FIG. 53

Figure 53:
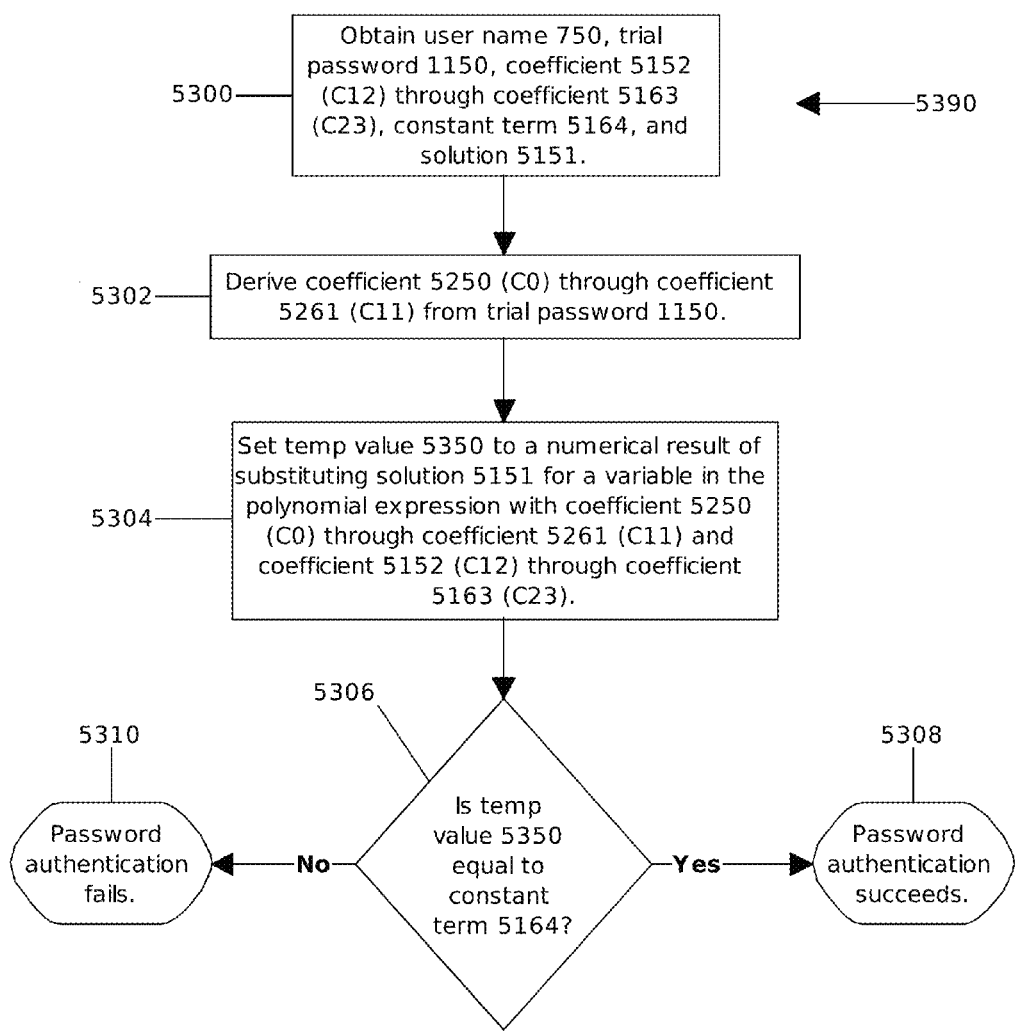
FIG. 53 is a flowchart that illustrates an exemplary quick password authentication method 5390 using the password verification data set 5150 of FIG. 51.

FIG. 53 illustrates the exemplary quick password authentication method 5390 that may be used by the processing device to authenticate the trial password 1150. The method 5390 may be used if the remote password verification data subset 954, depicted in FIG. 51, is available. If the remote password verification data subset 954 is not available, then the processing device may use the method 5490, illustrated in FIG. 54, instead.

The method 5390 uses the quick password verification data subset 1250 of the password verification data set 5150, depicted in FIG. 51.

The processing device may start performing the method 5390 by obtaining the user name 750 and the trial password 1150 from the user, and the quick password verification data subset 1250, including the solution 5151, the coefficient 5152 (C12), the coefficient 5153 (C13), . . . , the coefficient 5163 (C23), and the constant term 5164 (act 5300). The solution 5151 may be obtained from the remote password verification data subset 954, and the coefficient 5152 (C12), the coefficient 5153 (C13), . . . , the coefficient 5163 (C23), and the constant term 5164 may be obtained from the central password verification data subset 956. Then, the processing device may derive the coefficient 5250 (C0) through the coefficient 5261 (C11) from the trial password 1150 (act 5302). (The coefficient 5260 (C0) through the coefficient 5261 (C11) and the coefficient 5152 (C12) through the coefficient 5163 (C23) are the coefficients of the polynomial expression.) Then, the processing device may set a temp value 5350 to a numerical result of substituting the solution 5151 for the one variable of the polynomial expression (act 5304). Then, the processing device may determine whether the temp value 5350 is equal to the constant term 5164 (act 5306). If the temp value 5350 equals the constant term 5164, then the method 5390 may terminate and password authentication succeeds (act 5308). If the temp value 5350 does not equal the constant term 5164, then the method 5390 may terminate and password authentication fails (act 5310).

FIG. 54

Figure 54:
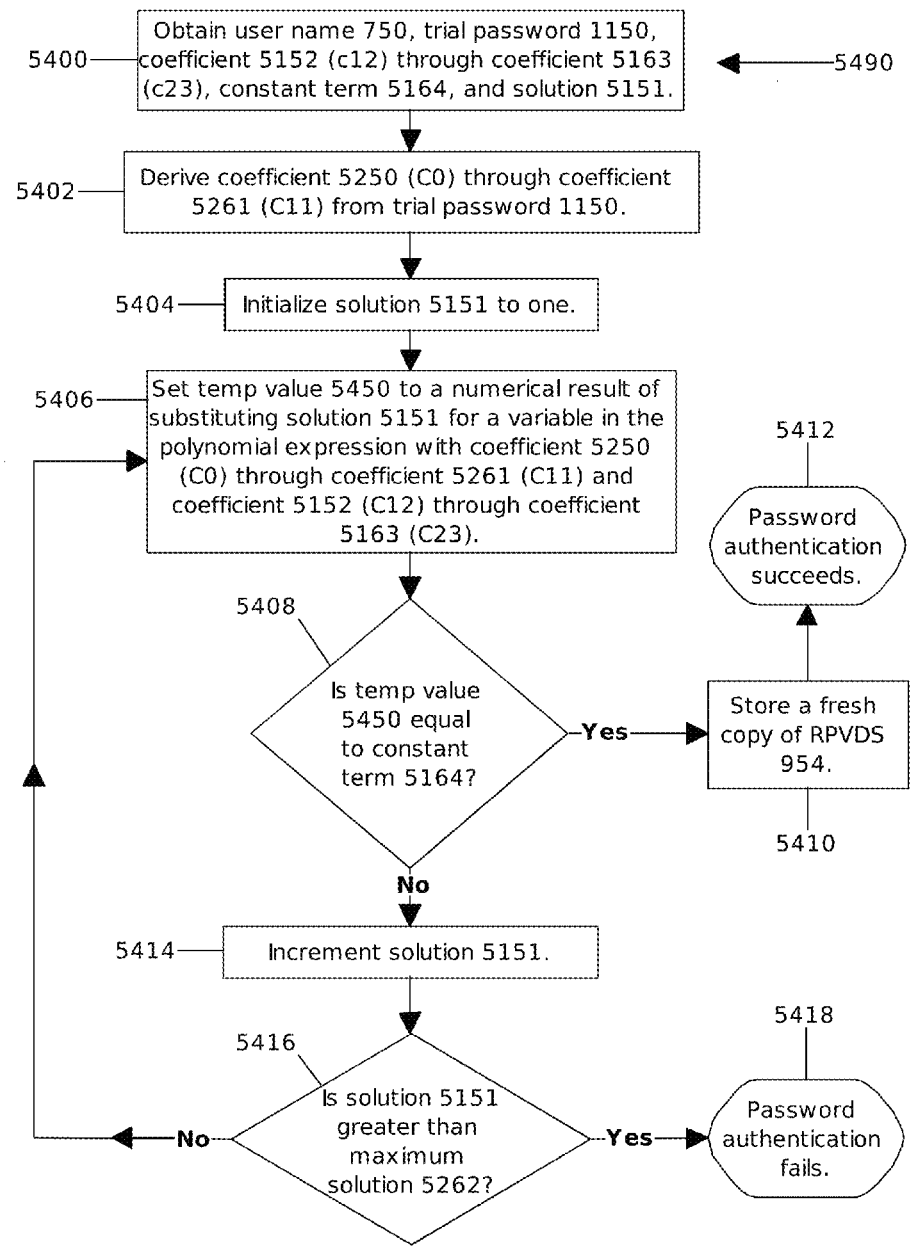
FIG. 54 is a flowchart that illustrates an exemplary slow password authentication method 5490 using the password verification data set 5150 of FIG. 51.

FIG. 54 illustrates the exemplary slow password authentication method 5490 that may be used by the processing device to authenticate the trial password 1150. The method 5490 uses the slow password verification data subset 1650 of the password verification data set 5150, depicted in FIG. 51.

The processing device may start performing the method 5490 by obtaining the user name 750 and the trial password 1150 from the user, and the slow password verification data subset 1650, including the coefficient 5152 (C12), the coefficient 5153 (C13), . . . , the coefficient 5163 (C23), and the constant term 5164 (act 5400). The coefficient 5152 (C12), the coefficient 5153 (C13), . . . , the coefficient 5163 (C23), and the constant term 5164 may be obtained from the central password verification data subset 956. Then, the processing device may derive the coefficient 5250 (C0) through the coefficient 5261 (C11) from the trial password 1150 (act 5402). (The coefficient 5250 (C0) through the coefficient 5261 (C11) and the coefficient 5152 (C12) through the coefficient 5163 (C23) are the coefficients of the polynomial expression.) Then, the processing device may set the solution 5151 to one (act 5404). Then, the processing device may execute a loop. As its first action in the loop, the processing device may set a temp value 5450 to the numerical result of substituting the solution 5151 for the one variable in the polynomial expression (act 5406). Then, the processing device may determine whether the temp value 5450 equals the constant term 5164 (act 5408). If the temp value 5450 equals the constant term 5164, then the processing device may proceed to act 5410. At act 5410, the processing device may attempt to store a fresh copy of the remote password verification data subset 954. Then the method 5490 may terminate and password authentication succeeds (act 5412). If, at act 5408, the temp value

5450 does not equal the constant term 5164, then the processing device may continue executing the loop and may proceed to act 5414. At act 5414, the processing device may increment the solution 5151. Then, the processing device may determine whether the solution 5151 is greater than a maximum solution 5262 (act 5416). If the solution 5151 is greater than the maximum solution 5250, then the method 5490 may terminate and password authentication fails (act 5418). If the solution 5151 is not greater than the maximum solution 5250, then the processing device may continue executing the loop and may return to act 5406.

Cryptographic Keys

Figure 56:
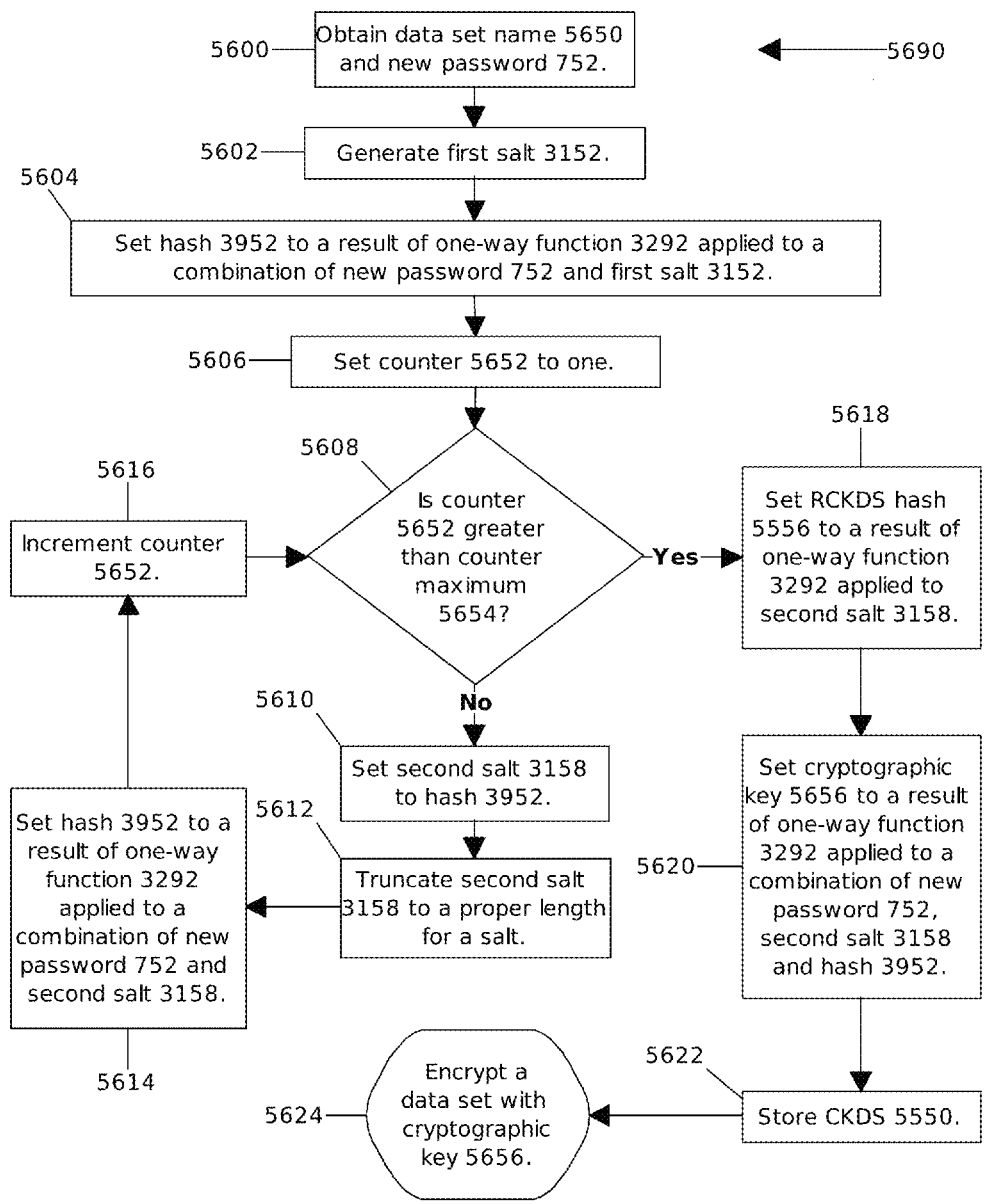
FIG. 56 is a flowchart that illustrates a method 5690 for generating the cryptographic key data set 5550 of FIG. 55.

A cryptographic key 5656 of FIG. 56, in conjunction with an encryption method, including, but not limited to, Data Encryption Standard (DES), triple-DES, Advanced Encryption Standard (AES) or Blowfish, may be used by a processing device to encrypt or decrypt a sensitive data set.

The storage of the cryptographic key 5656 raises many of the same concerns as the storage of a password. For example, if the cryptographic key 5656 is stored unencrypted, then it may be stolen or misused. If the cryptographic key 5656 is generated from a password, then an attacker may attempt to crack the password to reconstruct the cryptographic key 5656.

Some password verification data sets presented previously may be used, in conjunction with the password, to generate the cryptographic key 5656.

A set of data elements used to generate the cryptographic key 5656 is referred to herein as a cryptographic key data set 5550. The cryptographic key data set 5550 is stored in one or more storage devices. The cryptographic key 5656 is not stored but is instead generated as needed. The cryptographic key data set 5550 is analogous to the password verification data set.

A subset of the cryptographic key data set that is stored in a central storage device is referred to herein as a central cryptographic key data subset 5554. The central cryptographic key data subset 5554 is analogous to the central password verification data subset 956.

A subset of the cryptographic key data set that is stored in a remote storage device is referred to herein as a remote cryptographic key data subset 5552. The remote cryptographic key data subset 5552 is analogous to the remote password verification data subset 954.

A subset of the cryptographic key data set 5050 that is provided as input to a quick method for generating a cryptographic key is referred to herein as a quick cryptographic key data subset 5558. The quick cryptographic key data subset 5558 is analogous to the quick password verification data subset 1250.

A subset of the cryptographic key data set that is provided as input to a slow method for generating a cryptographic key is referred to herein as a slow cryptographic key data subset 5560. The slow cryptographic key data subset 5560 is analogous to the slow password verification data subset 1650.

A sensitive data set may be identified by a data set name 5650. The processing device uses the data set name 5650 to look up the cryptographic key data set for the sensitive data set. The data set name 5650 plays a role for the sensitive data set that is analogous to a role of the user name 750 for a user. However, there is a significant difference between the use of the data set name 5650 and the use of the user name 750. The user name 750 is associated with the password verification data set that is not shared with any other user. The data set name 5650 may be associated with the cryptographic key data set that may be shared with a different sensitive data set that uses a different data set name. If multiple sensitive data sets share a same cryptographic key data set, then the multiple sensitive data sets may each be encrypted and decrypted with a same cryptographic key, and the user may use a same password to encrypt or decrypt any of the multiple sensitive data sets.

Some exemplary cryptographic key data sets may include a RCKDS hash 5556 that serves a similar function as the RPVDS hash 3156 in some password verification data sets. The RCKDS hash 5556 is set equal to a result of a one-way function applied to a combination of at least one data element from the remote cryptographic key data subset. The RCKDS hash 5556 belongs to the central cryptographic key data subset. When the processing device performs the quick cryptographic key generation method, and obtains the at least one data element from the remote password verification data subset, the processing device may verify the authenticity of the at least one data element by calculating a result of the one-way function applied to a combination of the at least one data element and comparing the result to the RCKDS hash 5556. If an attacker spoofs the at least one data element, then a result of the one-way function applied to a combination of the attacker's spoofed at least one data element will almost certainly be different than the RCKDS hash 5556 stored in the central cryptographic key data subset, and the attacker's attempt to generate the cryptographic key 5656 will be rejected.

Figure 55:
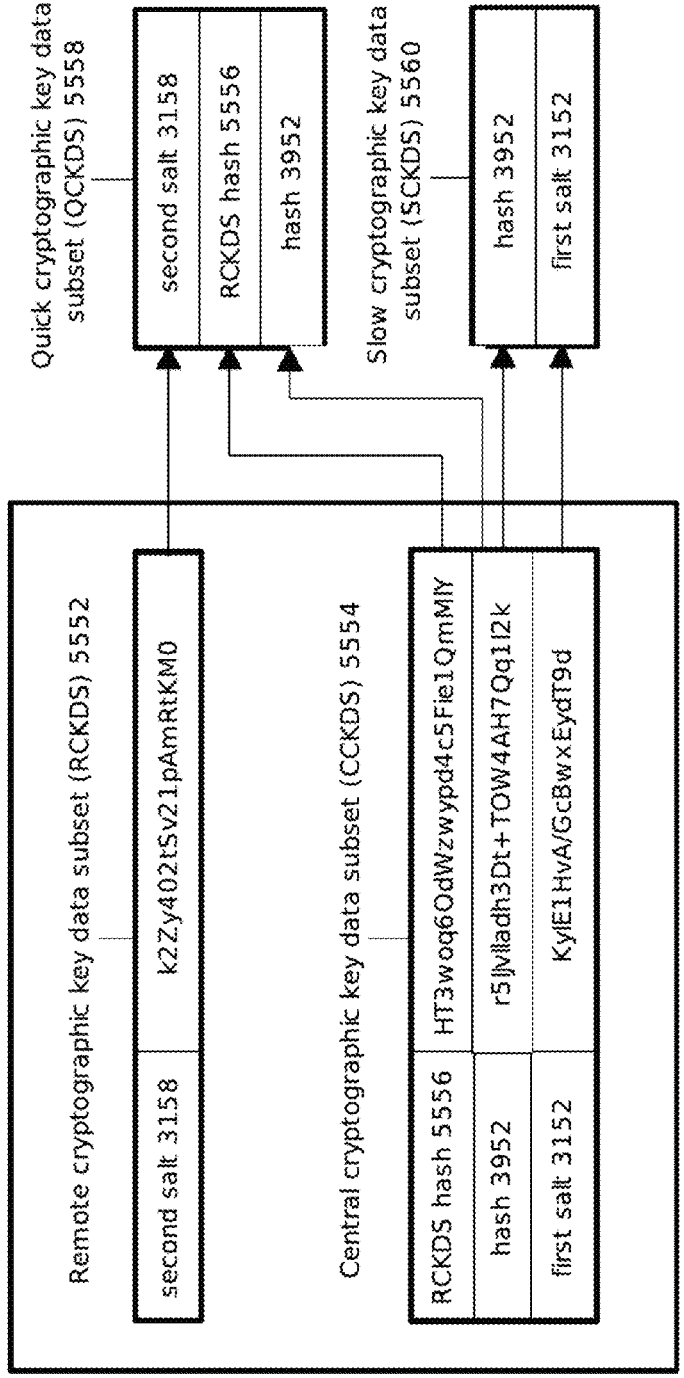
FIG. 55 illustrates an exemplary cryptographic key data set 5550.
Figure 57:
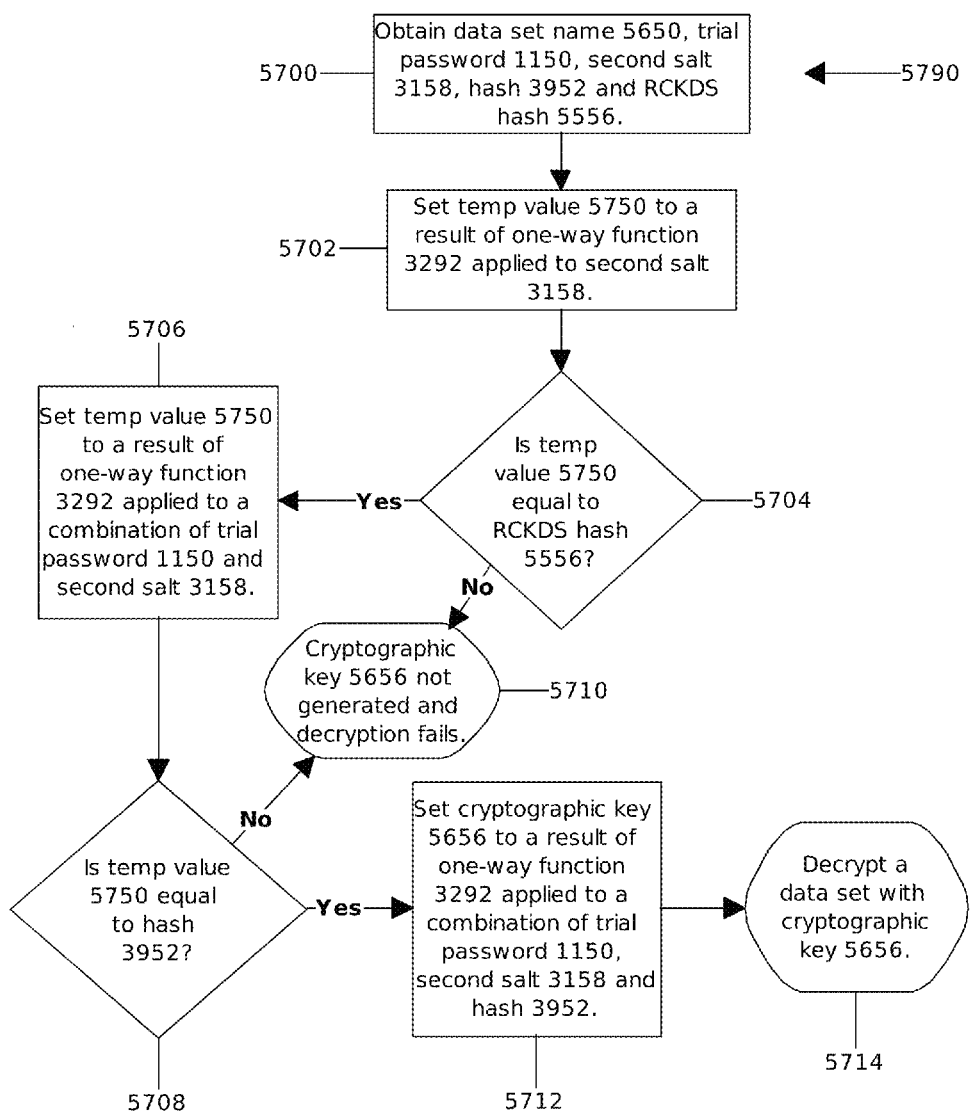
FIG. 57 is a flowchart that illustrates an exemplary quick cryptographic key generation method 5790 using the cryptographic key data set 5550 of FIG. 55.
Figure 58:
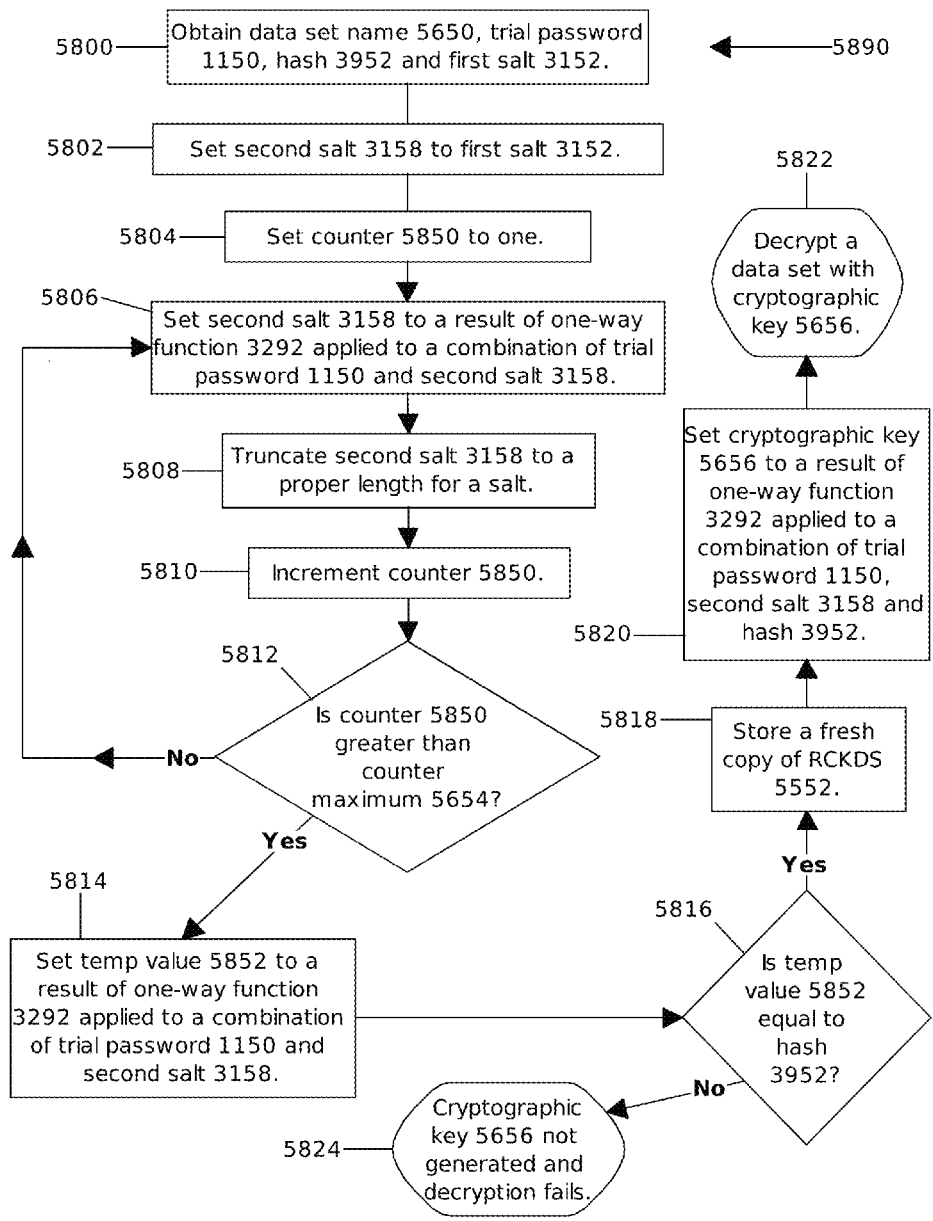
FIG. 58 is a flowchart that illustrates an exemplary slow cryptographic key generation method 5890 using the cryptographic key data set 5550 of FIG. 55.

FIGS. 55-58 are closely related. FIG. 55 depicts a specific cryptographic key data set 5550 and four of its subsets: a remote cryptographic key data subset 5552, a central cryptographic key data subset 5554, a quick cryptographic key data subset 5558 and a slow cryptographic key data subset 5560. FIG. 56 depicts a method 5690 that may generate the cryptographic key data set 5550 and the cryptographic key 5656. FIG. 57 depicts a method 5790 that may generate the cryptographic key 5656 based on the quick cryptographic key data subset 5558. FIG. 58 depicts a method 5890 that may generate the cryptographic key 5656 based on the slow cryptographic key data subset 5560.

In the embodiment depicted in FIGS. 55-58, a same processing device may perform the three methods depicted in FIGS. 56-58. In other embodiments, different processing devices may perform the three methods.

FIG. 55

FIG. 55 illustrates the exemplary cryptographic key data set 5550 that may be used by a processing device when performing a cryptographic key generation method consistent with the subject matter of this disclosure. The cryptographic key data set 5550 is based on the password verification data set 3950 depicted in FIG. 39. The exemplary method 5690, depicted in FIG. 56, may generate the cryptographic key data set 5550 and is based on the exemplary method 4090, depicted in FIG. 40. The exemplary method 5790, depicted in FIG. 57, may quickly generate the cryptographic key 5656, and is based on the exemplary method 4190, depicted in FIG. 41. The exemplary method 5890, depicted in FIG. 58, may slowly generate the cryptographic key 5656, and is based on the exemplary method 4290, depicted in FIG. 42.

The cryptographic key data set 5550 includes four elements: the first salt 3152, the second salt 3158, the hash 3952, and the RCKDS hash 5556.

FIG. 55 shows an exemplary value for the first salt 3152, "KyIE1HvA/GcBwxEydT9d", an exemplary value for the second salt 3158, "k2Zy402tSv21pAmRtKM0", an exemplary value for the hash 3952, "r5lJvIladh3Dt+TOW4AH7Qq112k", and an exemplary value for the RCKDS hash 5556, "HT3woq6OdWzwypd4c5Fie1QmMlY". The four exemplary values are all base64-encoded strings. Although, in other embodiments other encoding methods may be employed.

The cryptographic key data set 5550 may be divided into the central cryptographic key data subset 5554 that may be stored in a central storage device, and the remote cryptographic key data subset 5552 that may be stored in a remote storage device. The central cryptographic key data subset 5554 includes the first salt 3152, the hash 3952 and the RCKDS hash 5556. The remote cryptographic key data subset 5552 includes the second salt 3158. When a user attempts to decrypt the sensitive data set and the remote cryptographic key data subset 5552 is available, the processing device may construct a quick cryptographic key data subset 5558 including the second salt 3158, the hash 3952, and the RCKDS hash 5556, and may execute the quick cryptographic key generation method 5790 depicted in FIG. 57. When the user attempts to decrypt the sensitive data set and the remote cryptographic key data subset 5552 is not available, the processing device may construct the slow cryptographic key data subset 5560 including the first salt 3152 and the hash 3952, and may execute the slow cryptographic key generation method 5890 depicted in FIG. 58.

In an alternative embodiment, an exemplary cryptographic key data set may be based on the password verification data set 4350 depicted in FIG. 43.

FIG. 56

FIG. 56 illustrates the exemplary method 5690 that may be used by the processing device to generate the cryptographic key data set 5550 and the cryptographic key 5656 from the new password 752 provided by the user. The processing device may then use the cryptographic key 5656 to encrypt the sensitive data set.

The processing device may start performing the method 5690 by obtaining the data set name 5650 and the new password 752 from the user (act 5600). The user may indicate a desire for a cryptographic key and may provide the data set name 5650 and the new password 752 in a manner similar to the manner previously described with respect to the user providing a user name and password.

The processing device may then generate the first salt 3152 (act 5602). Then, the processing device may set the hash 3952 to a result of the one-way function 3292 applied to a combination of the new password 752 and the first salt 3152 (act 5604). Then, the processing device may set a counter 5652 to one (act 5606). Then, the processing device may execute a loop. As its first action in the loop, the processing device may determine whether the counter 5652 is greater than a counter maximum 5654 (act 5608). If the counter 5652 is not greater than the counter maximum 5654, then the processing device may continue to execute the loop and may proceed to act 5610. At act 5610, the processing device may set the second salt 3158 equal to the hash 3952. Then, the processing device may truncate the second salt 3158 so that it is a proper length for a salt (act 5612). Then, the processing device may set the hash 3952 to a result of the one-way function 3292 applied to a combination of the new password 752 and the second salt 3158 (act 5614). Then, the processing device may increment the counter 5652 (act 5616). Then, the processing device may return to act 5608. If, at act 5608, the processing device determines that the counter 5652 is greater than the counter maximum 5654, then the processing device may stop executing the loop and may proceed to act 5618. At act 5618, the processing device may set the RCKDS hash 5556 to a result of the one-way function 3292 applied to the second salt 3158. Then, the processing device may set the cryptographic key 5656 to a result of the one-way function 3292 applied to a combination of the new password 752, the second salt 3158, and the hash 3952 (act 5620). Then, the processing device may store the cryptographic key data set 5550 (act 5622) as follows: the central cryptographic key data subset 5554 may be stored in the central storage device; and the remote cryptographic key data subset 5552 may be stored in the remote storage device. Then, the processing device may encrypt the sensitive data set, having the data set name 5650, using the cryptographic key 5656, and the method 5690 may terminate (act 5624).

Before implementing the method 5690, an implementer may make some determinations:
 a one-way function to use for the one-way function 3292;
 a number of characters or bits that the first salt 3152 and the second salt 3158 include, and a method for generating the salts;
 a method for combining some data elements, such as the new password 752 with the first salt 3152, the new password 752 with the second salt 3158, and the new password 752 with the second salt 3158 and the hash 3952; and
 a value of the counter maximum 5654.

Some factors influencing the determinations 1-3 were discussed in the section of this disclosure titled "COMMON FEATURES OF FIGS. 31-59." Regarding the determination 4, choosing a larger value of the counter maximum 5654, as opposed to choosing a smaller value of the counter maximum 5654, may have the following effects:
 the method 5690 may take longer to execute;
 the cryptographic key data set 5550 generated by the method 5690 may be more resistant to attacks; and
 the method 5890, depicted in FIG. 58, that generates the cryptographic key 5656 when the remote cryptographic key data subset 5552 is not available, may take longer.

With modern processing devices, some values for the counter maximum 3252 of one hundred thousand to one billion may be considered.

FIG. 57

FIG. 57 illustrates the exemplary quick cryptographic key generation method 5790 that may be used to generate the cryptographic key 5656 from the cryptographic key data set 5550 depicted in FIG. 55. The cryptographic key 5656 may then be used to decrypt the sensitive data set. The method 5790 may be used if the remote cryptographic key data subset 5552, depicted in FIG. 55, is available. If the remote cryptographic key data subset 5552 is not available, then the processing device may use the method 5890, depicted in FIG. 58, instead.

The method 5790 uses the quick cryptographic key data subset 5558 of the cryptographic key data set 5550, depicted in FIG. 55.

The processing device may start performing the method 5790 by obtaining the data set name 5650 and the trial password 1150 from the user, and the quick cryptographic key data subset 5558, including the second salt 3158, the hash 3952 and the RCKDS hash 5556 (act 5700). The second salt 3158 may be obtained from the remote cryptographic key data subset 5552, and the hash 3952 and the RCKDS hash 5556 may be obtained from the central cryptographic key data subset 5554. Then, the processing device may set a temp value 5750 to a result of the one-way function 3292 applied to the second salt 3158 (act 5702). Then, the processing device may determine whether the temp value 5750 is equal to the RCKDS hash 5556 (act 5704). If the temp value 5750 does not equal the RCKDS hash 5556, then the method 5790 may terminate and fail to generate the cryptographic key 5656 (act 5710). If the temp value 5750 equals the RCKDS hash 5556, then the processing device may proceed to act 5706. At act 5706, the processing device may set the temp value 5750 to a result of the one-way function 3292 applied to a combination of the trial password 1150 and the second salt 3158. Then, the processing device may determine whether the temp value 5750 is equal to the hash 3952 (act 5708). If the temp value 5750 does not equal the hash 3952, then the method 5790 may terminate and fail to generate the cryptographic key 5656 (act 5710). If the temp value 5750 equals the hash 3952, then the processing device may proceed to act 5712. At act 5712, the processing device may set the cryptographic key 5656 to a result of the one-way function 3292 applied to a combination of the trial password 1150, the second salt 3158 and the hash 3952. Then, the processing device may decrypt the sensitive data set with the data set name 5650 using the cryptographic key 5656, and the method 5790 may terminate (act 5714).

An implementer of the method 5790 uses a same one-way function 3292 as he/she determined to use for the method 5690. In addition, the implementer uses a same method to combine some data elements, such as the trial password 1150 with the second salt 3158 and the trial password 1150 with the second salt 3158 and the hash 3952, as the method he/she determined to use to combine some data elements within the method 5690. The method 5690 is depicted in FIG. 56.

In other embodiments, the cryptographic key 5656 may be used for other purposes, including, but not limited to, re-encrypting the sensitive data set with the data set name 5650 using the cryptographic key 5656 and encrypting a different data set using the cryptographic key 5656.

FIG. 58

FIG. 58 illustrates the exemplary slow cryptographic key generation method 5890 that may be used to generate the cryptographic key 5656 from the cryptographic key data set 5550 depicted in FIG. 55. The cryptographic key 5656 may then be used to decrypt the sensitive data set.

The method 5890 uses the slow cryptographic key data subset 5560 of the cryptographic key data set 5550, also depicted in FIG. 55.

The processing device may start performing the method 5890 by obtaining the data set name 5650 and the trial password 1150 from the user, and the first salt 3152 and the hash 3952 from the central cryptographic key data subset 5554 (act 5800). Then, the processing device may set the second salt 3158 equal to the first salt 3152 (act 5802). Then, the processing device may set a counter 5850 to one (act 5804). Then, the processing device may execute a loop. As its first action in the loop, the processing device may set the second salt 3158 to a result of the one-way function 3292 applied to a combination of the trial password 1150 and the second salt 3158 (act 5806). Next, the processing device may truncate the second salt 3158 to a proper length for a salt (act 5808). Next, the processing device may increment the counter 5850 (act 5810). Next, the processing device may determine whether the counter 5850 is greater than a counter maximum 5654 (act 5812). If the counter 5850 is less than or equal to the counter maximum 5654, then the processing device may continue executing the loop and may return to the top of the loop, act 5806. If the counter 5850 is greater than the counter maximum 5654, then the processing device may stop executing the loop and may proceed to act 5814. At act 5814, the processing device may set a temp value 5852 to a result of the one-way function 3292 applied to a combination of the trial password 1150 and the second salt 3158. Then, the processing device may determine whether the temp value 5852 is equal to the hash 3952 (act 5816). If the temp value 5852 does not equal the hash 3952, then the method 5890 may terminate and fail to generate the cryptographic key 5656 (act 5824). If the temp value 5852 equals the hash 3952, then the method may proceed to act 5818. At act 5818, the processing device may attempt to store a fresh copy of the remote cryptographic key data subset 5552. (How the storage operation is performed depends on an operating environment in which the method 5890 is executing.) Then, the processing device may set a cryptographic key 5656 to a result of the one-way function 3292 applied to a combination of the trial password 1150, the second salt 3158 and the hash 3952 (act 5820). Then, the processing device may decrypt the sensitive data set with the data set name 5650 using the cryptographic key 5656, and the method 5890 may terminate (act 5822).

An implementer of the method 5890 uses the same one-way function 3292 as he/she determined to use for the method 5690. The implementer uses the same method to combine some data elements, including the trial password 1150 with the second salt 3158 and the trial password 1150 with the second salt 3158 and the hash 3952, as the method that was used to combine some data elements within the method 5690. In addition, the implementer uses a same value of the counter maximum 5654 as the value that was used for the method 5690. The method 5690 is depicted in FIG. 56.

In other embodiments, the cryptographic key 5656 may be used for other purposes, including, but not limited to, re-encrypting the sensitive data set with the data set name 5650 using the cryptographic key 5656, and encrypting a different data set using the cryptographic key 5656.

Other Cryptographic Key Data Sets

A cryptographic key data set may include the same data elements as the password verification data set 3150, with one exception: the RPVDS hash 3156 in password verification data set 3150 is replaced by the RCKDS hash 5556 in the cryptographic key data set. The cryptographic key data set may be used to generate the cryptographic key 5656. The cryptographic key 5656 may then be used to encrypt or decrypt the sensitive data set.

The following changes may be applied to the exemplary method 3290, depicted in FIG. 32, to generate the cryptographic key data set and the cryptographic key 5656. In act 3200, obtain the data set name 5650 and the trial password 1150 instead of obtaining the user name 750 and the trial password 1150. In act 3216, set the RCKDS hash 5556 to a result of the one-way function 3292 applied to the first salt 3152 instead of setting the RPVDS hash 3156 to the result of the one-way function 3292 applied to the first salt 3152. In act 3218, store the cryptographic key data set instead of the password verification data set 3150. Add two acts after act 3218. In the first new act, generate the cryptographic key 5656 by applying the one-way function 3292 to a combination of the new password 752, the second salt 3158 and the second hash 3160. In the second new act, encrypt the sensitive data set with the cryptographic key 5656.

The following changes may be applied to the exemplary method 3390, depicted in FIG. 33, to generate the cryptographic key 5656. In act 3300, obtain the data set name 5650 and the trial password 1150 instead of obtaining the user name 750 and the trial password 1150. In act 3304, determine whether the temp value 3350 equals the RCKDS hash 5556 instead of determining whether the temp value 3350 equals the RPVDS hash 3156. In act 3312, fail to generate the cryptographic key 5656 instead of failing to authenticate the trial password 1150. In act 3310, generate the cryptographic key 5656 by applying the one-way function 3292 to the combination of the trial password 1150, the second salt 3158 and the second hash 3160 instead of successfully authenticating the trial password 1150. After act 3310, add one act that decrypts the sensitive data set with the cryptographic key 5656.

The following changes may be applied to the exemplary method 3490, depicted in FIG. 34, to generate the cryptographic key 5656. In act 3400, obtain the data set name 5650 and the trial password 1150 instead of obtaining the user name 750 and the trial password 1150. In act 3426, fail to generate the cryptographic key 5656 instead of failing to authenticate the trial password 1150. In act 3416, store a fresh copy of the remote cryptographic key data subset of the cryptographic key data set instead of storing a fresh copy of the remote password verification data subset 954. In act 3424, generate cryptographic key 5656 by applying the one-way function 3292 to the combination of the trial password 1150, the second salt 3158 and the second hash 3160 instead of successfully authenticating the trial password 1150. After act 3424, add one act that decrypts the sensitive data set with the cryptographic key 5656.

A cryptographic key data set may include the same data elements as the password verification data set 3550, with one exception: the RPVDS hash 3156 in password verification data set 3550 is replaced by the RCKDS hash 5556 in the cryptographic key data set. The cryptographic key data set may be used to generate the cryptographic key 5656. The cryptographic key 5656 may then be used to encrypt or decrypt the sensitive data set.

The following changes may be applied to the exemplary method 3690, depicted in FIG. 36, to generate the cryptographic key data set and the cryptographic key 5656. In act 3600, obtain the data set name 5650 and the trial password 1150 instead of obtaining the user name 750 and the trial password 1150. In act 3616, set the RCKDS hash 5556 to a result of the one-way function 3292 applied to the first hash 3154 instead of setting the RPVDS hash 3156 to the result of the one-way function 3292 applied to the first hash 3154. In act 3618, store the cryptographic key data set instead of the password verification data set 3550. Add two acts after act 3618. In the first new act, generate the cryptographic key 5656 by applying the one-way function 3292 to a combination of the new password 752, the salt 3552 and the second hash 3160. In the second new act, encrypt the sensitive data set with the cryptographic key 5656.

The following changes may be applied to the exemplary method 3790, depicted in FIG. 37, to generate the cryptographic key 5656. In act 3700, obtain the data set name 5650 and the trial password 1150 instead of obtaining the user name 750 and the trial password 1150. In act 3704, determine whether the temp value 3750 equals the RCKDS hash 5556 instead of determining whether the temp value 3750 equals the RPVDS hash 3156. In act 3712, fail to generate the cryptographic key 5656 instead of failing to authenticate the trial password 1150. In act 3710, generate the cryptographic key 5656 by applying the one-way function 3292 to the combination of the trial password 1150, the salt 3552 and the second hash 3160 instead of successfully authenticating the trial password 1150. After act 3710, add one act that decrypts the sensitive data set with the cryptographic key 5656.

The following changes may be applied to the exemplary method 3890, depicted in FIG. 38, to generate the cryptographic key 5656. In act 3800, obtain the data set name 5650 and the trial password 1150 instead of obtaining the user name 750 and the trial password 1150. In act 3820, fail to generate the cryptographic key 5656 instead of failing to authenticate the trial password 1150. In act 3816, store a fresh copy of the remote cryptographic key data subset of the cryptographic key data set instead of storing a fresh copy of the remote password verification data subset 954. In act 3818, generate cryptographic key 5656 by applying the one-way function 3292 to the combination of the trial password 1150, the salt 3552 and the second hash 3160 instead of successfully authenticating the trial password 1150. After act 3818, add one act that decrypts the sensitive data set with the cryptographic key 5656.

FIGS. 55-58 show how to modify the password verification data set 3950 and the methods 4090, 4190 and 4290 to generate the cryptographic key 5656.

A cryptographic key data set may include the same data elements as the password verification data set 4350, with one exception: the RPVDS hash 3156 in password verification data set 4350 is replaced by the RCKDS hash 5556 in the cryptographic key data set. The cryptographic key data set may be used to generate the cryptographic key 5656. The cryptographic key 5656 may then be used to encrypt or decrypt the sensitive data set.

The following changes may be applied to the exemplary method 4490, depicted in FIG. 44, to generate the cryptographic key data set and the cryptographic key 5656. In act 4400, obtain the data set name 5650 and the trial password 1150 instead of obtaining the user name 750 and the trial password 1150. In act 4420, set the RCKDS hash 5556 to a result of the one-way function 3292 applied to the second salt 3158 instead of setting the RPVDS hash 3156 to the result of the one-way function 3292 applied to the second salt 3158. In act 4422, store the cryptographic key data set instead of the password verification data set 4350. Add two acts after act 4422. In the first new act, generate the cryptographic key 5656 by applying the one-way function 3292 to a combination of the new password 752, the hash 3952 and the second salt 3158. In the second new act, encrypt the sensitive data set with the cryptographic key 5656.

The following changes may be applied to the exemplary method 4590, depicted in FIG. 45, to generate the cryptographic key 5656. In act 4500, obtain the data set name 5650 and the trial password 1150 instead of obtaining the user name 750 and the trial password 1150. In act 4504, determine whether the temp value 4550 equals the RCKDS hash 5556 instead of determining whether the temp value 4550 equals the RPVDS hash 3156. In act 4512, fail to generate the cryptographic key 5656 instead of failing to authenticate the trial password 1150. In act 4510, generate the cryptographic key 5656 by applying the one-way function 3292 to the combination of the trial password 1150, the hash 3952 and the second salt 3158 instead of successfully authenticating the trial password 1150. After act 4510, add one act that decrypts the sensitive data set with the cryptographic key 5656.

The following changes may be applied to the exemplary method 4690, depicted in FIG. 46, to generate the cryptographic key 5656. In act 4600, obtain the data set name 5650 and the trial password 1150 instead of obtaining the user name 750 and the trial password 1150. In act 4614, store a fresh copy of the remote cryptographic key data subset of the cryptographic key data set instead of storing a fresh copy of the remote password verification data subset 954. In act 4616, generate cryptographic key 5656 by applying the one-way function 3292 to the combination of the trial password 1150, the hash 3952 and the second salt 3158 instead of successfully authenticating the trial password 1150. After act 4616, add one act that decrypts the sensitive data set with the cryptographic key 5656.

A cryptographic key data set may include the same data elements as the password verification data set 4750, with one exception: the RPVDS hash 3156 in password verification data set 4750 is replaced by the RCKDS hash 5556 in the cryptographic key data set. The cryptographic key data set may be used to generate the cryptographic key 5656. The cryptographic key 5656 may then be used to encrypt or decrypt the sensitive data set.

The following changes may be applied to the exemplary method 4890, depicted in FIG. 48, to generate the cryptographic key data set and the cryptographic key 5656. In act 4800, obtain the data set name 5650 and the trial password 1150 instead of obtaining the user name 750 and the trial password 1150. In act 4812, set the RCKDS hash 5556 to a result of the one-way function 3292 applied to a combination of the salt 3552 and the salt salt 4752 instead of setting the RPVDS hash 3156 to the result of the one-way function 3292 applied to the combination of the salt 3552 and the salt salt 4752. In act 4814, store the cryptographic key data set instead of the password verification data set 4750. Add two acts after act 4814. In the first new act, generate the cryptographic key 5656 by applying the one-way function 3292 to a combination of the new password 752, the hash 3952 and the salt 3552. In the second new act, encrypt the sensitive data set with the cryptographic key 5656.

The following changes may be applied to the exemplary method 4990, depicted in FIG. 49, to generate the cryptographic key 5656. In act 4900, obtain the data set name 5650 and the trial password 1150 instead of obtaining the user name 750 and the trial password 1150. In act 4904, determine whether the temp value 4950 equals the RCKDS hash 5556 instead of determining whether the temp value 4950 equals the RPVDS hash 3156. In act 4912, fail to generate the cryptographic key 5656 instead of failing to authenticate the trial password 1150. In act 4910, generate the cryptographic key 5656 by applying the one-way function 3292 to the combination of the trial password 1150, the hash 3952 and the salt 3552 instead of successfully authenticating the trial password 1150. After act 4910, add one act that decrypts the sensitive data set with the cryptographic key 5656.

The following changes may be applied to the exemplary method 5090, depicted in FIG. 50, to generate the cryptographic key 5656. In act 5000, obtain the data set name 5650 and the trial password 1150 instead of obtaining the user name 750 and the trial password 1150. In act 5018, fail to generate the cryptographic key 5656 instead of failing to authenticate the trial password 1150. In act 5014, store a fresh copy of the remote cryptographic key data subset of the cryptographic key data set instead of storing a fresh copy of the remote password verification data subset 954. In act 5016, generate cryptographic key 5656 by applying the one-way function 3292 to the combination of the trial password 1150, the hash 3952 and the salt 3552 instead of successfully authenticating the trial password 1150. After act 5016, add one act that decrypts the sensitive data set with the cryptographic key 5656.

A cryptographic key data set may include the same data elements as the password verification data set 5150, and may be used to generate the cryptographic key 5656. The cryptographic key 5656 may then be used to encrypt or decrypt the sensitive data set.

The following changes may be applied to the exemplary method 5290, depicted in FIG. 52, to generate the cryptographic key data set and the cryptographic key 5656. In act 5200, obtain the data set name 5650 and the trial password 1150 instead of obtaining the user name 750 and the trial password 1150. In act 5210, store the cryptographic key data set instead of the password verification data set 5150. Add two acts after act 5210. In the first new act, generate the cryptographic key 5656 by applying the one-way function 3292 to a combination of the new password 752, the constant term 5164, and the solution 5151. In the second new act, encrypt the sensitive data set with the cryptographic key 5656.

The following changes may be applied to the exemplary method 5390, depicted in FIG. 53, to generate the cryptographic key 5656. In act 5300, obtain the data set name 5650 and the trial password 1150 instead of obtaining the user name 750 and the trial password 1150. In act 5310, fail to generate the cryptographic key 5656 instead of failing to authenticate the trial password 1150. In act 5312, generate the cryptographic key 5656 by applying the one-way function 3292 to the combination of the trial password 1150, the constant term 5164, and the solution 5151 instead of successfully authenticating the trial password 1150. After act 5312, add one act that decrypts the sensitive data set with the cryptographic key 5656.

The following changes may be applied to the exemplary method 5490, depicted in FIG. 54, to generate the cryptographic key 5656. In act 5400, obtain the data set name 5650 and the trial password 1150 instead of obtaining the user name 750 and the trial password 1150. In act 5418, fail to generate the cryptographic key 5656 instead of failing to authenticate the trial password 1150. In act 5410, store a fresh copy of the remote cryptographic key data subset of the cryptographic key data set instead of storing a fresh copy of the remote password verification data subset 954. In act 5412, generate cryptographic key 5656 by applying the one-way function 3292 to the combination of the trial password 1150, the constant term 5164, and the solution 5151 instead of successfully authenticating the trial password 1150. After act 5412, add one act that decrypts the sensitive data set with the cryptographic key 5656.

In each of the embodiments described in this section, an implementer may generate the cryptographic key 5656 based on a different combination of data elements than the combination of data elements specified herein. To make the cryptographic key data set more secure against attacks, the different combination may include at least one data element from the central cryptographic key data subset 5554 and at least one data element from the remote cryptographic key data subset 5552 that can be regenerated from the central cryptographic key data subset 5554 and the trial password 1150. The implementer may avoid using data elements from the remote cryptographic key data subset 5552 that cannot be regenerated from the central cryptographic key data subset 5554 and the trial password 1150.

Brute Force and Dictionary Attacks

Attackers who seek to crack passwords are often criminals. However, there are legitimate reasons to crack passwords including, but not limited to, the following:

an individual may want to recover his/her own forgotten password;

an organization may want to recover a password of a former employee to regain access to data stored in the former employee's account; or law enforcement personnel may want to access an account and/or read an encrypted data set of a criminal suspect.

For most of the exemplary password verification data sets presented previously, methods for performing dictionary and brute force attacks are straightforward. However, the password verification data set 4350, depicted in FIG. 43, presents a greater challenge to an attacker because of a role that random numbers play in generating the password verification data set 4350.

FIG. 59

FIG. 59 illustrates an exemplary method 5990 that may be used by a processing device to perform a dictionary or brute force attack seeking to recover a password from the password verification data set 4350, depicted in FIG. 43. The method 5990 is performed in the exemplary attack operating environment 500 depicted in FIG. 5.

In the dictionary or brute force attack, the processing device attempts to authenticate a series of trial passwords. In the dictionary attack, the processing device tries to authenticate trial passwords 1150 from a list of likely passwords. In the brute force attack, the processing device tries to authenticate all possible trial passwords 1150 meeting some criteria, such as, for example, the trial password 1150 being shorter than nine characters. Both dictionary attacks and brute force attacks may use a trial password iteration function 5992 that may generate a different trial password 1150 each time the function is called. For dictionary attacks, the trial password iteration function 5992 may look up and return a next trial password 1150 from the list of likely passwords. For a brute force attack, the trial password iteration function 5992 may return a next trial password 1150 that meets the criteria for trial passwords. The trial password iteration function 5992 may also return a code indicating that all trial passwords have already been returned.

Before performing the dictionary attack or the brute force attack, the attacker obtains the central password verification data subset 956 of the password verification data set 4350 for a password that he/she is trying to recover. The attacker also learns how the password verification data set 4350 was generated (by the method 4490, depicted in FIG. 44), and all the determinations that the implementer of the method 4490 made when he/she implemented the method 4490.

To perform the method 5990, the processing device may start by obtaining the first salt 3152 and the hash 3952 from the central password verification data subset 956 (act 5900). Then, the processing device may set the second salt 3158 equal to the first salt 3152 (act 5902). Then, the processing device may execute an outer loop. As its first action in the outer loop, the processing device may determine whether a password iteration function 5992 can generate another trial password 1150 (act 5904). If the password iteration function 5992 cannot generate another trial password 1150, then the processing device may stop executing the outer loop, the method 5990 may terminate, and the attack may fail to recover the password (act 5906). If the password iteration function 5992 is able to generate another trial password 1150, then the processing device may continue executing the outer loop and may proceed to act 5908. At act 5908, the processing device may obtain the next trial password 1150 from the password iteration function 5992. Then, the processing device may set a counter 5950 to zero (act 5910). Then, the processing device may execute an inner loop. As its first action in the inner loop, the processing device may set a trial hash 5952 to a result of the one-way function 3292 applied to a combination of the trial password 1150 and the second salt 3158 (act 5912). Then, the processing device may determine whether the trial hash 5952 equals the hash 3952 (act 5914). If the trial hash 5952 equals the hash 3952, then the processing device may stop executing both the inner and the outer loops and the method 5990 may terminate successfully with the trial password 1150 as a recovered password (act 5916). If the trial hash 5952 does not equal the hash 3952, then the processing device may proceed to act 5918. At act 5918, the processing device may increment the counter 5950. Then, the processing device may determine whether the counter 5950 is less than a counter maximum 5954 (act 5920). If the counter 5950 is not less than the counter maximum 5954, then the processing device may stop executing the inner loop and may return to act 5904. If the counter 5950 is less than the counter maximum 5954, then the processing device may proceed to act 5922. At act 5922, the processing device may set the second salt 3158 equal to the trial hash 5952. Then, the processing device may truncate the second salt 3158 to a proper length for a salt (act 5924). Then, the processing device may set the second salt 3158 to a result of the perturb function 4492 applied to the second salt 3158 (act 5926). Then, the processing device may continue executing the inner loop and may return to act 5912.

Before implementing the method 5990, an implementer may determine a value of the counter maximum 5954. Choosing a larger value of the counter maximum 5954, as opposed to choosing a smaller value of the counter maximum 5954, may have the following effects:

the inner loop of the method 5990 may take longer to execute; and the inner loop may be more likely to recognize a correct trial password 1150, although there is no value of the counter maximum 5954 that guarantees that the correct trial password 1150 will be recognized.

In the attack operating environment 500, multiple processing devices may cooperate to perform the method 5990. In some embodiments, some processing devices from the array of processing devices 502 may each perform the inner loop of the method 5990 simultaneously, with each of the some processing devices testing a different trial password 1150. Each of the some processing devices may report the results of its inner loop to another processing device in the array 502 that performs the outer loop of the method 5990.

If the password verification data set 4350 is used to generate the cryptographic key 5656, then the method 5990, with slight modifications, may be able to recover a password that enables a slow cryptographic key generation method to generate the cryptographic key 5656.

CONCLUSION

Embodiments consistent with the subject matter of this disclosure generate password verification data sets based, at least in part, on a password. In some embodiments, password authentication may be performed based on a subset of the password verification data set and a provided trial password. In other embodiments consistent with the subject matter of this disclosure, a cryptographic key may be generated based, at least partly, on a provided password, and the cryptographic key may be regenerated based on a provided trial password, when the trial password is identical to the password.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Accordingly, the appended claims and their legal equivalents define embodiments, rather than any specific examples given.

I claim as my invention:

1. A processing device implemented method for generating and storing a data set for a password, and for either authenticating a trial password, or for attempting to generate a cryptographic key, the method comprising:

performing a first method;

performing a second method only when a first subset of at least two distinct subsets of the data set is available; and performing a third method only when the first subset is not available and a second subset of the at least two distinct subsets of the data set is available, wherein:

the first method comprises:
: generating the data set, based at least partly, on the password, the data set including the at least two distinct subsets, each of the at least two distinct subsets being sufficient either to perform a password authentication process or to generate a cryptographic key,
: storing a plurality of data elements of the data set on a first storage device, at least one of the plurality of data elements stored on the first storage device is included in the first subset of the at least two distinct subsets of the data set, and
: storing at least one other data element of the data set on a second storage device, at least one of the at least one other data element is included in the first subset of the at least two distinct subsets of the data set;

the second method comprises:
either
: authenticating the trial password, based on the first subset, or
: attempting to generate the cryptographic key, based, at least partly, on the first subset and the trial password; and the third method comprises:
either
: authenticating the trial password, based on the second subset of the at least two distinct subsets of the data set, or
: attempting to generate the cryptographic key, based, at least partly, on the second subset of the at least two distinct subsets of the data set and the trial password, wherein:

each of the first method, the second method and the third method are performed by at least one respective processing device,
the first subset is different from the second subset,
the second method is different from the third method, and
the second method is at least twice as fast as the third method.

2. The processing device implemented method of claim 1, wherein:
the second storage device is not permanently connected to any of the at least one processing device that performs the second method.

3. The processing device implemented method of claim 2, wherein:
the data set comprises a first salt, a second salt, a first hash and a second hash,
the first subset comprises the first hash and the first salt,
the second subset comprises the second hash and the second salt,
the first hash, the second hash and the second salt are stored on the first storage device,
the first salt is stored on the second storage device, and
the processing device implemented method further comprises:
: obtaining, by the any of the at least one processing device that performs the second method, the first salt, if available;
: obtaining the trial password by the any of the at least one processing device that performs the second method or any of the at least one processing device that performs the third method;
: when the first salt is available, obtaining the first hash and performing the second method; and
: when the first salt is unavailable, obtaining the second hash and the second salt and performing the third method.

4. The processing device implemented method of claim 2, wherein:
the data set comprises a salt, a first hash and a second hash,
the first subset comprises the salt and the first hash,
the second subset comprises the salt and the second hash,
the salt and the second hash are stored on the first storage device,
the first hash is stored on the second storage device, and
the processing device implemented method further comprises:
: obtaining, by the any of the at least one processing device that performs the second method, the first hash, if available;
: obtaining the trial password by the any of the at least one processing device that performs the second method or any of the at least one processing device that performs the third method;
: when the first hash is available, obtaining the salt and performing the second method; and
: when the first hash is unavailable, obtaining the salt and the second hash and performing the third method.

5. The processing device implemented method of claim 2, wherein:
the data set comprises a first salt, a second salt and a hash,
the first subset comprises the second salt and the hash,
the second subset comprises the first salt and the hash,
the first salt and the hash are stored on the first storage device,
the second salt is stored on the second storage device, and
the processing device implemented method further comprises:
: obtaining, by the any of the at least one processing device that performs the second method, the second salt, if available;
: obtaining the trial password by the any of the at least one processing device that performs the second method or any of the at least one processing device that performs the third method;
: when the second salt is available, obtaining the hash and performing the second method; and
: when the second salt is unavailable, obtaining the second salt and the hash and performing the third method.

6. The processing device implemented method of claim 5, further comprising:
generating the second salt by an iterative process; and
terminating the iterative process based, at least partly, on at least one randomly generated number.

7. The processing device implemented method of claim 2, wherein:
the data set comprises a complete salt, a partial salt and a hash,
the partial salt includes only some of the bits that represent a value of the complete salt,
the first subset comprises the complete salt and the hash,
the second subset comprises the partial salt and the hash,
the partial salt and the hash are stored on the first storage device,
the complete salt is stored on the second storage device, and
the processing device implemented method further comprises:

obtaining, by the any of the at least one processing device that performs the second method, the complete salt, if available;

obtaining the trial password by the any of the at least one processing device that performs the second method or any of the at least one processing device that performs the third method;

when the complete salt is available, obtaining the hash and performing the second method; and when the complete salt is unavailable, obtaining the partial salt and the hash and performing the third method.

8. The processing device implemented method of claim 2, wherein:

the data set comprises a first set of coefficients of a polynomial equation and a numerical solution to the polynomial equation, a second set of coefficients of the polynomial equation are derivable from the password, the first set of coefficients and the second set of coefficients are disjoint and the union of the two sets contains all coefficients of the polynomial equation, the first subset comprises the first set of coefficients and the numerical solution, the second subset comprises the first set of coefficients, the first set of coefficients of the polynomial equation are stored on the first storage device, the numerical solution to the polynomial equation is stored on the second storage device, and the processing device implemented method further comprises:

obtaining, by the any of the at least one processing device that performs the second method, the numerical solution, if available;

obtaining the trial password by the any of the at least one processing device that performs the second method or any of the at least one processing device that performs the third method;

deriving the second set of coefficients from the trial password by the any of the at least one processing device that performs either the second method or the third method;

obtaining the first set of coefficients by the any of the at least one processing device that performs either the second method or the third method;

when the numerical solution is available, performing the second method; and when the numerical solution is unavailable, performing the third method.

9. The processing device implemented method of claim 2, further comprising:

generating the cryptographic key from a combination including at least one data element of the plurality of data elements of the data set stored on the first storage device and one or more data elements of the at least one other data element of the data set stored on the second storage device.

10. The processing device implemented method of claim 9 wherein the combination further includes the trial password.

11. The processing device implemented method of claim 1, wherein the second storage device is a removable storage device.

12. The processing device implemented method of claim 1, wherein:

the first method further comprises:

applying a one-way function to a combination, based on one or more of the at least one other data element that belongs to the first subset of the data set, to produce a first hash which is included in the data set, and storing the first hash on the first storage device;

the second method further comprises:

providing the first hash and the one or more of the at least one other data element to one or more processing devices of the at least one processing device that performs the second method, applying the one-way function to the combination to produce a second hash, and either failing to authenticate the trial password, or failing to generate the cryptographic key, when the first hash is different from the second hash.

13. The processing device implemented method of claim 1, wherein:

the authenticating the trial password, based on the first subset, further comprises:

obtaining the first subset of the data set, a first data element of the first subset having been previously generated based, at least partially, on performing a random number of iterations of a first iterative process on a combination including the password, performing a calculation, based, at least partially, on a combination of the trial password and a second data element of the first subset, the calculation comprising a one-way function that performs calculations which are mathematically equivalent to calculations performed during an iteration of the first iterative process, and successfully authenticating the trial password only when the result of the calculation matches the first data element of the first subset.

14. The processing device implemented method of claim 1, wherein:

the authenticating the trial password, based on the second subset, further comprises:

obtaining the second subset of the data set, a first data element of the second subset having been previously generated based, at least partially, on performing a random number of iterations of a first iterative process on a combination including the password, performing a plurality of iterations of a second iterative process based, at least partially, on a combination of the trial password and a second data element of the second subset, an iteration of the second iterative process comprising a one-way function that performs calculations which are mathematically equivalent to calculations performed during an iteration of the first iterative process, and successfully authenticating the trial password only when a result of a most recent iteration of the plurality of iterations of the second iterative process matches the first data element of the second subset.

15. The processing device implemented method of claim 1, wherein:

the attempting to generate the cryptographic key, based on the first subset, further comprises:

obtaining the first subset of the data set, a first data element of the first subset having been previously generated based, at least partially, on performing a random number of iterations of a first iterative process on a combination including the password, performing a calculation, based, at least partially, on a combination of the trial password and a second data element of the first subset, the calculation comprising a one-way function that performs calculations which are mathematically equivalent to calculations performed during an iteration of the first iterative process, and successfully generating the cryptographic key only when the result of the calculation matches the first data element of the first subset.

16. The processing device implemented method of claim 1, wherein:

the attempting to generate the cryptographic key, based on the second subset, further comprises:

obtaining the second subset of the data set, a first data element of the second subset having been previously generated based, at least partially, on performing a random number of iterations of a first iterative process on a combination including the password, performing a plurality of iterations of a second iterative process, based, at least partially, on a combination of the trial password and a second data element of the second subset, an iteration of the second iterative process comprising a one-way function that performs calculations which are mathematically equivalent to calculations performed during an iteration of the first iterative process, and successfully generating the cryptographic key only when a result of a most recent iteration of the plurality of iterations of the second iterative process matches the first data element of the second subset.

17. At least one processing device, each of the at least one processing device comprising:

at least one processor; and at least one memory connected to one or more respective processors of the at least one processor, the at least one memory having instructions stored therein for the one or more respective processors of the at least one processor to perform a method for generating and storing a data set for a password, and either the data set is for authenticating a trial password or the data set is for generating a cryptographic key, the method comprising:

performing a first method;

performing a second method only when a first subset of at least two distinct subsets of the data set is available; and performing a third method only when the first subset of the at least two distinct subsets of the data set is unavailable and a second subset of the at least two distinct subsets of the data set is available, wherein:

the first method comprises:

generating the data set, based at least partly, on the password, the data set including the at least two distinct subsets that are each sufficient to perform either a password authentication process or a cryptographic key generation process;

storing a plurality of data elements of the data set on a first storage device, at least one of the plurality of data elements stored on the first storage device is included in the first subset of the data set; and storing at least one other data element of the data set on a second storage device, at least one of the at least one other data element is included in the first subset of the data set;

the second method comprises:

either authenticating the trial password, or generating the cryptographic key, based on the first subset; and the third method comprises:

either authenticating the trial password, or generating the cryptographic key, based on the second subset of the data set, wherein:

the first subset is different from the second subset, the second method is different from the third method, and the second method is at least twice as fast as the third method.

18. The at least one processing device of claim 17, wherein the second storage device is not permanently connected to the at least one processing device.

19. The at least one processing device of claim 17, wherein the second storage device is a removable storage device.

* * * * *